US008155707B2

(12) United States Patent
Takano et al.

(10) Patent No.: US 8,155,707 B2

(45) Date of Patent: Apr. 10, 2012

(54) VOICE INPUT-OUTPUT DEVICE AND COMMUNICATION DEVICE

(75) Inventors: Rikuo Takano, Suginami (JP); Kiyoshi Sugiyama, Mitaka (JP); Toshimi Fukuoka, Yokohama (JP); Masatoshi Ono, Tsukuba (JP); Ryusuke Horibe, Hirakata (JP); Fuminori Tanaka, Suita (JP); Hideki Choji, Muko (JP); Takeshi Inoda, Kyoto (JP)

(73) Assignees: Funai Electric Advanced Applied Technology Research Institute Inc. (JP); Funai Electric Co., Ltd. (JP)

( * ) Notice: Subject to any disclaimer, the term of this patent is extended or adjusted under 35 U.S.C. 154(b) by 836 days.

(21) Appl. No.: 12/144,284

(22) Filed: Jun. 23, 2008

(65) Prior Publication Data

US 2008/0318640 A1 Dec. 25, 2008

(30) Foreign Application Priority Data

Jun. 21, 2007 (JP) ................................. 2007-163912
Mar. 27, 2008 (JP) ................................. 2008-83294

(51) Int. Cl.
*H04M 1/00* (2006.01)
*H04K 11/00* (2006.01)

(52) U.S. Cl. ............... 455/569.1; 455/569.2; 455/550.1; 455/575.1; 455/345

(58) Field of Classification Search ............... 455/569.1, 455/569.2, 570, 550.1, 575.1; 379/420
See application file for complete search history.

(56) References Cited

U.S. PATENT DOCUMENTS 3,842,205 A * 10/1974 Okamoto ........................ 381/62
5,511,132 A * 4/1996 Yoshimi ........................ 381/386
5,574,437 A * 11/1996 Schwinn et al. .............. 340/679
5,862,234 A * 1/1999 Todter et al. ................ 381/71.6
6,819,938 B2 * 11/2004 Sahota ......................... 455/522
(Continued)

FOREIGN PATENT DOCUMENTS

JP 04-217199 8/1992
(Continued)

OTHER PUBLICATIONS

Communication from Japan Patent Office regarding counterpart application (and English translation thereof), pp. 1-3 (Sep. 28, 2011).

*Primary Examiner* — Tilahun B Gesesse
(74) *Attorney, Agent, or Firm* — Harness, Dickey & Pierce, P.L.C.

(57) ABSTRACT

A voice input-output device includes a voice input section and a voice output section. The voice input section includes a microphone unit, the microphone unit including a housing that has an inner space, a partition member that is provided in the housing and divides the inner space into a first space and a second space, the partition member being at least partially formed of a diaphragm, and an electrical signal output circuit that outputs an electrical signal that is the first voice signal based on vibrations of the diaphragm, a first through-hole through which the first space communicates with an outer space of the housing and a second through-hole through which the second space communicates with the outer space being formed in the housing. The voice output section includes: an ambient noise detection section that detects ambient noise during a call based on the first voice signal; and a volume control section that controls volume of the speaker based on a degree of the detected ambient noise.

10 Claims, 29 Drawing Sheets

U.S. PATENT DOCUMENTS

| | | | | |
|---|---|---|---|---|
| 6,920,230 | B2 * | 7/2005 | Usuki et al. | 381/396 |
| 7,092,744 | B2 * | 8/2006 | Rodemer et al. | 455/569.1 |
| 7,187,956 | B2 * | 3/2007 | Sugino et al. | 455/575.3 |
| 7,280,958 | B2 * | 10/2007 | Pavlov et al. | 704/207 |
| 7,283,850 | B2 * | 10/2007 | Granovetter et al. | 455/570 |
| 7,447,630 | B2 * | 11/2008 | Liu et al. | 704/228 |
| 7,512,425 | B2 * | 3/2009 | Fukuda | 455/575.1 |
| 2002/0048373 | A1 * | 4/2002 | Paritsky et al. | 381/1 |
| 2002/0137478 | A1 * | 9/2002 | Masamura | 455/90 |

FOREIGN PATENT DOCUMENTS

| | | |
|---|---|---|
| JP | 07-307697 | 11/1995 |
| JP | 07-312638 | 11/1995 |
| JP | 09-331337 | 12/1997 |
| JP | 11-308329 | 11/1999 |
| JP | 2001-186241 | 7/2001 |

* cited by examiner

1kHz

Δr=20mm

MICROPHONE-SOUND SOURCE DISTANCE 2.5 cm

MICROPHONE-SOUND SOURCE DISTANCE 1 m

7kHz

Δr=10mm

MICROPHONE-SOUND SOURCE DISTANCE 2.5 cm

MICROPHONE-SOUND SOURCE DISTANCE 1 m

7kHz

Δr=20mm

MICROPHONE-SOUND SOURCE DISTANCE 2.5 cm

MICROPHONE-SOUND SOURCE DISTANCE 1 m

300Hz

Δr=10mm

MICROPHONE-SOUND SOURCE DISTANCE 2.5 cm

MICROPHONE-SOUND SOURCE DISTANCE 1 m

300Hz

Δr=20mm

MICROPHONE-SOUND SOURCE DISTANCE 2.5 cm

MICROPHONE-SOUND SOURCE DISTANCE 1 m

VOICE INPUT-OUTPUT DEVICE AND COMMUNICATION DEVICE

CROSS REFERENCE TO RELATED APPLICATIONS

Japanese Patent Application No. 2007-163912, filed on Jun. 21, 2007, and Japanese Patent Application No. 2008-83294, filed on Mar. 27, 2008, are hereby incorporated by reference in their entirety.

BACKGROUND OF THE INVENTION

The present invention relates to a voice input-output device and a communication device.

It is desirable to pick up only desired sound (user's voice) during a telephone call, speech recognition, voice recording, or the like. However, sound (e.g., background noise) other than desired sound may also be present in an environment in which a voice input device is used. Therefore, a voice input device has been developed which has a function of removing noise.

As technology which removes noise in an environment in which noise is present, a method which provides a microphone with sharp directivity, and a method which detects the travel direction of sound waves utilizing the difference in time when sound waves reach a microphone and removes noise by signal processing have been known.

In recent years, electronic instruments have been increasingly scaled down. Therefore, technology which reduces the size of a voice input device has become important (see JP-A-7-312638, JP-A-9-331377, and JP-A-2001-186241).

In order to provide a microphone with sharp directivity, it is necessary to arrange a number of diaphragms. This makes it difficult to reduce the size of a voice input device.

In order to detect the travel direction of sound waves utilizing the difference in time when sound waves reach a microphone unit, a plurality of diaphragms must be provided at intervals equal to a fraction of several wavelengths of an audible sound wave. This also makes it difficult to reduce the size of a voice input device.

When using a voice input-output device (e.g., telephone, portable telephone, or headset microphone-speaker unit) in a noise-containing environment, it is generally difficult to clearly catch a voice through the voice input-output device.

SUMMARY

According to a first aspect of the invention, there is provided a voice input-output device comprising:

a voice input section that generates a first voice signal; and a voice output section that outputs a voice from a speaker based on a second voice signal, the voice input section including a microphone unit, the microphone unit including a housing that has an inner space, a partition member that is provided in the housing and divides the inner space into a first space and a second space, the partition member being at least partially formed of a diaphragm, and an electrical signal output circuit that outputs an electrical signal that is the first voice signal based on vibrations of the diaphragm, a first through-hole through which the first space communicates with an outer space of the housing and a second through-hole through which the second space communicates with the outer space being formed in the housing, and the voice output section including:

an ambient noise detection section that detects ambient noise during a call based on the first voice signal; and a volume control section that controls volume of the speaker based on a degree of the detected ambient noise.

According to a second aspect of the invention, there is provided a voice input-output device comprising:

a voice input section that generates a first voice signal; and a voice output section that outputs a voice from a speaker based on a second voice signal, the voice input section including an integrated circuit device that includes a semiconductor substrate, the semiconductor substrate being provided with a first diaphragm that forms a first microphone, a second diaphragm that forms a second microphone, and a differential signal generation circuit that receives a first voltage signal acquired by the first microphone and a second voltage signal acquired by the second microphone and generates the first voice signal based on a differential signal that indicates a difference between the first voltage signal and the second voltage signal, and the voice output section including:

an ambient noise detection section that detects ambient noise during a call based on the first voice signal; and a volume control section that controls volume of the speaker based on a degree of the detected ambient noise.

According to a third aspect of the invention, there is provided a voice input-output device comprising:

a voice input section that generates a first voice signal; and a voice output section that outputs a voice from a speaker based on a second voice signal, the voice input section including:

a first microphone including a first diaphragm;

a second microphone including a second diaphragm; and a differential signal generation circuit that generates the first voice signal based on a differential signal that indicates a difference between a first voltage signal acquired by the first microphone and a second voltage signal acquired by the second microphone, the first diaphragm and the second diaphragm being disposed so that a noise intensity ratio that indicates a ratio of an intensity of a noise component contained in the differential signal to an intensity of a noise component contained in the first voltage signal or the second voltage signal is smaller than an input voice intensity ratio that indicates a ratio of an intensity of an input voice component contained in the differential signal to an intensity of an input voice component contained in the first voltage signal or the second voltage signal, and the voice output section including:

an ambient noise detection section that detects ambient noise during a call based on the first voice signal; and a volume control section that controls volume of the speaker based on a degree of the detected ambient noise.

According to a fourth aspect of the invention, there is provided a hands-free voice input-output device comprising:

a hands-free voice input section that generates a first voice signal; and a voice output section that outputs a voice from a speaker based on a second voice signal, the hands-free voice input section including a microphone unit, the microphone unit including a housing that has an inner space, a partition member that is provided in the housing and divides the inner space into a first space and a second space, the partition member being at least partially formed of a diaphragm, and an electrical signal output circuit that outputs an electrical signal that is the first voice signal based on vibrations of the diaphragm, a first through-hole through which the first space communicates with an outer space of the housing and a second through-hole through which the second space communicates with the outer space being formed in the housing.

According to a fifth aspect of the invention, there is provided a hands-free voice input-output device comprising:

a hands-free voice input section that generates a first voice signal; and a voice output section that outputs a voice from a speaker based on a second voice signal, the hands-free voice input section including an integrated circuit device that includes a semiconductor substrate, the semiconductor substrate being provided with a first diaphragm that forms a first microphone, a second diaphragm that forms a second microphone, and a differential signal generation circuit that receives a first voltage signal acquired by the first microphone and a second voltage signal acquired by the second microphone and generates the first voice signal based on a differential signal that indicates a difference between the first voltage signal and the second voltage signal.

According to a sixth aspect of the invention, there is provided a hands-free voice input-output device comprising:

a hands-free voice input section that generates a first voice signal; and a voice output section that outputs a voice from a speaker based on a second voice signal, the hands-free voice input section including:

a first microphone including a first diaphragm;

a second microphone including a second diaphragm; and a differential signal generation circuit that generates the first voice signal based on a differential signal that indicates a difference between a first voltage signal acquired by the first microphone and a second voltage signal acquired by the second microphone, and the first diaphragm and the second diaphragm being disposed so that a noise intensity ratio that indicates a ratio of an intensity of a noise component contained in the differential signal to an intensity of a noise component contained in the first voltage signal or the second voltage signal is smaller than an input voice intensity ratio that indicates a ratio of an intensity of an input voice component contained in the differential signal to an intensity of an input voice component contained in the first voltage signal or the second voltage signal.

According to a seventh aspect of the invention, there is provided a voice input-output device comprising:

a voice input section that generates a first voice signal; and a voice output section that outputs a voice from a speaker based on a second voice signal, the voice input section including a microphone unit, the microphone unit including a housing that has an inner space, a partition member that is provided in the housing and divides the inner space into a first space and a second space, the partition member being at least partially formed of a diaphragm, and an electrical signal output circuit that outputs an electrical signal that is the first voice signal based on vibrations of the diaphragm, a first through-hole through which the first space communicates with an outer space of the housing and a second through-hole through which the second space communicates with the outer space being formed in the housing, and the voice output section and the voice input section being disposed separately.

According to an eighth aspect of the invention, there is provided a voice input-output device comprising:

a voice input section that generates a first voice signal; and a voice output section that outputs a voice from a speaker based on a second voice signal, the voice input section including an integrated circuit device that includes a semiconductor substrate, the semiconductor substrate being provided with a first diaphragm that forms a first microphone, a second diaphragm that forms a second microphone, and a differential signal generation circuit that receives a first voltage signal acquired by the first microphone and a second voltage signal acquired by the second microphone and generates the first voice signal based on a differential signal that indicates a difference between the first voltage signal and the second voltage signal, and the voice output section and the voice input section being disposed separately.

According to a ninth aspect of the invention, there is provided a voice input-output device comprising:

a voice input section that generates a first voice signal; and a voice output section that outputs a voice from a speaker based on a second voice signal, the voice input section including:

a first microphone including a first diaphragm;

a second microphone including a second diaphragm; and a differential signal generation circuit that generates the first voice signal based on a differential signal that indicates a difference between a first voltage signal acquired by the first microphone and a second voltage signal acquired by the second microphone, the first diaphragm and the second diaphragm being disposed so that a noise intensity ratio that indicates a ratio of an intensity of a noise component contained in the differential signal to an intensity of a noise component contained in the first voltage signal or the second voltage signal is smaller than an input voice intensity ratio that indicates a ratio of an intensity of an input voice component contained in the differential signal to an intensity of an input voice component contained in the first voltage signal or the second voltage signal, and the voice output section and the voice input section being disposed separately.

According to a tenth aspect of the invention, there is provided a communication device comprising:

any of the above-described voice input-output devices;

a transmitter section that transmits the first voice signal generated by the voice input section to a device of an intended party; and a receiver section that receives the second voice signal transmitted from the device of the intended party.

DETAILED DESCRIPTION OF THE EMBODIMENT

Figure 1:
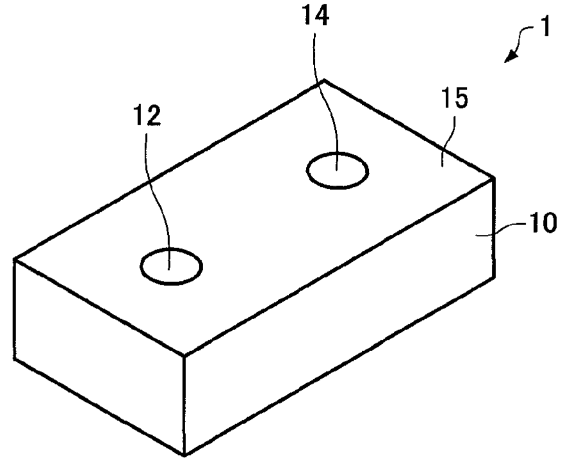
FIG. 1 is a diagram illustrative of a microphone unit.

The invention may provide a voice input-output device and a communication device that can provide a comfortable call environment affected by ambient noise, impact sound, an echo, howling, and the like to only a small extent.

(1) According to one embodiment of the invention, there is provided a voice input-output device comprising:

a voice input section that generates a first voice signal; and a voice output section that outputs a voice from a speaker based on a second voice signal, the voice input section including a microphone unit, the microphone unit including a housing that has an inner space, a partition member that is provided in the housing and divides the inner space into a first space and a second space, the partition member being at least partially formed of a diaphragm, and an electrical signal output circuit that outputs an electrical signal that is the first voice signal based on vibrations of the diaphragm, a first through-hole through which the first space communicates with an outer space of the housing and a second through-hole through which the second space communicates with the outer space being formed in the housing, and the voice output section including:

an ambient noise detection section that detects ambient noise during a call based on the first voice signal; and a volume control section that controls volume of the speaker based on a degree of the detected ambient noise.

Ambient noise during a call may be determined based on an electrical signal (sound pressure; e.g., a voltage detected by the microphone) detected when a call has started, for example. Since voice communication generally starts when about one second has elapsed after a call has been enabled, an electrical signal detected immediately after the call has started may be considered to be ambient noise to control the output volume.

An interval in which a voice is input and an interval in which a voice is not input may be determined based on a change in electrical signal during a call, and the output volume may be controlled on the assumption that an electrical signal detected in an interval in which a voice is not input is ambient noise.

The voice input-output device may be a telephone, a portable telephone, a headset microphone-speaker unit, a music reproduction device (karaoke set) including a microphone and a speaker, a television, a radio, or a personal computer including a microphone and a speaker, or the like.

The volume of the speaker may be changed successively or stepwise based on the degree of the detected ambient noise.

According to the above embodiment, a user's voice and noise are incident on each side of the diaphragm. Since a noise component incident on each side of the diaphragm has almost the same sound pressure, the noise components are canceled by the diaphragm. Therefore, the sound pressure which causes the diaphragm to vibrate may be considered to be a sound pressure which represents the user's voice, and an electrical signal obtained based on vibrations of the diaphragm may be considered to be an electrical signal which represents the user's voice from which noise has been removed.

According to the above embodiment, a high-quality microphone unit that can implement accurate noise removal by a simple configuration can be provided.

When using such a voice input-output device or the like in a noise-containing environment, it is difficult to clearly catch the second voice signal (e.g., the voice of the intended party). According to the above embodiment, a voice input-output device can be provided which controls the volume of the speaker successively or stepwise corresponding to the degree of ambient noise obtained from the voice input microphone so that a person who inputs a voice can easily listen to sound output from the speaker (e.g., a telephone call is facilitated).

(2) According to one embodiment of the invention, there is provided a voice input-output device comprising:

a voice input section that generates a first voice signal; and a voice output section that outputs a voice from a speaker based on a second voice signal, the voice input section including an integrated circuit device that includes a semiconductor substrate, the semiconductor substrate being provided with a first diaphragm that forms a first microphone, a second diaphragm that forms a second microphone, and a differential signal generation circuit that receives a first voltage signal acquired by the first microphone and a second voltage signal acquired by the second microphone and generates the first voice signal based on a differential signal that indicates a difference between the first voltage signal and the second voltage signal, and the voice output section including:

an ambient noise detection section that detects ambient noise during a call based on the first voice signal; and a volume control section that controls volume of the speaker based on a degree of the detected ambient noise.

Ambient noise during a call may be determined based on an electrical signal (sound pressure; e.g., a voltage detected by the microphone) detected when a call has started, for example. Since voice communication generally starts when about one second has elapsed after a call has been enabled, an electrical signal detected immediately after the call has started may be considered to be ambient noise to control the output volume.

An interval in which a voice is input and an interval in which a voice is not input may be determined based on a change in electrical signal during a call, and the output volume may be controlled on the assumption that an electrical signal detected in an interval in which a voice is not input is ambient noise.

The voice input-output device may be a telephone, a portable telephone, a headset microphone-speaker unit, a music reproduction device (karaoke set) including a microphone and a speaker, a television, a radio, or a personal computer including a microphone and a speaker, or the like.

The volume of the speaker may be changed successively or stepwise based on the degree of the detected ambient noise.

According to the above embodiment, a signal that indicates a voice from which a noise component has been removed can be generated by a simple process that merely generates the differential signal that indicates the difference between two voltage signals. According to the above embodiment, since the first diaphragm, the second diaphragm, and the differential signal generation circuit are formed on a single semiconductor substrate, the external shape of the integrated circuit device can be reduced while increasing the accuracy of the integrated circuit device.

According to the above embodiment, an integrated circuit device that has a small external shape and can implement a highly accurate noise removal function can be provided.

The integrated circuit device may be applied as a voice input element (microphone element) of a close-talking sound input device. In this case, the first diaphragm and the second diaphragm may be disposed so that a noise intensity ratio that indicates the ratio of the intensity of the noise component contained in the differential signal to the intensity of the noise component contained in the first voltage signal or the second voltage signal is smaller than an input voice intensity ratio that indicates the ratio of the intensity of an input voice component contained in the differential signal to the intensity of the input voice component contained in the first voltage signal or the second voltage signal. The noise intensity ratio may be an intensity ratio based on a phase difference component of noise, and the voice intensity ratio may be an intensity ratio based on an amplitude component of the input voice.

The integrated circuit device (semiconductor substrate) may be formed as a micro-electro-mechanical system (MEMS).

When using such a voice input-output device or the like in a noise-containing environment, it is difficult to clearly catch the second voice signal (e.g., the voice of the intended party). According to the above embodiment, a voice input-output device can be provided which controls the volume of the speaker successively or stepwise corresponding to the degree of ambient noise obtained from the voice input microphone so that a person who inputs a voice can easily listen to sound output from the speaker (e.g., a telephone call is facilitated).

(3) According to one embodiment of the invention, there is provided a voice input-output device comprising:

a voice input section that generates a first voice signal; and a voice output section that outputs a voice from a speaker based on a second voice signal, the voice input section including:

a first microphone including a first diaphragm;

a second microphone including a second diaphragm; and a differential signal generation circuit that generates the first voice signal based on a differential signal that indicates a difference between a first voltage signal acquired by the first microphone and a second voltage signal acquired by the second microphone, the first diaphragm and the second diaphragm being disposed so that a noise intensity ratio that indicates a ratio of an intensity of a noise component contained in the differential signal to an intensity of a noise component contained in the first voltage signal or the second voltage signal is smaller than an input voice intensity ratio that indicates a ratio of an intensity of an input voice component contained in the differential signal to an intensity of an input voice component contained in the first voltage signal or the second voltage signal, and the voice output section including:

an ambient noise detection section that detects ambient noise during a call based on the first voice signal; and a volume control section that controls volume of the speaker based on a degree of the detected ambient noise.

Ambient noise during a call may be determined based on an electrical signal (sound pressure; e.g., a voltage detected by the microphone) detected when a call has started, for example. Since voice communication generally starts when about one second has elapsed after a call has been enabled, an electrical signal detected immediately after the call has started may be considered to be ambient noise to control the output volume.

An interval in which a voice is input and an interval in which a voice is not input may be determined based on a change in electrical signal during a call, and the output volume may be controlled on the assumption that an electrical signal detected in an interval in which a voice is not input is ambient noise.

The voice input-output device may be a telephone, a portable telephone, a headset microphone-speaker unit, a music reproduction device (karaoke set) including a microphone and a speaker, a television, a radio, or a personal computer including a microphone and a speaker, or the like.

The volume of the speaker may be changed successively or stepwise based on the degree of the detected ambient noise.

According to the above embodiment, the first microphone and the second microphone (first diaphragm and second diaphragm) are disposed to satisfy predetermined conditions. Therefore, the differential signal that indicates the difference between the first voltage signal and the second voltage signal obtained by the first microphone and the second microphone can be considered to be a signal that indicates the input voice from which a noise component has been removed. According to the above embodiment, a voice input device that can implement a noise removal function by a simple configuration that merely generates the differential signal can be provided.

The differential signal generation section of the voice input-output device according to the above embodiment generates the differential signal without performing an analysis process (e.g., Fourier analysis) on the first voltage signal and the second voltage signal. Therefore, the signal processing load of the differential signal generation section can be reduced, or the differential signal generation section can be implemented using a very simple circuit.

According to the above embodiment, a voice input device that can be reduced in size and can implement a highly accurate noise removal function can be provided.

In the voice input device, the first diaphragm and the second diaphragm may be disposed so that the intensity ratio based on the phase difference component of the noise component is smaller than the intensity ratio based on the amplitude of the input voice component.

When using such a voice input-output device or the like in a noise-containing environment, it is difficult to clearly catch the second voice signal (e.g., the voice of the intended party). According to the above embodiment, a voice input-output device can be provided which controls the volume of the speaker successively or stepwise corresponding to the degree of ambient noise obtained from the voice input microphone so that a person who inputs a voice can easily listen to sound output from the speaker (e.g., a telephone call is facilitated).

(4) According to one embodiment of the invention, there is provided a hands-free voice input-output device comprising:

a hands-free voice input section that generates a first voice signal; and a voice output section that outputs a voice from a speaker based on a second voice signal, the hands-free voice input section including a microphone unit, the microphone unit including a housing that has an inner space, a partition member that is provided in the housing and divides the inner space into a first space and a second space, the partition member being at least partially formed of a diaphragm, and an electrical signal output circuit that outputs an electrical signal that is the first voice signal based on vibrations of the diaphragm, a first through-hole through which the first space communicates with an outer space of the housing and a second through-hole through which the second space communicates with the outer space being formed in the housing.

The term "hands-free voice input section" used herein refers to a voice input section that allows the user to input a voice without holding the voice input section. The voice input section is provided on a desk, a wall, or the like, and picks up surrounding sound. For example, a hands-free portable telephone installed in a car, a hands-free amplifier communication device used in a TV conference, and the like are classified as the term "hands-free voice input section".

According to the above embodiment, a user's voice and noise are incident on each side of the diaphragm. Since a noise component incident on each side of the diaphragm has almost the same sound pressure, the noise components are canceled by the diaphragm. Therefore, the sound pressure which causes the diaphragm to vibrate may be considered to be a sound pressure which represents the user's voice, and an electrical signal obtained based on vibrations of the diaphragm may be considered to be an electrical signal which represents the user's voice from which noise has been removed.

According to the above embodiment, a high-quality microphone unit that can implement accurate noise removal by a simple configuration can be provided.

The microphone unit easily and effectively reduces impact sound which directly and indirectly acts on the instrument. Specifically, sound which is propagated in a solid can be removed in addition to sound which is propagated in the air. Since the sound propagation velocity in a solid is much faster (about ten times) than the sound propagation velocity in the air, impact sound (noise) applied to a solid provided with the microphone unit reaches the diaphragm almost at the same time as noise which is propagated in the air. Therefore, the impact sound can be removed in the same manner as noise which is propagated in the air.

Moreover, since the microphone effectively reduces howling which occurs between the microphone and the speaker, a high-performance hands-free amplifier talking device can be provided by incorporating the microphone in a hands-free telephone provided on a desk, for example.

According to the above embodiment, since impact noise or the like directly or indirectly applied to the microphone can be effectively reduced, an instrument which exhibits excellent performance even in the presence of unpleasant impact noise which is difficult to remove can be provided by incorporating the microphone in a hands-free voice input-output device.

The same effects as described above can also be achieved by incorporating the microphone in a keyboard of a personal computer, a robot, a digital recorder, a hearing aid, and the like.

(5) According to one embodiment of the invention, there is provided a hands-free voice input-output device comprising:

a hands-free voice input section that generates a first voice signal; and a voice output section that outputs a voice from a speaker based on a second voice signal, the hands-free voice input section including an integrated circuit device that includes a semiconductor substrate, the semiconductor substrate being provided with a first diaphragm that forms a first microphone, a second diaphragm that forms a second microphone, and a differential signal generation circuit that receives a first voltage signal acquired by the first microphone and a second voltage signal acquired by the second microphone and generates the first voice signal based on a differential signal that indicates a difference between the first voltage signal and the second voltage signal.

The term "hands-free voice input section" used herein refers to a voice input section that allows the user to input a voice without holding the voice input section. The voice input section is provided on a desk, a wall, or the like, and picks up surrounding sound. For example, a hands-free portable telephone installed in a car, a hands-free amplifier communication device used in a TV conference, and the like are classified as the term "hands-free voice input section".

According to the above embodiment, a signal that indicates a voice from which a noise component has been removed can be generated by a simple process that merely generates the differential signal that indicates the difference between two voltage signals. According to the above embodiment, since the first diaphragm, the second diaphragm, and the differential signal generation circuit are formed on a single semiconductor substrate, the external shape of the integrated circuit device can be reduced while increasing the accuracy of the integrated circuit device.

According to the above embodiment, an integrated circuit device that has a small external shape and can implement a highly accurate noise removal function can be provided.

The integrated circuit device may be applied as a voice input element (microphone element) of a close-talking sound input device. In this case, the first diaphragm and the second diaphragm may be disposed so that a noise intensity ratio that indicates the ratio of the intensity of the noise component contained in the differential signal to the intensity of the noise component contained in the first voltage signal or the second voltage signal is smaller than an input voice intensity ratio that indicates the ratio of the intensity of an input voice component contained in the differential signal to the intensity of the input voice component contained in the first voltage signal or the second voltage signal. The noise intensity ratio may be an intensity ratio based on a phase difference component of noise, and the voice intensity ratio may be an intensity ratio based on an amplitude component of the input voice.

The integrated circuit device (semiconductor substrate) may be formed as a micro-electro-mechanical system (MEMS).

The microphone unit easily and effectively reduces impact sound which directly and indirectly acts on the instrument. Specifically, sound which is propagated in a solid can be removed in addition to sound which is propagated in the air. Since the sound propagation velocity in a solid is much faster (about ten times) than the sound propagation velocity in the air, impact sound (noise) applied to a solid provided with the microphone unit reaches the diaphragm almost at the same time as noise which is propagated in the air. Therefore, the impact sound can be removed in the same manner as noise which is propagated in the air.

Moreover, since the microphone effectively reduces howling which occurs between the microphone and the speaker, a high-performance hands-free amplifier talking device can be provided by incorporating the microphone in a hands-free telephone provided on a desk, for example.

According to the above embodiment, since impact noise or the like directly or indirectly applied to the microphone can be effectively reduced, an instrument which exhibits excellent performance even in the presence of unpleasant impact noise which is difficult to remove can be provided by incorporating the microphone in a hands-free voice input-output device.

The same effects as described above can also be achieved by incorporating the microphone in a keyboard of a personal computer, a robot, a digital recorder, a hearing aid, and the like (6) According to one embodiment of the invention, there is provided a hands-free voice input-output device comprising:

a hands-free voice input section that generates a first voice signal; and a voice output section that outputs a voice from a speaker based on a second voice signal, the hands-free voice input section including:

a first microphone including a first diaphragm;

a second microphone including a second diaphragm; and a differential signal generation circuit that generates the first voice signal based on a differential signal that indicates a difference between a first voltage signal acquired by the first microphone and a second voltage signal acquired by the second microphone, and the first diaphragm and the second diaphragm being disposed so that a noise intensity ratio that indicates a ratio of an intensity of a noise component contained in the differential signal to an intensity of a noise component contained in the first voltage signal or the second voltage signal is smaller than an input voice intensity ratio that indicates a ratio of an intensity of an input voice component contained in the differential signal to an intensity of an input voice component contained in the first voltage signal or the second voltage signal.

The term "hands-free voice input section" used herein refers to a voice input section that allows the user to input a voice without holding the voice input section. The voice input section is provided on a desk, a wall, or the like, and picks up surrounding sound. For example, a hands-free portable telephone installed in a car, a hands-free amplifier communication device used in a TV conference, and the like are classified as the term "hands-free voice input section".

According to the above embodiment, the first microphone and the second microphone (first diaphragm and second diaphragm) are disposed to satisfy predetermined conditions. Therefore, the differential signal that indicates the difference between the first voltage signal and the second voltage signal obtained by the first microphone and the second microphone can be considered to be a signal that indicates the input voice from which a noise component has been removed. According to the above embodiment, a voice input device that can implement a noise removal function by a simple configuration that merely generates the differential signal can be provided.

The differential signal generation section of the voice input-output device according to the above embodiment generates the differential signal without performing an analysis process (e.g., Fourier analysis) on the first voltage signal and the second voltage signal. Therefore, the signal processing load of the differential signal generation section can be reduced, or the differential signal generation section can be implemented using a very simple circuit.

According to the above embodiment, a voice input device that can be reduced in size and can implement a highly accurate noise removal function can be provided.

In the voice input device, the first diaphragm and the second diaphragm may be disposed so that the intensity ratio based on the phase difference component of the noise component is smaller than the intensity ratio based on the amplitude of the input voice component.

The microphone unit easily and effectively reduces impact sound which directly and indirectly acts on the instrument. Specifically, sound which is propagated in a solid can be removed in addition to sound which is propagated in the air. Since the sound propagation velocity in a solid is much faster (about ten times) than the sound propagation velocity in the air, impact sound (noise) applied to a solid provided with the microphone unit reaches the diaphragm almost at the same time as noise which is propagated in the air. Therefore, the impact sound can be removed in the same manner as noise which is propagated in the air.

Moreover, since the microphone effectively reduces howling which occurs between the microphone and the speaker, a high-performance hands-free amplifier talking device can be provided by incorporating the microphone in a hands-free telephone provided on a desk, for example.

According to the above embodiment, since impact noise or the like directly or indirectly applied to the microphone can be effectively reduced, an instrument which exhibits excellent performance even in the presence of unpleasant impact noise which is difficult to remove can be provided by incorporating the microphone in a hands-free voice input-output device.

The same effects as described above can also be achieved by incorporating the microphone in a keyboard of a personal computer, a robot, a digital recorder, a hearing aid, and the like.

(7) According to one embodiment of the invention, there is provided a voice input-output device comprising:

a voice input section that generates a first voice signal; and a voice output section that outputs a voice from a speaker based on a second voice signal, the voice input section including a microphone unit, the microphone unit including a housing that has an inner space, a partition member that is provided in the housing and divides the inner space into a first space and a second space, the partition member being at least partially formed of a diaphragm, and an electrical signal output circuit that outputs an electrical signal that is the first voice signal based on vibrations of the diaphragm, a first through-hole through which the first space communicates with an outer space of the housing and a second through-hole through which the second space communicates with the outer space being formed in the housing, and the voice output section and the voice input section being disposed separately.

The voice output section and the voice input section are disposed separately. This includes a configuration in which a voice transmitter section formed by incorporating the microphone unit according to the above embodiment in a portable instrument, a remote controller, or the like and a receiver section that outputs a voice from a speaker of a television or the like are combined and disposed separately.

According to the above embodiment, a user's voice and noise are incident on each side of the diaphragm. Since a noise component incident on each side of the diaphragm has almost the same sound pressure, the noise components are canceled by the diaphragm. Therefore, the sound pressure which causes the diaphragm to vibrate may be considered to be a sound pressure which represents the user's voice, and an electrical signal obtained based on vibrations of the diaphragm may be considered to be an electrical signal which represents the user's voice from which noise has been removed.

According to the above embodiment, a high-quality microphone unit that can implement accurate noise removal by a simple configuration can be provided.

Moreover, since the microphone effectively reduces howling which occurs between the microphone and the speaker, a novel voice input-output device which is affected by a noise environment to only a small extent can be provided.

(8) According to one embodiment of the invention, there is provided a voice input-output device comprising:

a voice input section that generates a first voice signal; and a voice output section that outputs a voice from a speaker based on a second voice signal, the voice input section including an integrated circuit device that includes a semiconductor substrate, the semiconductor substrate being provided with a first diaphragm that forms a first microphone, a second diaphragm that forms a second microphone, and a differential signal generation circuit that receives a first voltage signal acquired by the first microphone and a second voltage signal acquired by the second microphone and generates the first voice signal based on a differential signal that indicates a difference between the first voltage signal and the second voltage signal, and the voice output section and the voice input section being disposed separately.

The voice output section and the voice input section are disposed separately. This includes a configuration in which a voice transmitter section formed by incorporating the microphone unit according to the above embodiment in a portable instrument, a remote controller, or the like and a receiver section that outputs a voice from a speaker of a television or the like are combined and disposed separately.

According to the above embodiment, a signal that indicates a voice from which a noise component has been removed can be generated by a simple process that merely generates the differential signal that indicates the difference between two voltage signals. According to the above embodiment, since the first diaphragm, the second diaphragm, and the differential signal generation circuit are formed on a single semiconductor substrate, the external shape of the integrated circuit device can be reduced while increasing the accuracy of the integrated circuit device.

According to the above embodiment, an integrated circuit device that has a small external shape and can implement a highly accurate noise removal function can be provided.

The integrated circuit device may be applied as a voice input element (microphone element) of a close-talking sound input device. In this case, the first diaphragm and the second diaphragm may be disposed so that a noise intensity ratio that indicates the ratio of the intensity of the noise component contained in the differential signal to the intensity of the noise component contained in the first voltage signal or the second voltage signal is smaller than an input voice intensity ratio that indicates the ratio of the intensity of an input voice component contained in the differential signal to the intensity of the input voice component contained in the first voltage signal or the second voltage signal. The noise intensity ratio may be an intensity ratio based on a phase difference component of noise, and the voice intensity ratio may be an intensity ratio based on an amplitude component of the input voice.

The integrated circuit device (semiconductor substrate) may be formed as a micro-electro-mechanical system (MEMS).

Moreover, since the microphone effectively reduces howling which occurs between the microphone and the speaker, a novel voice input-output device which is affected by a noise environment to only a small extent can be provided.

(9) According to one embodiment of the invention, there is provided a voice input-output device comprising:

a voice input section that generates a first voice signal; and a voice output section that outputs a voice from a speaker based on a second voice signal, the voice input section including:

a first microphone including a first diaphragm;

a second microphone including a second diaphragm; and a differential signal generation circuit that generates the first voice signal based on a differential signal that indicates a difference between a first voltage signal acquired by the first microphone and a second voltage signal acquired by the second microphone, the first diaphragm and the second diaphragm being disposed so that a noise intensity ratio that indicates a ratio of an intensity of a noise component contained in the differential signal to an intensity of a noise component contained in the first voltage signal or the second voltage signal is smaller than an input voice intensity ratio that indicates a ratio of an intensity of an input voice component contained in the differential signal to an intensity of an input voice component contained in the first voltage signal or the second voltage signal, and the voice output section and the voice input section being disposed separately.

The voice output section and the voice input section are disposed separately. This includes a configuration in which a voice transmitter section formed by incorporating the microphone unit according to the above embodiment in a portable instrument, a remote controller, or the like and a receiver section that outputs a voice from a speaker of a television or the like are combined and disposed separately.

According to the above embodiment, the first microphone and the second microphone (first diaphragm and second diaphragm) are disposed to satisfy predetermined conditions. Therefore, the differential signal that indicates the difference between the first voltage signal and the second voltage signal obtained by the first microphone and the second microphone can be considered to be a signal that indicates the input voice from which a noise component has been removed. According to the above embodiment, a voice input device that can implement a noise removal function by a simple configuration that merely generates the differential signal can be provided.

The differential signal generation section of the voice input-output device according to the above embodiment generates the differential signal without performing an analysis process (e.g., Fourier analysis) on the first voltage signal and the second voltage signal. Therefore, the signal processing load of the differential signal generation section can be reduced, or the differential signal generation section can be implemented using a very simple circuit.

According to the above embodiment, a voice input device that can be reduced in size and can implement a highly accurate noise removal function can be provided.

In the voice input device, the first diaphragm and the second diaphragm may be disposed so that the intensity ratio based on the phase difference component of the noise component is smaller than the intensity ratio based on the amplitude of the input voice component.

Moreover, since the microphone effectively reduces howling which occurs between the microphone and the speaker, a novel voice input-output device which is affected by a noise environment to only a small extent can be provided.

(10) According to one embodiment of the invention, there is provided a communication device comprising:

any of the above-described voice input-output devices;

a transmitter section that transmits the first voice signal generated by the voice input section to a device of an intended party; and a receiver section that receives the second voice signal transmitted from the device of the intended party.

Some embodiments of the invention will be described below, with reference to the drawings. Note that the invention is not limited to the following embodiments. The invention includes configuration in which the elements in the following description are arbitrarily combined.

1. Configuration of Microphone Unit

The configuration of a microphone unit 1 according to one embodiment of the invention is described below.

Figure 2A:
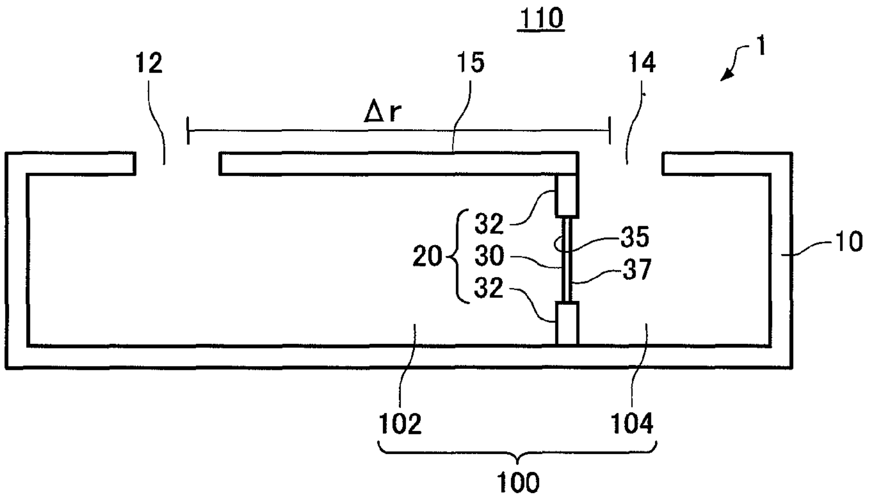
FIGS. 2A and 2B are diagrams illustrative of a microphone unit.

As shown in FIGS. 1 and 2A, the microphone unit 1 according to this embodiment includes a housing 10. The housing 10 is a member which defines the external shape of the microphone unit 1. The housing 10 (microphone unit 1) may have a polyhedral external shape. As shown in FIG. 1, the housing 10 may have a hexahedral (rectangular parallelepiped or cube) external shape. Note that the housing 10 may have a polyhedral external shape other than a hexahedron. The housing 10 may have an external shape (e.g., sphere (hemisphere)) other than a polyhedron.

As shown in FIG. 2A, the housing 10 has an inner space 100 (first and second spaces 102 and 104). Specifically, the housing 10 has a structure which defines a specific space. The inner space 100 is a space defined by the housing 10. The housing 10 may have a shielding structure (electromagnetic shielding structure) which electrically and magnetically separates the inner space 100 and a space (outer space 110) outside the housing 10. This ensures that a diaphragm 30 and an electric signal output circuit 40 described later are rarely affected by an electronic component disposed outside the housing 10 (outer space 110), whereby a microphone unit which can implement a highly accurate noise removal function can be provided.

As shown in FIGS. 1 and 2A, a through-hole through which the inner space 100 of the housing 10 communicates with the outer space 110 is formed in the housing 10. In this embodiment, a first through-hole 12 and a second through-hole 14 are formed in the housing 10. The first through-hole 12 is a through-hole through which the first space 102 communicates with the outer space 110. The second through-hole 14 is a through-hole through which the second space 104 communicates with the outer space 110. The details of the first and second spaces 102 and 104 are described later. The shape of the first and second through-holes 12 and 14 is not particularly limited. As shown in FIG. 1, the first and second through-holes 12 and 14 may have a circular shape, for example. Note that the first and second through-holes 12 and 14 may have a shape (e.g., rectangle) other than a circle.

In this embodiment, the first and second through-holes 12 and 14 are formed in one face 15 of the housing 10 having a hexahedral structure (polyhedral structure), as shown in FIGS. 1 and 2A. As a modification, the first and second through-holes 12 and 14 may be formed in different faces of a polyhedron. For example, the first and second through-holes 12 and 14 may be formed in opposite faces of a hexahedron, or may be formed in adjacent faces of a hexahedron. In this embodiment, one first through-hole 12 and one second through-hole 14 are formed in the housing 10. Note that the invention is not limited thereto. A plurality of first through-holes 12 and a plurality of second through-holes 14 may be formed in the housing 10.

Figure 2B:
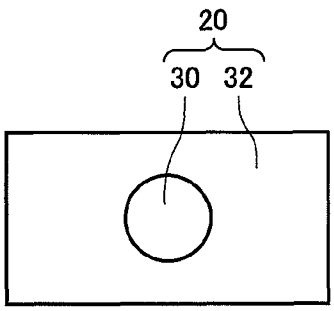

As shown in FIGS. 2A and 2B, the microphone unit 1 according to this embodiment includes a partition member 20. FIG. 2B is a front view showing the partition member 20. The partition member 20 is provided in the housing 10 to divide the inner space 100. In this embodiment, the partition member 20 is provided to divide the inner space 100 into the first and second spaces 102 and 104. Specifically, the first and second spaces 102 and 104 are defined by the housing 10 and the partition member 20.

The partition member 20 may be provided so that a medium that propagates sound waves does not (cannot) move between the first and second spaces 102 and 104 inside the housing 10. For example, the partition member 20 may be an airtight partition wall that airtightly divides the inner space 10 (first space 102 and second space 104) inside the housing 10.

As shown in FIGS. 2A and 2B, the partition member 20 is at least partially formed of the diaphragm 30. The diaphragm 30 is a member that vibrates in the normal direction when sound waves are incident on the diaphragm 30. The microphone unit 1 extracts an electrical signal based on vibrations of the diaphragm 30 to obtain an electrical signal which represents sound incident on the diaphragm 30. Specifically, the diaphragm 30 may be a diaphragm of a microphone (electro-acoustic transducer that converts an acoustic signal into an electrical signal).

Figure 3:
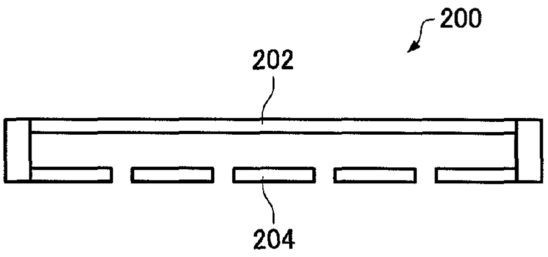
FIG. 3 is a diagram illustrative of a microphone unit.

The configuration of a capacitor-type microphone 200 is described below as an example of a microphone which may be applied to this embodiment. FIG. 3 is a diagram illustrative of the capacitor-type microphone 200.

The capacitor-type microphone 200 includes a diaphragm 202. The diaphragm 202 corresponds to the diaphragm 30 of the microphone unit 1 according to this embodiment. The diaphragm 202 is a film (thin film) that vibrates in response to sound waves. The diaphragm 202 has conductivity and forms one electrode. The capacitor-type microphone 200 includes an electrode 204. The electrode 204 is disposed opposite to the diaphragm 202. The diaphragm 202 and the electrode 204 thus form a capacitor. When sound waves enter the capacitor-type microphone 200, the diaphragm 202 vibrates so that the distance between the diaphragm 202 and the electrode 204 changes, whereby the capacitance between the diaphragm 202 and the electrode 204 changes. An electrical signal based on vibrations of the diaphragm 202 can be obtained by acquiring the change in capacitance as a change in voltage, for example. Specifically, sound waves entering the capacitor-type microphone 200 can be converted into and output as an electrical signal. In the capacitor-type microphone 200, the electrode 204 may have a structure which prevents the effect of sound waves. For example, the electrode 204 may have a mesh structure.

The microphone (diaphragm 30) which may be applied to this embodiment is not limited to the capacitor-type microphone. A known microphone may be applied to the invention. For example, the diaphragm 30 may be a diaphragm of an electrokinetic (dynamic) microphone, an electromagnetic (magnetic) microphone, a piezoelectric (crystal) microphone, or the like.

The diaphragm 30 may be a semiconductor film (e.g., silicon film). Specifically, the diaphragm 30 may be a diaphragm of a silicon microphone (Si microphone). A reduction in size and an increase in performance of the microphone unit 1 can be achieved utilizing a silicon microphone.

The external shape of the diaphragm 30 is not particularly limited. As shown in FIG. 2B, the diaphragm 30 may have a circular external shape. In this case, the diaphragm 30 and the first and second through-holes 12 and 14 may be circular and have (almost) the same diameter. The diaphragm 30 may be larger or smaller than the first and second through-holes 12 and 14. The diaphragm 30 has first and second faces 35 and 37. The first face 35 faces the first space 102, and the second face 37 faces the second space 104.

In this embodiment, the diaphragm 30 may be provided so that the normal to the diaphragm 30 extends parallel to the face 15 of the housing 10, as shown in FIG. 2A. In other words, the diaphragm 30 may be provided to perpendicularly intersect the face 15. The diaphragm 30 may be disposed on the side of (near) the second through-hole 14. Specifically, the diaphragm 30 may be disposed so that the distance between the diaphragm 30 and the first through-hole 12 is not equal to the distance between the diaphragm 30 and the second through-hole 14. As a modification, the diaphragm 30 may be disposed midway between the first and second through-holes 12 and 14 (not shown).

In this embodiment, the partition member 20 may include a holding portion 32 which holds the diaphragm 30, as shown in FIGS. 2A and 2B. The holding portion 32 may adhere to the inner wall surface of the housing 10. The first and second spaces 102 and 104 can be airtightly separated by causing the holding portion 32 to adhere to the inner wall surface of the housing 10.

The microphone unit 1 according to this embodiment includes an electrical signal output circuit 40 which outputs an electrical signal based on vibrations of the diaphragm 30. The electrical signal output circuit 40 may be at least partially formed in the inner space 100 of the housing 10. The electrical signal output circuit 40 may be formed on the inner wall surface of the housing 10, for example. Specifically, the housing 10 according to this embodiment may be utilized as a circuit board of an electrical circuit.

Figure 4:
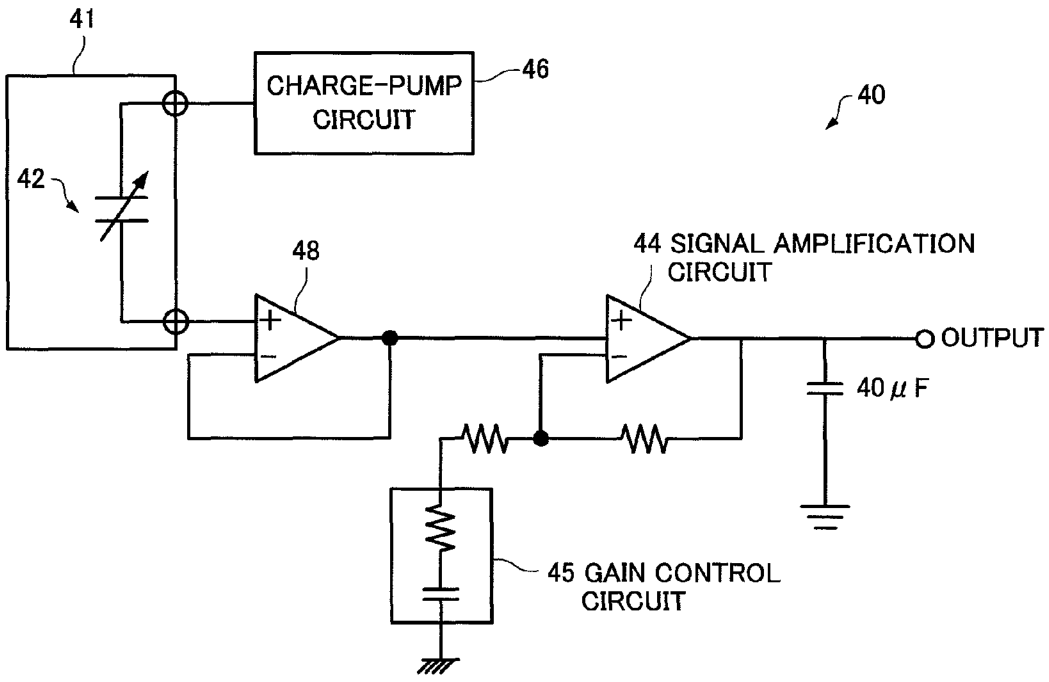
FIG. 4 is a diagram illustrative of a microphone unit.

FIG. 4 shows an example of the electrical signal output circuit 40 which may be applied to this embodiment. The electrical signal output circuit 40 may amplify an electrical signal based on a change in capacitance of a capacitor 42 (capacitor-type microphone having the diaphragm 30) using a signal amplification circuit 44, and output the amplified signal. The capacitor 42 may form part of a diaphragm unit 41, for example. The electrical signal output circuit 40 may include a charge-pump circuit 46 and an operational amplifier 48. This makes it possible to accurately detect (acquire) a change in capacitance of the capacitor 42. In this embodiment, the capacitor 42, the signal amplification circuit 44, the charge-pump circuit 46, and the operational amplifier 48 may be formed on the inner wall surface of the housing 10, for example. The electrical signal output circuit 40 may include a gain control circuit 45. The gain control circuit 45 adjusts the amplification factor (gain) of the signal amplification circuit 44. The gain control circuit 45 may be provided inside or outside the housing 10.

When applying a diaphragm of a silicon microphone as the diaphragm 30, the electrical signal output circuit 40 may be implemented by an integrated circuit formed on a semiconductor substrate of the silicon microphone.

The electrical signal output circuit 40 may further include a conversion circuit which converts an analog signal into a digital signal, a compression circuit which compresses (encodes) a digital signal, and the like.

The diaphragm may include a vibrator having an SN (Signal to Noise) ratio of about 60 dB or more. When making the vibrator function as a differential microphone, the SN ratio decreases in comparison with the case that the vibrator is made to function as a single microphone. Consequently, by using a vibrator having an improved SN ratio (a MEMS vibrator having an SN ratio of 60 dB or more, for example), a sensitive microphone unit can be implemented.

For example, when the speaker-microphone distance is about 2.5 cm (this is close-talking microphone unit) and a single microphone is used as a differential microphone, the sensitivity decreases by a dozen dB. However, by using a vibrator having an SN ratio of about 60 dB or more to provide the diaphragm, a microphone unit having enough functions necessary for a microphone can be implemented in spite of the influence of decrease of an SN ratio.

The microphone unit 1 according to this embodiment may be configured as described above. The microphone unit 1 can implement a highly accurate noise removal function by a simple configuration. The noise removal principle of the microphone unit 1 is described below.

2. Noise Removal Principle of Microphone Unit 2.1. Vibration Principle of Diaphragm The vibration principle of the diaphragm 30 derived from the configuration of the microphone unit 1 is as follows.

In this embodiment, a sound pressure is applied to each face (first and second faces 35 and 37) of the diaphragm 30. When the same amount of sound pressure is simultaneously applied to each face of the diaphragm 30, the sound pressures are cancelled through the diaphragm 30 and do not cause the diaphragm 30 to vibrate. In other words, when sound pressures which differ in amount are applied to the respective faces of the diaphragm 30, the diaphragm 30 vibrates due to the difference in sound pressure.

The sound pressures of sound waves which have entered the first and second through-holes 12 and 14 are evenly transmitted to the inner wall surfaces of the first and second spaces 102 and 104 (Pascal's law). Therefore, a sound pressure equal to the sound pressure which has entered the first through-hole 12 is applied to the face (first face 35) of the diaphragm 30 which faces the first space 102, and a sound pressure equal to the sound pressure which has entered the second through-hole 14 is applied to the face (second face 37) of the diaphragm 30 which faces the second space 104.

Specifically, the sound pressures applied to the first and second faces 35 and 37 correspond to the sound pressures of sounds which have entered the first and second through-holes 12 and 14, respectively. The diaphragm 30 vibrates due to the difference between the sound pressures of sound waves respectively incident on the first and second faces 35 and 37 (first and second through-holes 12 and 14).

2.2. Properties of Sound Waves

Figure 5:
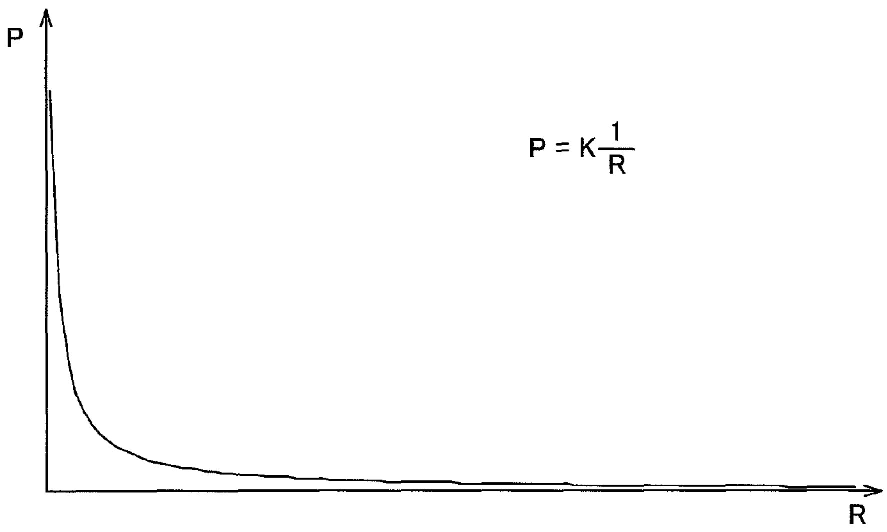
FIG. 5 is a graph illustrative of attenuation characteristics of sound waves.

Sound waves are attenuated during travel through a medium so that the sound pressure (intensity/amplitude of sound waves) decreases. Since a sound pressure is in inverse proportion to the distance from a sound source, a sound pressure P is expressed by the following expression with respect to the relationship with a distance R from a sound source, $$P = K\frac{1}{R} \tag{1}$$

where, k is a proportional constant. FIG. 5 shows a graph of the expression (1). As shown in FIG. 5, the sound pressure (amplitude of sound waves) is rapidly attenuated at a position near the sound source (left of the graph), and is gently attenuated as the distance from the sound source increases.

When applying the microphone unit 1 to a close-talking voice input device, the user speaks near the microphone unit 1 (first and second through-holes 12 and 14). Therefore, the user's voice is attenuated to a large extent between the first and second through-holes 12 and 14 so that the sound pressure of the user's voice which enters the first through-hole 12 (i.e., the sound pressure of the user's voice incident on the first face 35) differs to a large extent from the sound pressure of the user's voice which enters the second through-hole 14 (i.e., the user's voice incident on the second face 37).

On the other hand, the sound source of a noise component is situated at a position away from the microphone unit 1 (first and second through-holes 12 and 14) as compared with the user's voice. Therefore, the sound pressure of noise is attenuated to only a small extent between the first and second through-holes 12 and 14 so that the sound pressure of noise which enters the first through-hole 12 differs to only a small extent from the sound pressure of noise which enters the second through-hole 14.

2.3. Noise Removal Principle

The diaphragm 30 vibrates due to the difference between the sound pressures of sound waves which are simultaneously incident on the first and second faces 35 and 37, as described above. Since the difference between the sound pressure of noise incident on the first face 35 and the sound pressure of noise incident on the second face 37 is very small, the noise is canceled by the diaphragm 30. On the other hand, since the difference between the sound pressure of the user's voice incident on the first face 35 and the sound pressure of the user's voice incident on the second face 37 is large, the user's voice is not canceled by the diaphragm 30 and causes the diaphragm 30 to vibrate.

According to the microphone unit 1, it is considered that the diaphragm 30 vibrates due to only the user's voice. Therefore, an electrical signal output from the microphone unit 1 (electrical signal output circuit 40) is considered to be a signal which represents only the user's voice from which noise has been removed.

Specifically, the microphone unit 1 according to this embodiment enables a voice input device to be provided which can obtain an electrical signal which represents a user's voice from which noise has been removed by a simple configuration.

3. Conditions for Implementing Noise Removal Function with High Accuracy

As described above, the microphone unit 1 can produce an electrical signal which represents only a user's voice from which noise has been removed. However, sound waves contain a phase component. Therefore, conditions whereby a noise removal function with higher accuracy can be implemented (design conditions for the microphone unit 1) can be derived utilizing the phase difference between sound waves which enter the first through-hole 12 (first face 35 of the diaphragm 30) and sound waves which enter the second through-hole 14 (second face 37 of the diaphragm 30). The conditions which should be satisfied by the microphone unit 1 in order to implement a noise removal function with higher accuracy are described below.

According to the microphone unit 1, a signal output based on the sound pressure which causes the diaphragm 30 to vibrate (i.e., the difference between the sound pressure applied to the first face 35 and the sound pressure applied to the second face 37; hereinafter appropriately referred to as "differential sound pressure") is considered to be a signal which represents a user's voice, as described above. According to the microphone unit 1, it may be considered that the noise removal function has been implemented when a noise component included in the sound pressure (differential sound pressure) which causes the diaphragm 30 to vibrate has been reduced as compared with a noise component included in the sound pressure incident on the first face 35 or the second face 37. Specifically, it may be considered that the noise removal function has been implemented when a noise intensity ratio which indicates the ratio of the intensity of a noise component included in the differential sound pressure to the intensity of a noise component included in the sound pressure incident on the first face 35 or the second face 37 has become smaller than a user's voice intensity ratio which indicates the ratio of the intensity of a user's voice component included in the differential sound pressure to the intensity of a user's voice component included in the sound pressure incident on the first face 35 or the second face 37.

Specific conditions which should be satisfied by the microphone unit 1 (housing 10) in order to implement the noise removal function are described below.

The sound pressures of a user's voice incident on the first and second faces 35 and 37 of the diaphragm 30 (first and second through-holes 12 and 14) are discussed below. When the distance from the sound source of a user's voice to the first through-hole 12 is referred to as R and the center-to-center distance between the first and second through-holes 12 and 14 is referred to as Δr, the sound pressures (intensities) P(S1) and P(S2) of the user's voice which enters the first and second through-holes 12 and 14 are expressed as follows when disregarding the phase difference.

$$\begin{cases} P(S1) = K\frac{1}{R} & (2) \\ P(S2) = K\frac{1}{R+\Delta r} & (3) \end{cases}$$

Therefore, a user's voice intensity ratio ρ(P) which indicates the ratio of the sound pressure of the user's voice incident on the first face 35 (first through-hole 12) to the intensity of a user's voice component included in the differential sound pressure is expressed as follows when disregarding the phase difference of the user's voice.

$$\rho(P) = \frac{P(S1) - P(S2)}{P(S1)} = \frac{\Delta r}{R + \Delta r} \tag{4}$$

When the microphone unit 1 is utilized for a close-talking voice input device, the center-to-center distance Δr is considered to be sufficiently smaller than the distance R.

Therefore, the expression (4) can be transformed as follows.

$$\rho(P) = \frac{\Delta r}{R} \tag{A}$$

Specifically, the user's voice intensity ratio when disregarding the phase difference of the user's voice is expressed by the above expression (A).

The sound pressures Q(S1) and Q(S2) of the user's voice are expressed as follows when taking the phase difference of the user's voice into consideration, $$\begin{cases} Q(S1) = K\frac{1}{R}\sin\omega t & (5) \\ Q(S2) = K\frac{1}{R+\Delta r}\sin(\omega t - \alpha) & (6) \end{cases}$$

where, α is the phase difference.

The user's voice intensity ratio ρ(S) is then:

$$\rho(S) = \frac{|P(S1) - P(S2)|_{max}}{|P(S1)|_{max}} = \frac{\left|\frac{K}{R}\sin\omega t - \frac{K}{R+\Delta r}\sin(\omega t - \alpha)\right|_{max}}{\left|\frac{K}{R}\sin\omega t\right|_{max}} \tag{7}$$

The user's voice intensity ratio ρ(S) may then be expressed as follows based on the expression (7).

$$\begin{aligned} \rho(S) &= \frac{\frac{K}{R}\left|\sin\omega t - \frac{1}{1+\Delta r/R}\sin(\omega t - \alpha)\right|_{max}}{\frac{K}{R}|\sin\omega t|_{max}} \\ &= \frac{1}{1+\Delta r/R}|(1+\Delta r/R)\sin\omega t - \sin(\omega t - \alpha)|_{max} \\ &= \frac{1}{1+\Delta r/R}\left|\sin\omega t - \sin(\omega t - \alpha) + \frac{\Delta r}{R}\sin\omega t\right|_{max} \end{aligned} \tag{8}$$

In the expression (8), the term sin ωt-sin(ωt−α) indicates the phase component intensity ratio, and the term Δr/R sin ωt indicates the amplitude component intensity ratio. Since the phase difference component as the user's voice component serves as noise for the amplitude component, the phase component intensity ratio must be sufficiently smaller than the amplitude component intensity ratio in order to accurately extract the user's voice. Specifically, it is important that sin ωt−sin(ωt−α) and Δr/R sin ωt satisfy the following relationship.

$$\left|\frac{\Delta r}{R}\sin\omega t\right|_{max} > |\sin\omega t - \sin(\omega t - \alpha|_{max} \tag{B}$$

Since sin ωt−sin(ωt−α) is expressed as follows, $$\sin\omega t - \sin(\omega t - \alpha) = 2\sin\frac{\alpha}{2}\cdot\cos\left(\omega t - \frac{\alpha}{2}\right) \tag{9}$$

the expression (B) may then be expressed as follows.

$$\left|\frac{\Delta r}{R}\sin\omega t\right|_{max} > \left|2\sin\frac{\alpha}{2}\cdot\cos\left(\omega t-\frac{\alpha}{2}\right)\right|_{max} \quad (10)$$

Taking the amplitude component in the expression (10) into consideration, the microphone unit 1 according to this embodiment must satisfy the following expression.

$$\frac{\Delta r}{R} > 2\sin\frac{\alpha}{2} \quad (C)$$

Since the center-to-center distance Δr is considered to be sufficiently smaller than the distance R, as described above, sin(α/2) can be considered to be sufficiently small and approximated as follows.

$$\sin\frac{\alpha}{2} \doteqdot \frac{\alpha}{2} \quad (11)$$

Therefore, the expression (C) can be transformed as follows.

$$\frac{\Delta r}{R} > \alpha \quad (D)$$

When the relationship between the phase difference α and the center-to-center distance Δr is expressed as follows, $$\alpha = \frac{2\pi\Delta r}{\lambda} \quad (12)$$

the expression (D) can be transformed as follows.

$$\frac{\Delta r}{R} > 2\pi\frac{\Delta r}{\lambda} > \frac{\Delta r}{\lambda} \quad (E)$$

Specifically, the user's voice can be accurately extracted when the microphone unit 1 according to this embodiment satisfies the relationship shown by the expression (E).

The sound pressures of noise incident on the first and second faces 35 and 37 (first and second through-holes 12 and 14) are discussed below.

When the amplitudes of noise components incident on the first and second faces 35 and 37 are referred to as A and A', sound pressures Q(N1) and Q(N2) of the noise are expressed as follows when taking a phase difference component into consideration.

$$\begin{cases} Q(N1) = A\sin\omega t & (13) \\ Q(N2) = A'\sin(\omega t-\alpha) & (14) \end{cases}$$

A noise intensity ratio ρ(N) which indicates the ratio of the sound pressure of a noise component incident on the first face 35 (first through-hole 12) to the intensity of a noise component included in the differential sound pressure is expressed as follows.

$$\rho(N) = \frac{|Q(N1)-Q(N2)|_{max}}{|Q(N1)|_{max}} = \frac{|A\sin\omega t - A'\sin(\omega t-\alpha)|_{max}}{|A\sin\omega t|_{max}} \quad (15)$$

The amplitudes (intensities) of noise components incident on the first and second faces 35 and 37 (first and second through-holes 12 and 14) are almost the same (i.e., A=A'), as described above. Therefore, the expression (15) can be transformed as follows.

$$\rho(N) = \frac{|\sin\omega t - \sin(\omega t-\alpha)|_{max}}{|\sin\omega t|_{max}} \quad (16)$$

The noise intensity ratio is expressed as follows.

$$\rho(N) = \frac{|\sin\omega t - \sin(\omega t-\alpha)|_{max}}{|\sin\omega t|_{max}} = |\sin\omega t - \sin(\omega t-\alpha)|_{max} \quad (17)$$

The expression (17) can be transformed as follows based on the expression (9).

$$\rho(N) = \left|\cos\left(\omega t-\frac{\alpha}{2}\right)\right|_{max}\cdot 2\sin\frac{\alpha}{2} = 2\sin\frac{\alpha}{2} \quad (18)$$

The expression (18) can be transformed as follows based on the expression (11).

$$\rho(N)=\alpha \quad (19)$$

The noise intensity ratio is expressed as follows based on the expression (D).

$$\rho(N) = \alpha < \frac{\Delta r}{R} \quad (F)$$

Δr/R indicates the amplitude component intensity ratio of the user's voice, as indicated by the expression (A). In the microphone unit 1, the noise intensity ratio is smaller than the intensity ratio Δr/R of the user's voice, as is clear from the expression (F).

According to the microphone unit 1 (refer to the expression (B)) in which the phase component intensity ratio of the user's voice is smaller than the amplitude component intensity ratio, the noise intensity ratio is smaller than the user's voice intensity ratio (refer to the expression (F)). In other words, the microphone unit 1 designed so that the noise intensity ratio becomes smaller than the user's voice intensity ratio can implement a highly accurate noise removal function.

4. Method of Producing Microphone Unit

A method of producing the microphone unit 1 according to this embodiment is described below. In this embodiment, the microphone unit 1 may be produced utilizing the relationship between a ratio Δr/λ which indicates the ratio of the center-to-center distance Δr between the first and second through-holes 12 and 14 to a wavelength λ of noise and the noise intensity ratio (intensity ratio based on the phase component of noise).

The intensity ratio based on the phase component of noise is expressed by the expression (18). Therefore, the decibel value of the intensity ratio based on the phase component of noise is expressed as follows.

$$20\log\rho(N) = 20\log\left|2\sin\frac{\alpha}{2}\right| \tag{20}$$

Figure 6:
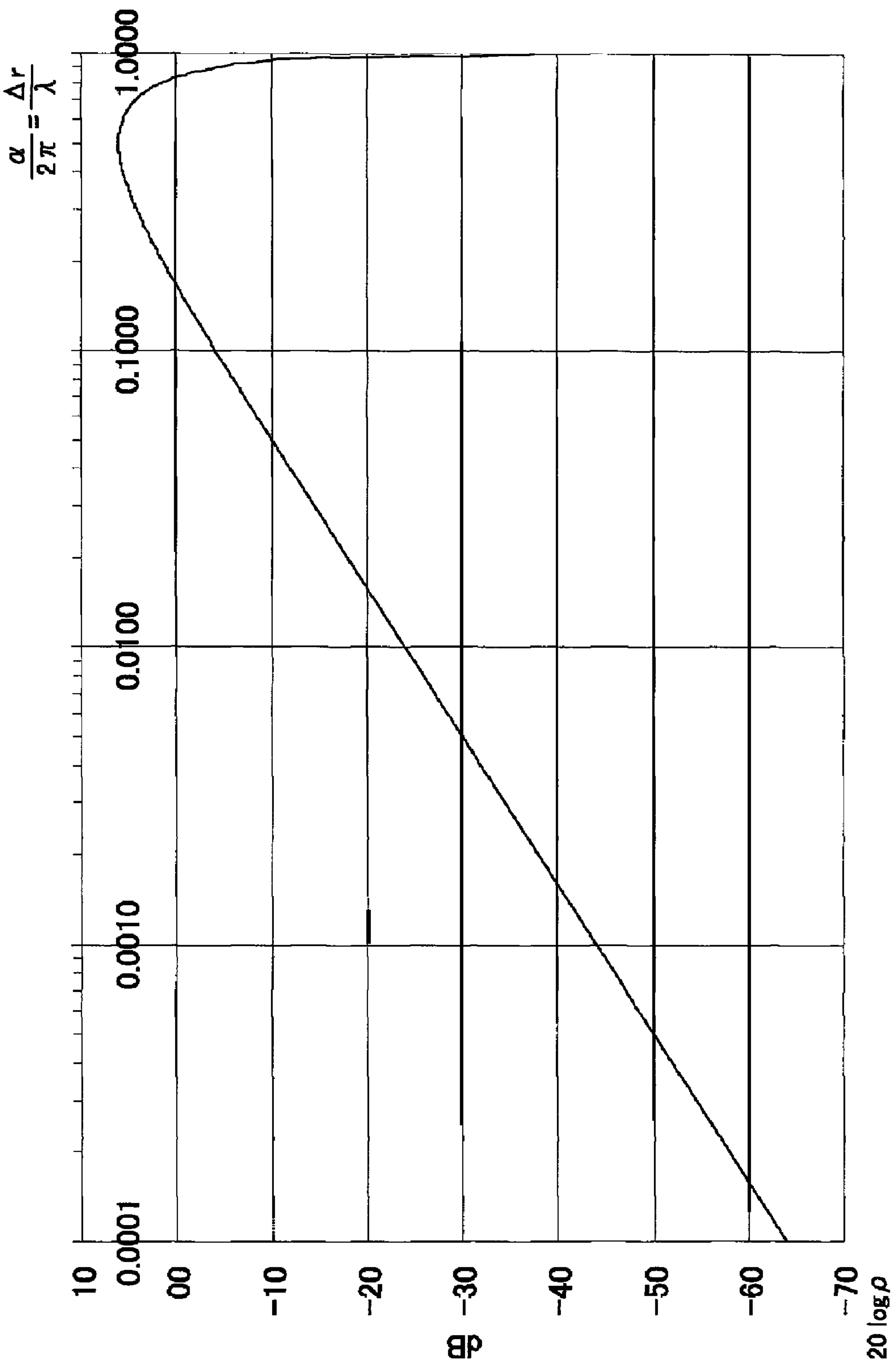
FIG. 6 is a graph showing an example of data which indicates the relationship between a phase difference and an intensity ratio.

The relationship between the phase difference α and the intensity ratio based on the phase component of noise can be determined by substituting each value for α in the expression (20). FIG. 6 shows an example of data which indicates the relationship between the phase difference and the intensity ratio wherein the horizontal axis indicates α/2π and the vertical axis indicates the intensity ratio (decibel value) based on the phase component of noise.

The phase difference α can be expressed as a function of the ratio Δr/λ which indicates the ratio of the distance Δr to the wavelength λ, as indicated by the expression (A). Therefore, the vertical axis in FIG. 6 is considered to indicate the ratio Δr/λ. Specifically, FIG. 6 shows data which indicates the relationship between the intensity ratio based on the phase component of noise and the ratio Δr/λ.

Figure 7:
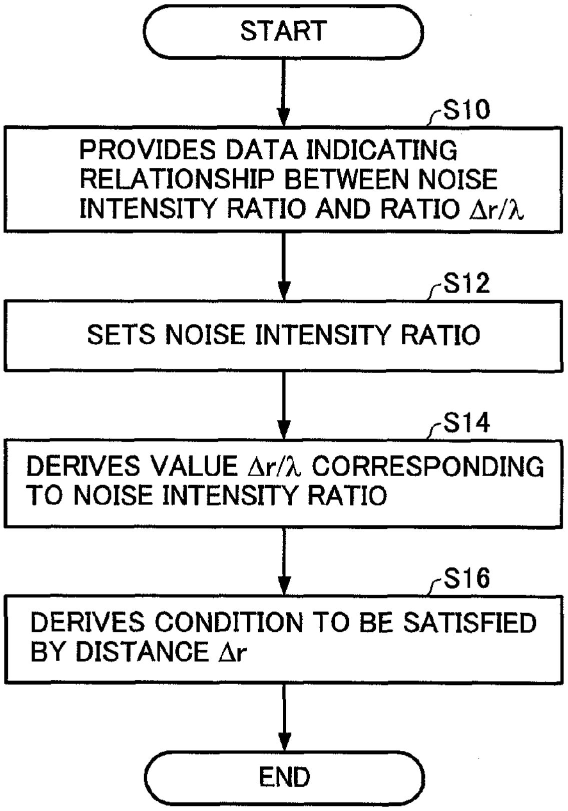
FIG. 7 is a flowchart showing a process of producing a microphone unit.

In this embodiment, the microphone unit 1 is produced utilizing the data shown in FIG. 6. FIG. 7 is a flowchart illustrative of the process of producing the microphone unit 1 utilizing the data shown in FIG. 6.

First, data which indicates the relationship between the noise intensity ratio (intensity ratio based on the phase component of noise) and the ratio Δr/λ (refer to FIG. 6) is provided (step S10).

The noise intensity ratio is set depending on the application (step S12). In this embodiment, the noise intensity ratio must be set so that the intensity of noise decreases. Therefore, the noise intensity ratio is set to be 0 dB or less in this step.

A value Δr/λ corresponding to the noise intensity ratio is derived based on the data (step S14).

A condition which should be satisfied by the distance Δr is derived by substituting the wavelength of the main noise for λ (step S16).

As a specific example, consider a case where the frequency of the main noise is 1 KHz and the microphone unit 1 which reduces the intensity of the noise by 20 dB is produced in an environment in which the wavelength of the noise is 0.347 m.

A condition whereby the noise intensity ratio becomes 0 dB or less is as follows. As shown in FIG. 6, the noise intensity ratio can be set at 0 dB or less by setting the value Δr/λ at 0.16 or less. Specifically, the noise intensity ratio can be set at 0 dB or less by setting the distance Δr at 55.46 mm or less. This is a necessary condition for the microphone unit 1 (housing 10).

A condition whereby the intensity of noise having a frequency of 1 KHz is reduced by 20 dB is as follows. As shown in FIG. 6, the intensity of noise can be reduced by 20 dB by setting the value Δr/λ at 0.015. When λ=0.347 m, this condition is satisfied when the distance Δr is 5.199 mm or less. Specifically, a microphone unit having a noise removal function can be produced by setting the distance Δr at about 5.2 mm or less.

When utilizing the microphone unit 1 according to this embodiment for a close-talking voice input device, the distance between the sound source of a user's voice and the microphone unit 1 (first and second through-holes 12 and 14) is normally 5 cm or less. The distance between the sound source of a user's voice and the microphone unit 1 (first and second through-holes 12 and 14) can be set by changing the design of the housing which receives the microphone unit 1. Therefore, the user's voice intensity ratio Δr/R becomes larger than 0.1 (noise intensity ratio), whereby the noise removal function is implemented.

Noise is not normally limited to a single frequency. However, since the wavelength of noise having a frequency lower than that of noise considered to the main noise is longer than that of the main noise, the value Δr/λ decreases, whereby the noise is removed by the microphone unit 1. The energy of sound waves is attenuated more quickly as the frequency becomes higher. Therefore, since the wavelength of noise having a frequency higher than that of noise considered to be the main noise is attenuated more quickly than the main noise, the effect of the noise on the microphone unit 1 (diaphragm 30) can be disregarded. Therefore, the microphone unit 1 according to this embodiment exhibits an excellent noise removal function even in an environment in which noise having a frequency differing from that of noise considered to the main noise is present.

This embodiment has been described taking an example in which noise enters the first and second through-holes 12 and 14 along a straight line which connects the first and second through-holes 12 and 14, as is clear from the expression (12). In this case, the apparent distance between the first and second through-holes 12 and 14 becomes a maximum, and the noise has the largest phase difference in the actual environment. Specifically, the microphone unit 1 according to this embodiment can remove noise having the largest phase difference. Therefore, the microphone unit 1 according to this embodiment can remove noise incident from all directions.

5. Effects

A summery of the effects of the microphone unit 1 is given below.

As described above, the microphone unit 1 can produce an electrical signal which represents a voice from which noise has been removed by merely acquiring an electrical signal which represents vibrations of the diaphragm 30 (electrical signal based on vibrations of the diaphragm 30). Specifically, the microphone unit 1 can implement a noise removal function without performing a complex analytical calculation process. Therefore, a high-quality microphone unit which can implement accurate noise removal by a simple configuration can be provided. In particular, a microphone unit which can implement a more accurate noise removal function with less phase distortion can be provided by setting the center-to-center distance Δr between the first and second through-holes 12 and 14 at 5.2 mm or less.

According to the microphone unit 1, the housing 10 (i.e., the positions of the first and second through-holes 12 and 14) can be designed so that noise which enters the housing 10 so that the noise intensity ratio based on the phase difference becomes a maximum can be removed. Therefore, the microphone unit 1 can remove noise incident from all directions. According to the invention, a microphone unit which can remove noise incident from all directions can be provided.

The microphone unit 1 can also remove a user's voice component incident on the diaphragm 30 (first and second faces 35 and 37) after being reflected by a wall or the like. Specifically, since a user's voice reflected by a wall or the like enters the microphone unit 1 after traveling over a long distance, such a user's voice can be considered to be produced from a sound source positioned away from the microphone unit 1 as compared with a normal user's voice. Moreover, since the energy of such a user's voice has been reduced to a large extent due to reflection, the sound pressure is not attenuated to a large extent between the first and second through-holes 12 and 14 in the same manner as a noise component. Therefore, the microphone unit 1 also removes a user's voice component incident on the diaphragm after being reflected by a wall or the like in the same manner as noise (as one type of noise).

A signal which represents a user's voice and does not contain noise can be obtained utilizing the microphone unit 1. Therefore, highly accurate speech (voice) recognition, voice authentication, and command generation can be implemented utilizing the microphone unit 1.

6. Voice Input Device

A voice input device 2 including the microphone unit 1 is described below.

6.1. Configuration of Voice Input Device

Figure 8:
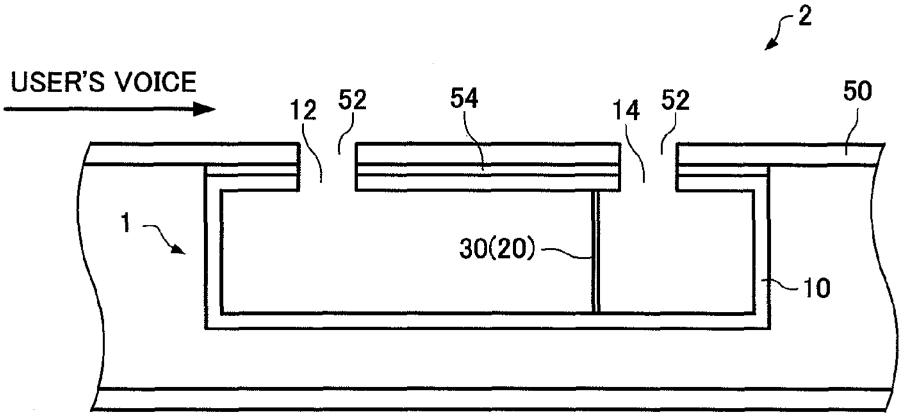
FIG. 8 is a diagram illustrative of a voice input device.
Figure 9:
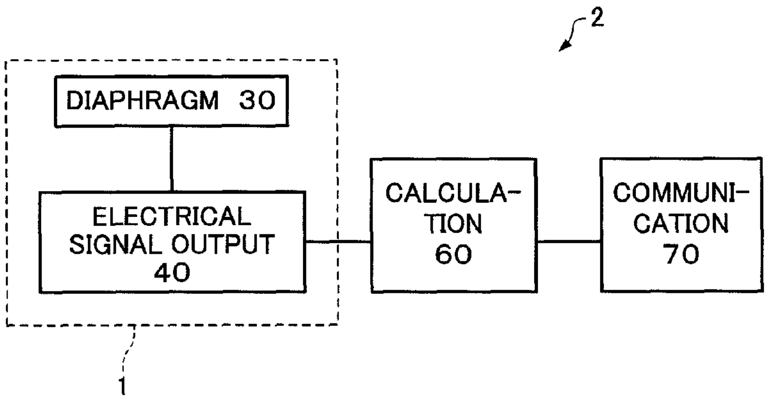
FIG. 9 is a diagram illustrative of a voice input device.

The configuration of the voice input device 2 is described below. FIGS. 8 and 9 are diagrams illustrative of the configuration of the voice input device 2. The voice input device 2 described below is a close-talking voice input device, and may be applied to voice communication instruments such as a portable telephone and a transceiver, information processing systems utilizing input voice analysis technology (e.g., voice authentication system, speech recognition system, command generation system, electronic dictionary, translation device, and voice input remote controller), recording devices, amplifier systems (loudspeaker), microphone systems, and the like.

FIG. 8 is a diagram illustrative of the structure of the voice input device 2.

The voice input device 2 includes a housing 50. The housing 50 is a member which defines the external shape of the voice input device 2. The basic position of the housing 50 may be set in advance. This limits the travel path of the user's voice. Openings 52 which receive the user's voice may be formed in the housing 50.

In the voice input device 2, the microphone unit 1 is provided in the housing 50. The microphone unit 1 may be provided in the housing 50 so that the first and second through-holes 12 and 14 communicate with (overlap or coincide with) the openings 52. The microphone unit 1 may be provided in the housing 50 through an elastic body 54 In this case, vibrations of the housing 50 are transmitted to the microphone unit 1 (housing 10) to only a small extent, whereby the microphone unit 1 can be operated with high accuracy.

The microphone unit 1 may be provided in the housing 50 so that the first and second through-holes 12 and 14 are disposed at different positions along the travel direction of the user's voice. The through-hole disposed on the upstream side of the travel path of the user's voice may be the first through-hole 12, and the through-hole disposed on the downstream side of the travel path of the user's voice may be the second through-hole 14. The user's voice can be simultaneously incident on each face (first and second faces 35 and 37) of the diaphragm 30 by thus disposing the microphone unit 1 in which the diaphragm 30 is disposed on the side of the second through-hole 14. In the microphone unit 1, since the distance between the center of the first through-hole 12 and the first face 35 is almost equal to the distance between the first through-hole 12 and the second through-hole 14, the period of time required for the user's voice which has passed through the first through-hole 12 to be incident on the first face 35 is almost equal to the period of time required for the user's voice which has traveled over the first through-hole 12 to be incident on the second face 37 through the second through-hole 14. Specifically, the period of time required for the user's voice to be incident on the first face 35 is almost equal to the period of time required for the user's voice to be incident on the second face 37. This makes it possible for the user's voice to be simultaneously incident on the first and second faces 35 and 37, whereby the diaphragm 30 can be caused to vibrate so that noise due to phase shift does not occur. In other words, since $\alpha=0$ and $\sin \omega t-\sin(\omega t-\alpha)=0$ in the expression (8), the term $\Delta r/R \sin \omega t$ (only the amplitude component) is extracted. Therefore, even when a user's voice in a high frequency band of about 7 KHz is input, the effect of phase distortion of the sound pressure incident on the first face 35 and the sound pressure incident on the second face 37 can be disregarded, whereby an electrical signal which accurately represents the user's voice can be acquired.

6.2. Function of Voice Input Device

The function of the voice input device 2 is described below with reference to FIG. 9. FIG. 9 is a block diagram illustrative of the function of the voice input device 2.

The voice input device 2 includes the microphone unit 1. The microphone unit 1 outputs an electrical signal generated based on vibrations of the diaphragm 30. The electrical signal output from the microphone unit 1 is an electrical signal which represents the user's voice from which the noise component has been removed.

The voice input device 2 may include a calculation section 60. The calculation section 60 performs various calculations based on the electrical signal output from the microphone unit 1 (electrical signal output circuit 40). The calculation section 60 may analyze the electrical signal. The calculation section 60 may specify a person who has produced the user's voice by analyzing the output signal from the microphone unit 1 (voice authentication process). The calculation section 60 may specify the content of the user's voice by analyzing the output signal from the microphone unit 1 (speech recognition process). The calculation section 60 may create various commands based on the output signal from the microphone unit 1. The calculation section 60 may amplify the output signal from the microphone unit 1. The calculation section 60 may control the operation of a communication section 70 described later. The calculation section 60 may implement the above-mentioned functions by signal processing using a CPU and a memory. The calculation section 60 may implement the above-mentioned functions by signal processing using dedicated hardware.

The voice input device 2 may further include the communication section 70. The communication section 70 controls communication between the voice input device 2 and another terminal (e.g., portable telephone terminal or host computer). The communication section 70 may have a function of transmitting a signal (output signal from the microphone unit 1) to another terminal through a network. The communication section 70 may have a function of receiving a signal from another terminal through a network. A host computer may analyze the output signal acquired through the communication section 70, and perform various information processes such as a speech recognition process, a voice authentication process, a command generation process, and a data storage process. Specifically, the voice input device 2 may form an information processing system with another terminal. In other words, the voice input device 2 may be considered to be an information input terminal which forms an information processing system. Note that the voice input device 2 may not include the communication section 70.

The calculation section 60 and the communication section 70 may be disposed in the housing 50 as a packaged semiconductor device (integrated circuit device). Note that the invention is not limited thereto. For example, the calculation section 60 may be disposed outside the housing 50. When the calculation section 60 is disposed outside the housing 50, the calculation section 60 may acquire a differential signal through the communication section 70.

The voice input device 2 may further include a display device such as a display panel and a sound output device such as a speaker. The voice input device 2 may further include an operation key for inputting operation information.

The voice input device 2 may have the above-described configuration. The voice input device 2 utilizes the microphone unit 1. Therefore, the voice input device 2 can acquire a signal which represents an input voice and does not contain noise, and implement highly accurate speech recognition, voice authentication, and command generation.

When applying the voice input device 2 to a microphone system, a user's voice output from a speaker is also removed as noise. Therefore, a microphone system in which howling rarely occurs can be provided.

Figure 10:
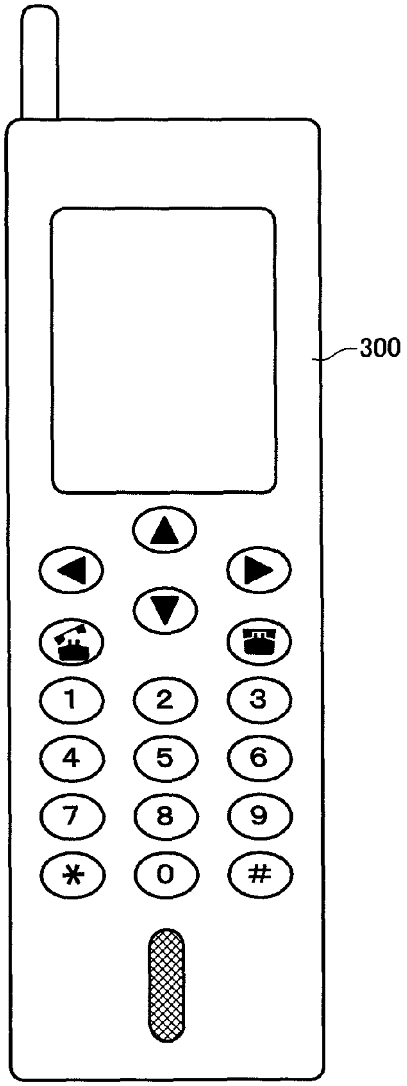
FIG. 10 is a diagram showing a portable telephone as an example of a voice input device.
Figure 11:
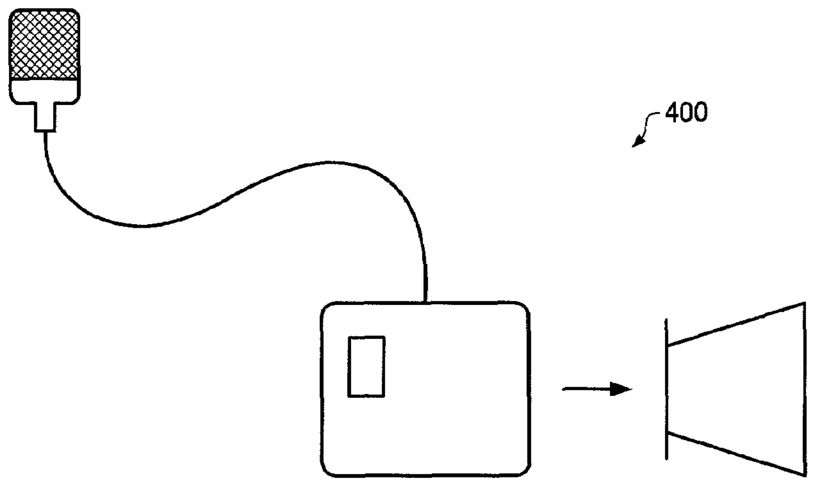
FIG. 11 is a diagram showing a microphone as an example of a voice input device.
Figure 12:
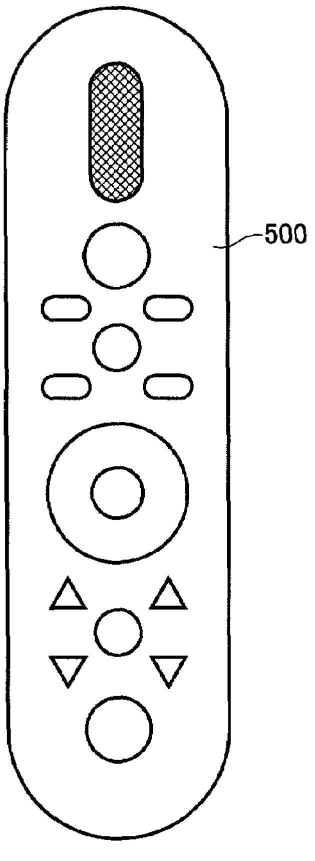
FIG. 12 is a diagram showing a remote controller as an example of a voice input device.
Figure 13:
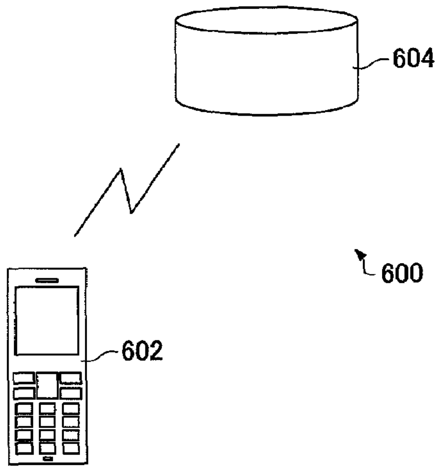
FIG. 13 is a schematic diagram showing an information processing system.

FIGS. 10 to 12 respectively show a portable telephone 300, a microphone (microphone system) 400, and a remote controller 50 as examples of the voice input device 2. FIG. 13 is a schematic diagram showing an information processing system 600 which includes a voice input device 602 as an information input terminal and a host computer 604.

7. Modification 7.1. First Modification

Figure 14:
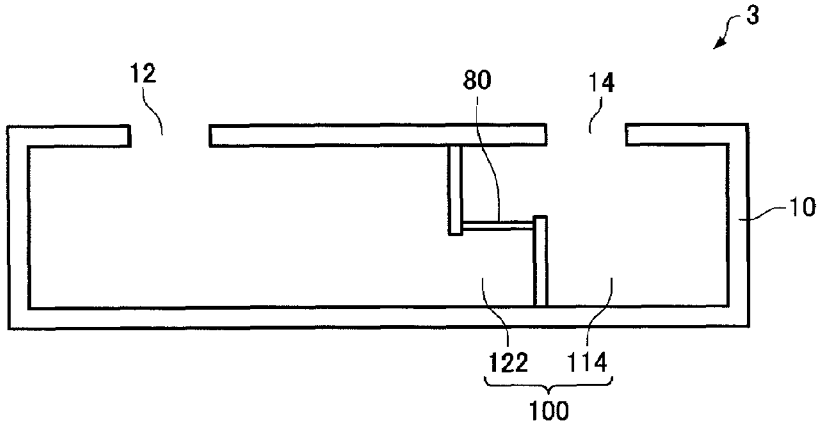
FIG. 14 is diagram illustrative of a microphone unit according to a modification of one embodiment of the invention.

FIG. 14 shows a microphone unit 3 according to a first modification of the embodiment of the invention.

The microphone unit 3 includes a diaphragm 80. The diaphragm 80 forms part of a partition member which divides the inner space 100 of the housing 10 into a first space 112 and a second space 114. The diaphragm 80 is provided so that the normal to the diaphragm 80 perpendicularly intersects the face 15 (i.e., parallel to the face 15). The diaphragm 80 may be provided on the side of the second through-hole 14 so that the diaphragm 80 does not overlap the first and second through-holes 12 and 14. The diaphragm 80 may be disposed at an interval from the inner wall surface of the housing 10.

7.2. Second Modification

Figure 15:
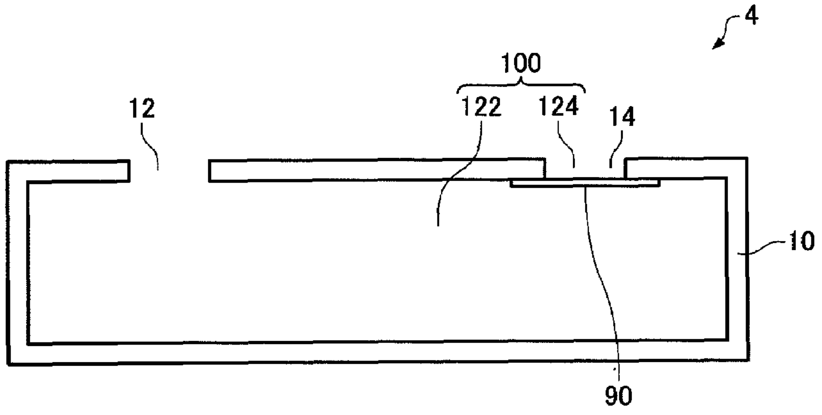
FIG. 15 is diagram illustrative of a microphone unit according to a modification of one embodiment of the invention.

FIG. 15 shows a microphone unit 4 according to a second modification of the embodiment of the invention.

The microphone unit 4 includes a diaphragm 90. The diaphragm 90 forms part of a partition member which divides the inner space 100 of the housing 10 into a first space 122 and a second space 124. The diaphragm 90 is provided so that the normal to the diaphragm 90 perpendicularly intersects the face 15. The diaphragm 90 is provided to be flush with the inner wall surface (i.e., face opposite to the face 15) of the housing 10. The diaphragm 90 may be provided to close the second through-hole 14 from the inside (inner space 100) of the housing 10. In the microphone unit 3, only the inner space of the second through-hole 14 may be the second space 124, and the inner space 100 other than the second space 124 may be the first space 122. This makes it possible to design the housing 10 to a small thickness.

7.3. Third Modification

Figure 16:
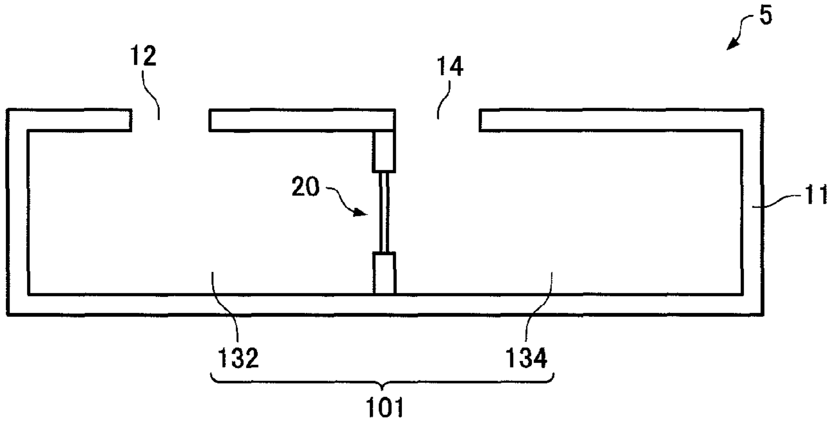
FIG. 16 is diagram illustrative of a microphone unit according to a modification of one embodiment of the invention.

FIG. 16 shows a microphone unit 5 according to a third modification of the embodiment of the invention.

The microphone unit 5 includes a housing 11. The housing 11 has an inner space 101. The inner space 101 is divided into a first region 132 and a second region 134 by the partition member 20. In the microphone unit 5, the partition member 20 is disposed on the side of the second through-hole 14. In the microphone unit 5, the partition member 20 divides the inner space 101 so that the first and second spaces 132 and 134 have an equal volume.

7.4. Fourth Modification

Figure 17:
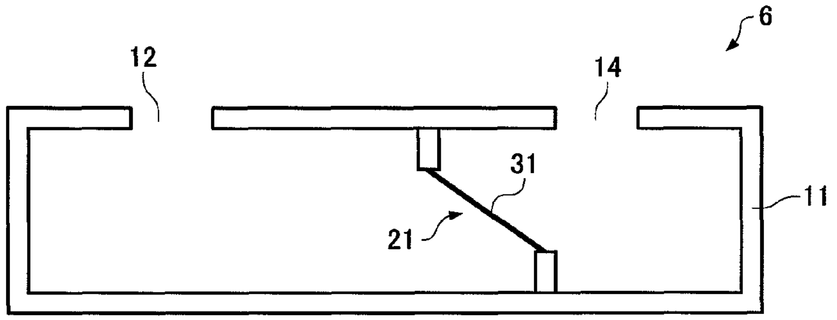
FIG. 17 is diagram illustrative of a microphone unit according to a modification of one embodiment of the invention.

FIG. 17 shows a microphone unit 6 according to a fourth modification of the embodiment of the invention.

As shown in FIG. 17, the microphone unit 6 includes a partition member 21. The partition member 21 includes a diaphragm 31. The diaphragm 31 is held inside the housing 10 so that the normal to the diaphragm 31 diagonally intersects the face 15.

7.5. Fifth Modification

Figure 18:
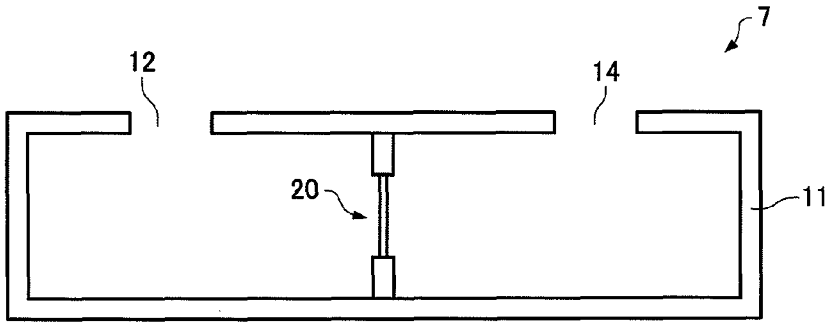
FIG. 18 is diagram illustrative of a microphone unit according to a modification of one embodiment of the invention.

FIG. 18 shows a microphone unit 7 according to a fifth modification of the embodiment of the invention.

In the microphone unit 7, the partition member 20 is disposed midway between the first and second through-holes 12 and 14, as shown in FIG. 18. Specifically, the distance between the first through-hole 12 and the partition member 20 is equal to the distance between the second through-hole 14 and the partition member 20. In the microphone unit 7, the partition member 20 may be disposed to equally divide the inner space 100 of the housing 10.

7.6. Sixth Modification

Figure 19:
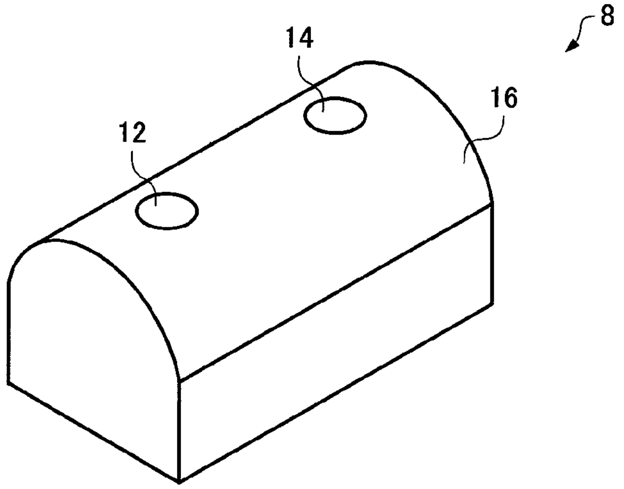
FIG. 19 is diagram illustrative of a microphone unit according to a modification of one embodiment of the invention.

FIG. 19 shows a microphone unit 8 according to a sixth modification of the embodiment of the invention.

In the microphone unit 8, the housing has a convex curved surface 16, as shown in FIG. 19. The first and second through-holes 12 and 14 are formed in the convex curved surface 16.

7.7. Seventh Modification

Figure 20:
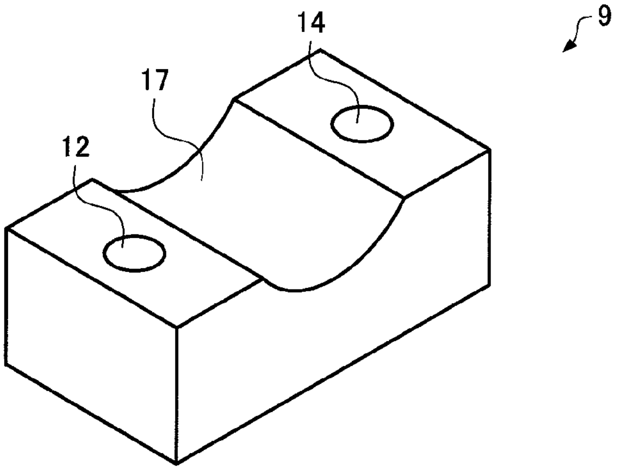
FIG. 20 is diagram illustrative of a microphone unit according to a modification of one embodiment of the invention.

FIG. 20 shows a microphone unit 9 according to a seventh modification of the embodiment of the invention.

In the microphone unit 9, the housing has a concave curved surface 17, as shown in FIG. 20. The first and second through-holes 12 and 14 may be disposed on either side of the concave curved surface 17. The first and second through-holes 12 and 14 may be formed in the concave curved surface 17.

7.8. Eighth Modification

Figure 21:
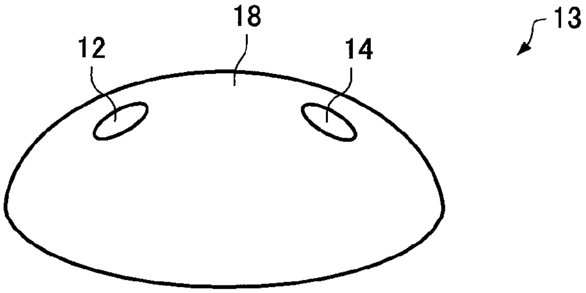
FIG. 21 is diagram illustrative of a microphone unit according to a modification of one embodiment of the invention.

FIG. 21 shows a microphone unit 13 according to an eighth modification of the embodiment of the invention.

In the microphone unit 13, the housing has a spherical surface 18, as shown in FIG. 21. The bottom surface of the spherical surface 18 may be circular or oval. Note that the shape of the bottom surface of the spherical surface 18 is not particularly limited. The first and second through-holes 12 and 14 are formed in the spherical surface 18.

The above-described effects can also be achieved using these microphone units. Therefore, an electrical signal which represents only a user's voice and does not contain a noise component can be obtained by acquiring an electrical signal based on vibrations of the diaphragm.

8. Configuration of Integrated Circuit Device

The configuration of an integrated circuit device 1001 according to one embodiment of the invention is described below with reference to FIGS. 22 to 24. The integrated circuit device 1001 according to this embodiment is configured as a voice input element (microphone element), and may be applied to a close-talking sound input device and the like.

Figure 22:
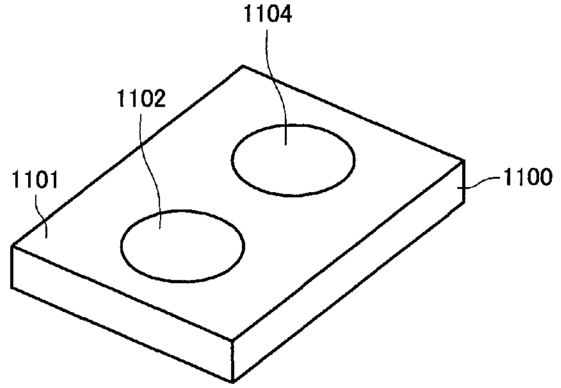
FIG. 22 is a diagram illustrative of an integrated circuit device.
Figure 23:
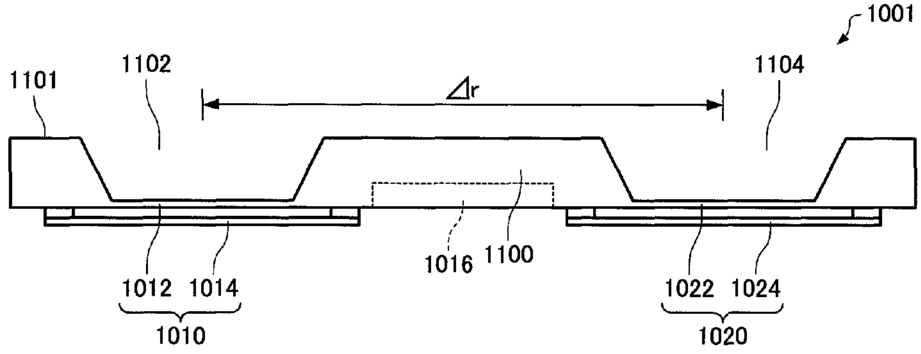
FIG. 23 is a diagram illustrative of an integrated circuit device.
Figure 24:
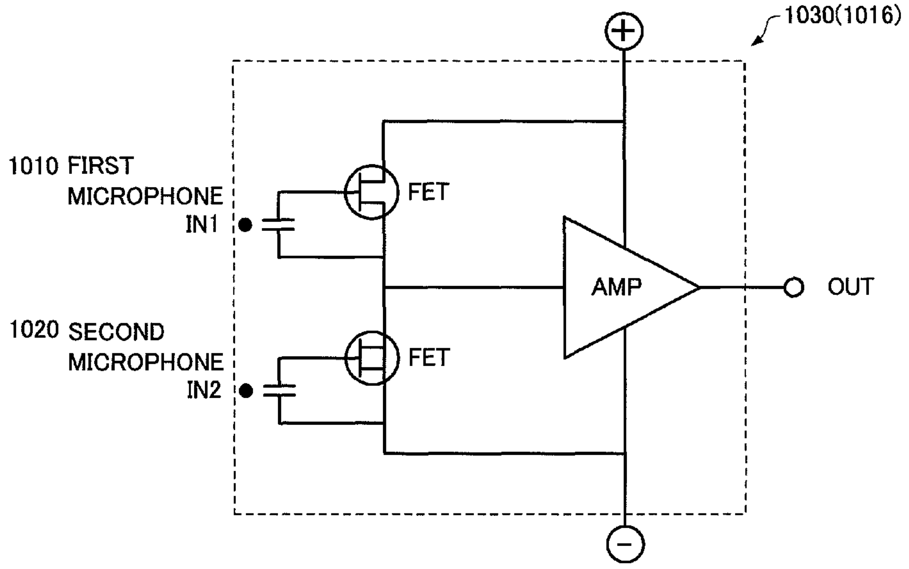
FIG. 24 is a diagram illustrative of an integrated circuit device.

As shown in FIGS. 22 and 23, the integrated circuit device 1001 according to this embodiment includes a semiconductor substrate 1100. FIG. 22 is an oblique view showing the integrated circuit device 1001 (semiconductor substrate 1100), and FIG. 23 is a cross-sectional view showing the integrated circuit device 1001. The semiconductor substrate 1100 may be a semiconductor chip. The semiconductor substrate 1100 may be a semiconductor wafer having a plurality of areas in which the integrated circuit device 1001 is formed. The semiconductor substrate 1100 may be a silicon substrate.

A first diaphragm 1012 is formed on the semiconductor substrate 1100. The first diaphragm 1012 may be the bottom of a first depression 1102 formed in a given side 1101 of the semiconductor substrate 1100. The first diaphragm 1012 is a diaphragm that forms a first microphone 1010. Specifically, the first diaphragm 1012 is formed to vibrate when sound waves are incident on the first diaphragm 1012. The first diaphragm 1012 makes a pair with a first electrode 1014 disposed opposite to the first diaphragm 1012 at an interval from the first diaphragm 1012 to form the first microphone 1010. When sound waves are incident on the first diaphragm 1012, the first diaphragm 1012 vibrates so that the distance between the first diaphragm 1012 and the first electrode 1014 changes. As a result, the capacitance between the first diaphragm 1012 and the first electrode 1014 changes. The sound waves (sound waves incident on the first diaphragm 1012) that cause the first diaphragm 1012 to vibrate can be converted into and output as an electrical signal (voltage signal) by outputting the change in capacitance as a change in voltage, for example. The voltage signal output from the first microphone 1010 is hereinafter referred to as a first voltage signal.

A second diaphragm 1022 is formed on the semiconductor substrate 1100. The second diaphragm 1022 may be the bottom of a second depression 1104 formed in the given side 1101 of the semiconductor substrate 1100. The second diaphragm 1022 is a diaphragm that forms a second microphone 1020. Specifically, the second diaphragm 1022 is formed to vibrate when sound waves are incident on the second diaphragm 1022. The second diaphragm 1022 makes a pair with a second electrode 1024 disposed opposite to the second diaphragm 1022 at an interval from the second diaphragm 1022 to form the second microphone 1020. The second microphone 1020 converts sound waves (sound waves incident on the second diaphragm 22) that cause the second diaphragm 1022 to vibrate into a voltage signal and outputs the voltage signal due to the same effects as those of the first microphone 1010. The voltage signal output from the second microphone 1020 is hereinafter referred to as a second voltage signal.

In this embodiment, the first diaphragm 1012 and the second diaphragm 1022 are formed on the semiconductor substrate 1100, and may be silicon films, for example. Specifically, the first microphone 1010 and the second microphone 1020 may be silicon microphones (Si microphones). A reduction in size and an increase in performance of the first microphone 1010 and the second microphone 1020 can be achieved by utilizing silicon microphones. The first diaphragm 1012 and the second diaphragm 1022 may be disposed so that the normals to the first diaphragm 1012 and the second diaphragm 1022 extend in parallel. The first diaphragm 1012 and the second diaphragm 1022 may be shifted in the direction perpendicular to the normals to the first diaphragm 1012 and the second diaphragm 1022.

The first electrode 1014 and the second electrode 1024 may be part of the semiconductor substrate 1100, or may be conductors disposed on the semiconductor substrate 1100. The first electrode 1014 and the second electrode 1024 may have a structure that is not affected by sound waves. For example, the first electrode 1014 and the second electrode 1024 may have a mesh structure.

An integrated circuit 1016 is formed on the semiconductor substrate 1100. The configuration of the integrated circuit 1016 is not particularly limited. For example, the integrated circuit 1016 may include an active element such as a transistor and a passive element such as a resistor.

The integrated circuit device 1001 according to this embodiment includes a differential signal generation circuit 1030. The differential signal generation circuit 1030 receives the first voltage signal and the second voltage signal, and generates (outputs) a differential signal that indicates the difference between the first voltage signal and the second voltage signal. The differential signal generation circuit 1030 generates the differential signal without performing an analysis process (e.g., Fourier analysis) on the first voltage signal and the second voltage signal. The differential signal generation circuit 1030 may be part of the integrated circuit 1016 formed on the semiconductor substrate 1100. FIG. 24 shows an example of a circuit diagram showing the differential signal generation circuit 1030. Note that the circuit configuration of the differential signal generation circuit 1030 is not limited to the configuration shown in FIG. 24.

The integrated circuit device 1001 according to this embodiment may further include a signal amplification circuit that amplifies the differential signal. The signal amplification circuit may be part of the integrated circuit 1016. Note that the integrated circuit device may not include the signal amplification circuit.

In the integrated circuit device 1001 according to this embodiment, the first diaphragm 1012, the second diaphragm 1022, and the integrated circuit 1016 (differential signal generation circuit 1030) are formed on a single semiconductor substrate 1100. The semiconductor substrate 1100 may be considered to be a micro-electro-mechanical system (MEMS). The first diaphragm 1012 and the second diaphragm 1022 can be accurately formed at a small distance by forming the first diaphragm 1012 and the second diaphragm 1022 on a single substrate (semiconductor substrate 1100).

The integrated circuit device 1001 according to this embodiment implements a function of removing a noise component utilizing the differential signal that indicates the difference between the first voltage signal and the second voltage signal, as described later. The first diaphragm 1012 and the second diaphragm 1022 may be disposed to satisfy specific conditions in order to implement the above function with high accuracy. The details of the conditions to be satisfied by the first diaphragm 1012 and the second diaphragm 1022 are described later. In this embodiment, the first diaphragm 1012 and the second diaphragm 1022 may be disposed so that a noise intensity ratio is smaller than an input voice intensity ratio. Therefore, the differential signal can be considered to be a signal that indicates a voice component from which a noise component is removed. The first diaphragm 1012 and the second diaphragm 1022 may be disposed so that a center-to-center distance $\Delta r$ between the first diaphragm 1012 and the second diaphragm 1022 is 5.2 mm or less, for example.

The integrated circuit device 1001 according to this embodiment may be configured as described above. According to this embodiment, an integrated circuit device that can implement a highly accurate noise removal function can be provided. The noise removal principle is described later.

9. Noise Removal Function

The noise removal principle of the integrated circuit device 1001 and conditions whereby the noise removal function is implemented are described below.

9.1. Noise Removal Principle

The noise removal principle is as follows.

Sound waves are attenuated during travel through a medium so that the sound pressure (i.e., the intensity/amplitude of the sound waves) decreases. Since a sound pressure is in inverse proportion to the distance from a sound source, a sound pressure P is given by the following expression with respect to the relationship with a distance R from a sound source, $$P = K\frac{1}{R} \quad (1)$$

where, k is a proportional constant. FIG. 5 shows a graph of the expression (1). As shown in FIG. 5, the sound pressure (amplitude of sound waves) is rapidly attenuated at a position near the sound source (left of the graph), and is gently attenuated as the distance from the sound source increases. The integrated circuit device according to this embodiment removes a noise component utilizing the above-mentioned attenuation characteristics.

Specifically, when applying the integrated circuit device 1001 to a close-talking sound input device, the user talks at a position closer to the integrated circuit device 1001 (first diaphragm 1012 and second diaphragm 1022) than the noise source. Therefore, the user's voice is attenuated to a large extent between the first diaphragm 1012 and the second diaphragm 1022 so that a difference in intensity occurs between the user's voice contained in the first voltage signal and the user's voice contained in the second voltage signal. On the other hand, since the source of a noise component is situated at a position away from the integrated circuit device 1001 as compared with the user's voice, the noise component is attenuated to only a small extent between the first diaphragm 1012 and the second diaphragm 1022. Therefore, a substantial difference in intensity does not occur between the noise contained in the first voltage signal and the noise contained in the second voltage signal. Accordingly, only the user's voice component produced near the integrated circuit device 1001 remains (i.e., noise is removed) by detecting the difference between the first voltage signal and the second voltage signal. Specifically, a voltage signal (differential signal) that represents only the user's voice component and does not contain the noise component can be acquired by detecting the difference between the first voltage signal and the second voltage signal. According to the integrated circuit device 1001, a signal that represents the user's voice from which noise is removed with high accuracy can be acquired by performing a simple process that merely generates the differential signal that indicates the difference between the two voltage signals.

However, sound waves contain a phase component. Therefore, the phase difference between the voice components and the noise components contained in the first voltage signal and the second voltage signal must be taken into consideration in order to implement a noise removal function with higher accuracy.

Specific conditions which should be satisfied by the integrated circuit device 1001 in order to implement the noise removal function by generating the differential signal are described below.

9.2. Specific Conditions which Should be Satisfied by Integrated Circuit Device

According to the integrated circuit device 1001, the differential signal that indicates the difference between the first voltage signal and the second voltage signal is considered to be an input voice signal which does not contain noise, as described above. According to the integrated circuit device 1001, it may be considered that the noise removal function has been implemented when a noise component contained in the differential signal has been reduced as compared with a noise component contained in the first voltage signal or the second voltage signal. Specifically, it may be considered that the noise removal function has been implemented when a noise intensity ratio that indicates the ratio of the intensity of a noise component contained in the differential signal to the intensity of a noise component contained in the first voltage signal or the second voltage signal has become smaller than a voice intensity ratio that indicates the ratio of the intensity of a voice component contained in the differential signal to the intensity of a user's voice component contained in the first voltage signal or the second voltage signal.

Specific conditions which should be satisfied by the integrated circuit device 1001 (first diaphragm 1012 and second diaphragm 1022) in order to implement the noise removal function are described below.

The sound pressures of voice incident on the first microphone 1010 and the second microphone 1020 (first diaphragm 1012 and second diaphragm 1022) are discussed below. When the distance from the sound source of an input voice (user's voice) to the first diaphragm 1012 is referred to as R, the sound pressures (intensities) P(S1) and P(S2) of the input voice which enters the first microphone 1010 and the second microphone 1020 are expressed as follows when disregarding the phase difference.

$$\begin{cases} P(S1) = K\frac{1}{R} & (2) \\ P(S2) = K\frac{1}{R+\Delta r} & (3) \end{cases}$$

Therefore, a voice intensity ratio ρ(P) that indicates the ratio of the intensity of the input voice component contained in the differential signal to the intensity of the input voice component obtained by the first microphone 10 is expressed as follows.

$$\begin{aligned} \rho(P) &= \frac{P(S1) - P(S2)}{P(S1)} \\ &= \frac{\Delta r}{R + \Delta r} \end{aligned} \quad (4)$$

When the integrated circuit device according to this embodiment is a microphone element utilized for a close-talking voice input device, the center-to-center distance Δr is considered to be sufficiently smaller than the distance R. Therefore, the expression (4) can be transformed as follows.

$$\rho(P) = \frac{\Delta r}{R} \quad (A)$$

Specifically, the voice intensity ratio when disregarding the phase difference of the input voice is given by the expression (A).

The sound pressures Q(S1) and Q(S2) of the user's voice are expressed as follows when taking the phase difference of the input voice into consideration, $$\begin{cases} Q(S1) = K\frac{1}{R}\sin\omega t & (5) \\ Q(S2) = K\frac{1}{R+\Delta r}\sin(\omega t - \alpha) & (6) \end{cases}$$

where, α is the phase difference.

The voice intensity ratio ρ(S) is then:

$$\rho(S) = \frac{|P(S1) - P(S2)|_{max}}{|P(S1)|_{max}} = \frac{\left|\frac{K}{R}\sin\omega t - \frac{K}{R+\Delta r}\sin(\omega t - \alpha)\right|_{max}}{\left|\frac{K}{R}\sin\omega t\right|_{max}} \quad (7)$$

The voice intensity ratio ρ(S) may then be expressed as follows based on the expression (7).

$$\rho(S) = \frac{\frac{K}{R}\left|\sin\omega t - \frac{1}{1+\Delta r/R}\sin(\omega t - \alpha)\right|_{max}}{\frac{K}{R}|\sin\omega t|_{max}} = \frac{1}{1+\Delta r/R}|(1+\Delta r/R)\sin\omega t - \sin(\omega t - \alpha)|_{max} = \frac{1}{1+\Delta r/R}\left|\sin\omega t - \sin(\omega t - \alpha) + \frac{\Delta r}{R}\sin\omega t\right|_{max} \quad (8)$$

In the expression (8), the term sin ωt−sin(ω−α) indicates the phase component intensity ratio, and the term Δr/R sin ωt indicates the amplitude component intensity ratio. Since the phase difference component as the input voice component serves as noise for the amplitude component, the phase component intensity ratio must be sufficiently smaller than the amplitude component intensity ratio in order to accurately extract the input voice (user's voice). Specifically, it is necessary that sin ωt−sin(ωt−α) and Δr/R sin ωt satisfy the following relationship.

$$\left|\frac{\Delta r}{R}\sin\omega t\right|_{max} > |\sin\omega t - \sin(\omega t - \alpha)|_{max} \quad (B)$$

Since sin ωt−sin(ω−α) is expressed as follows, $$\sin\omega t - \sin(\omega t - \alpha) = 2\sin\frac{\alpha}{2}\cdot\cos\left(\omega t - \frac{\alpha}{2}\right) \quad (9)$$

the expression (B) may then be written as follows.

$$\left|\frac{\Delta r}{R}\sin\omega t\right|_{max} > \left|2\sin\frac{\alpha}{2}\cdot\cos\left(\omega t - \frac{\alpha}{2}\right)\right|_{max} \quad (10)$$

Taking the amplitude component in the expression (10) into consideration, the integrated circuit device 1001 according to this embodiment must satisfy the following expression.

$$\frac{\Delta r}{R} > 2\sin\frac{\alpha}{2} \quad (C)$$

Since the center-to-center distance Δr is considered to be sufficiently smaller than the distance R, as described above, sin(α/2) can be considered to be sufficiently small and approximated as follows.

$$\sin\frac{\alpha}{2} \doteqdot \frac{\alpha}{2} \quad (11)$$

Therefore, the expression (C) can be transformed as follows.

$$\frac{\Delta r}{R} > \alpha \quad (D)$$

When the relationship between the phase difference α and the center-to-center distance Δr is expressed as follows, $$\alpha = \frac{2\pi\Delta r}{\lambda} \quad (12)$$

the expression (D) can be transformed as follows.

$$\frac{\Delta r}{R} > 2\pi\frac{\Delta r}{\lambda} > \frac{\Delta r}{\lambda} \quad (E)$$

Specifically, the integrated circuit device 1001 according to this embodiment must satisfy the relationship shown by the expression (E) in order to accurately extract the input voice (user's voice).

The sound pressures of noise incident on the first microphone 10 and the second microphone 20 (first diaphragm 12 and second diaphragm 22) are discussed below.

When the amplitudes of noise components obtained by the first microphone 10 and the second microphone 20 are referred to as A and A', sound pressures Q(N1) and Q(N2) of the noise are expressed as follows when taking a phase difference component into consideration.

$$\begin{cases} Q(N1) = A\sin\omega t & (13) \\ Q(N2) = A'\sin(\omega t - \alpha) & (14) \end{cases}$$

A noise intensity ratio ρ(N) that indicates the ratio of the intensity of the noise component contained in the differential signal to the intensity of the noise component obtained by the first microphone 10 is expressed as follows.

$$\rho(N) = \frac{|Q(N1) - Q(N2)|_{max}}{|Q(N1)|_{max}} = \frac{|A\sin\omega t - A'\sin(\omega t - \alpha)|_{max}}{|A\sin\omega t|_{max}} \quad (15)$$

The amplitudes (intensities) of noise components obtained by the first microphone 10 and the second microphone 20 are almost the same (i.e., A=A'), as described above. Therefore, the expression (15) can be transformed as follows.

$$\rho(N) = \frac{|\sin\omega t - \sin(\omega t - \alpha)|_{max}}{|\sin\omega t|_{max}} \quad (16)$$

The noise intensity ratio is expressed as follows.

$$\rho(N) = \frac{|\sin\omega t - \sin(\omega t - \alpha)|_{max}}{|\sin\omega t|_{max}} = |\sin\omega t - \sin(\omega t - \alpha)|_{max} \quad (17)$$

The expression (17) can be transformed as follows based on the expression (9).

$$\rho(N) = \left|\cos\left(\omega t - \frac{\alpha}{2}\right)\right|_{max} \cdot 2\sin\frac{\alpha}{2} = 2\sin\frac{\alpha}{2} \quad (18)$$

The expression (18) can be transformed as follows based on the expression (11).

$$\rho(N) = \alpha \quad (19)$$

The noise intensity ratio is expressed as follows based on the expression (D).

$$\rho(N) - \alpha < \frac{\Delta r}{R} \quad (F)$$

Δr/R indicates the amplitude component intensity ratio of the input voice (user's voice), as indicated by the expression (A). In the integrated circuit device 1001, the noise intensity ratio is smaller than the intensity ratio Δr/R of the input voice, as is clear from the expression (F).

According to the integrated circuit device 1001 (see the expression (B)) in which the phase component intensity ratio of the input voice is smaller than the amplitude component intensity ratio, the noise intensity ratio is smaller than the input voice intensity ratio (see the expression (F)). In other words, the integrated circuit device 1001 designed so that the noise intensity ratio becomes smaller than the input voice intensity ratio can implement a highly accurate noise removal function.

10. Method of Producing Integrated Circuit Device

A method of producing the integrated circuit device 1001 according to this embodiment is described below. In this embodiment, the integrated circuit device may be produced utilizing the relationship between a ratio Δr/λ that indicates the ratio of the center-to-center distance Δr between the first diaphragm 1012 and the second diaphragm 1022 to a wavelength λ of noise and the noise intensity ratio (intensity ratio based on the phase component of noise).

The intensity ratio based on the phase component of noise is given by the expression (18). Therefore, the decibel value of the intensity ratio based on the phase component of noise is expressed as follows.

$$20\log\rho(N) = 20\log\left|2\sin\frac{\alpha}{2}\right| \quad (20)$$

The relationship between the phase difference α and the intensity ratio based on the phase component of noise can be determined by substituting each value for α in the expression (20). FIG. 6 shows an example of data which indicates the relationship between the phase difference and the intensity ratio wherein the horizontal axis indicates α/2π and the vertical axis indicates the intensity ratio (decibel value) based on the phase component of noise.

The phase difference α can be expressed as a function of the ratio Δr/λ which indicates the ratio of the distance Δr to the wavelength λ, as indicated by the expression (A). Therefore, the vertical axis in FIG. 5 is considered to indicate the ratio Δr/λ. Specifically, FIG. 5 shows data which indicates the relationship between the intensity ratio based on the phase component of noise and the ratio Δr/λ.

In this embodiment, the integrated circuit device 1001 is produced utilizing the above data. FIG. 7 is a flowchart illustrative of a process of producing the integrated circuit device 1001 utilizing the above data.

First, data that indicates the relationship between the noise intensity ratio (intensity ratio based on the phase component of noise) and the ratio Δr/λ (refer to FIG. 6) is provided (step S10).

The noise intensity ratio is set depending on the application (step S12). In this embodiment, the noise intensity ratio must be set so that the intensity of noise decreases. Therefore, the noise intensity ratio is set to be 0 dB or less in this step.

A value Δr/λ corresponding to the noise intensity ratio is derived based on the data (step S14).

A condition which should be satisfied by the distance Δr is derived by substituting the wavelength of the main noise for λ (step S16).

As a specific example, consider a case where the frequency of the main noise is 1 KHz and an integrated circuit device which reduces the intensity of the noise by 20 dB is produced in an environment in which the wavelength of the noise is 0.347 m.

A necessary condition whereby the noise intensity ratio becomes 0 dB or less is as follows. As shown in FIG. 6, the noise intensity ratio can be set at 0 dB or less by setting the value Δr/λ at 0.16 or less. Specifically, the noise intensity ratio can be set at 0 dB or less by setting the distance Δr at 55.46 mm or less. This is a necessary condition for the integrated circuit device.

A condition whereby the intensity of noise having a frequency of 1 KHz is reduced by 20 dB is as follows. As shown in FIG. 6, the intensity of noise can be reduced by 20 dB by setting the value Δr/λ at 0.015. When λ=0.347 m, this condition is satisfied when the distance Δr is 5.199 mm or less. Specifically, an integrated circuit device having a noise removal function can be produced by setting the distance Δr at about 5.2 mm or less.

Since the integrated circuit device 1001 according to this embodiment is utilized for a close-talking voice input device, the distance between the sound source of a user's voice and the integrated circuit device 1001 (first diaphragm 1012 or second diaphragm 1022) is normally 5 cm or less. The distance between the sound source of a user's voice and the integrated circuit device 1001 (first diaphragm 1012 and second diaphragm 1022) can be controlled by changing the design of the housing. Therefore, the intensity ratio Δr/R of the input voice (user's voice) becomes larger than 0.1 (noise intensity ratio) so that the noise removal function is implemented.

Noise is not normally limited to a single frequency. However, since the wavelength of noise having a frequency lower than that of noise considered to the main noise is longer than that of the main noise, the value Δr/λ decreases, whereby the noise is removed by the integrated circuit device. The energy of sound waves is attenuated more quickly as the frequency becomes higher. Therefore, since the wavelength of noise having a frequency higher than that of noise considered to be the main noise is attenuated more quickly than the main noise, the effect of the noise on the integrated circuit device can be disregarded. Therefore, the integrated circuit device according to this embodiment exhibits an excellent noise removal function even in an environment in which noise having a frequency differing from that of noise considered to be the main noise is present.

This embodiment has been described taking an example in which noise enters the first diaphragm 1012 and the second diaphragm 1022 along a straight line which connects the first diaphragm 1012 and the second diaphragm 1022, as is clear from the expression (12). In this case, the apparent distance between the first diaphragm 1012 and the second diaphragm 1022 becomes a maximum, and the noise has the largest phase difference in the actual environment. Specifically, the integrated circuit device according to this embodiment can remove noise having the largest phase difference. Therefore, the integrated circuit device 1001 according to this embodiment can remove noise incident from all directions.

11. Effects

A summary of the effects of the integrated circuit device 1001 is given below.

As described above, the integrated circuit device 1001 can produce a voice component from which noise has been removed by merely generating the differential signal that indicates the difference between the voltage signals obtained by the first microphone 1010 and the second microphone 1020. Specifically, the voice input device can implement the noise removal function without performing a complex analytical calculation process. Therefore, an integrated circuit device (microphone element or voice input element) that can implement a highly accurate noise removal function can be provided by a simple configuration.

In particular, an integrated circuit device (microphone element or voice input element) which can implement a more accurate noise removal function with less phase distortion can be provided by setting the center-to-center distance Δr between the first and second diaphragms 1012 and 1022 at 5.2 mm or less.

According to the integrated circuit device 1001, the first diaphragm 1012 and the second diaphragm 1022 are disposed so that noise incident on the first diaphragm 1012 and the second diaphragm 1022 such that the noise intensity ratio based on the phase difference becomes a maximum can be removed. Therefore, the integrated circuit device 1001 can remove noise incident from all directions. According to this embodiment, an integrated circuit device that can remove noise incident from all directions can be provided.

The integrated circuit device 1001 can also remove a user's voice component incident on the integrated circuit device 1001 after being reflected by a wall or the like. Specifically, since a user's voice reflected by a wall or the like enters the integrated circuit device 1001 after traveling over a long distance, such a user's voice can be considered to be produced from a sound source positioned away from the integrated circuit device 1001 as compared with a normal user's voice. Moreover, since the energy of such a user's voice has been reduced to a large extent due to reflection, the sound pressure is not attenuated to a large extent between the first diaphragm 1012 and the second diaphragm 1022 in the same manner as a noise component. Therefore, the integrated circuit device 1001 also removes a user's voice component incident on the integrated circuit device 1001 after being reflected by a wall or the like in the same manner as noise (as one type of noise).

In the integrated circuit device 1001, the first diaphragm 1012, the second diaphragm 1022, and the differential signal generation circuit 1030 are formed on a single semiconductor substrate 1100. According to this configuration, the first diaphragm 1012 and the second diaphragm 1022 can be accurately formed while significantly reducing the center-to-center distance between the first diaphragm 1012 and the second diaphragm 1022. Therefore, an integrated circuit device with a small external shape and high noise removal accuracy can be provided.

A signal that represents the input voice and does not contain noise can be obtained utilizing the integrated circuit device 1001. Therefore, highly accurate speech (voice) recognition, voice authentication, and command generation can be implemented by utilizing the integrated circuit device 1001.

12. Voice Input Device Including Integrated Circuit Device

A voice input device 1002 including the integrated circuit device 1001 is described below.

Figure 25:
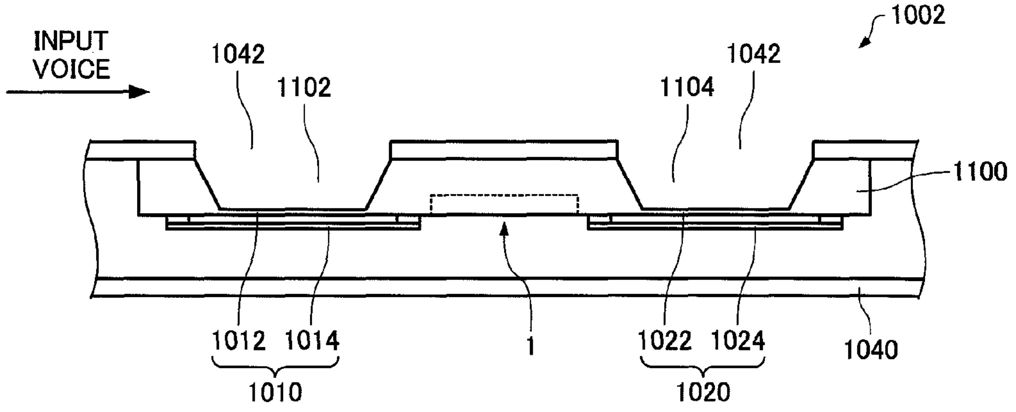
FIG. 25 is a diagram illustrative of a voice input device having an integrated circuit device.
Figure 26:
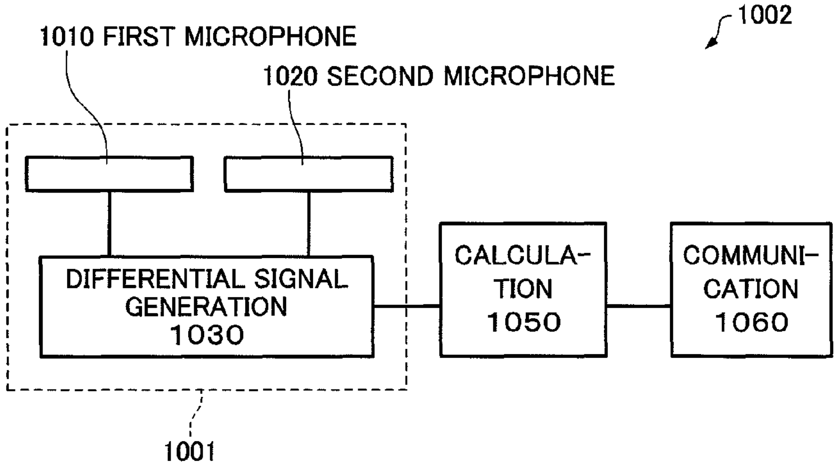
FIG. 26 is a diagram illustrative of a voice input device having an integrated circuit device.

The voice input device 2 has the following configuration. FIGS. 25 and 26 are views illustrative of the configuration of the voice input device 1002. The voice input device 1002 is a close-talking voice input device, and may be applied to voice communication instruments such as a portable telephone and a transceiver, information processing systems utilizing input voice analysis technology (e.g., voice authentication system, speech recognition system, command generation system, electronic dictionary, translation device, and voice input remote controller), recording devices, amplifier systems (loudspeaker), microphone systems, and the like.

FIG. 25 is a view illustrative of the structure of the voice input device 2002.

The voice input device 1002 includes a housing 1040. The housing 1040 may be a member that defines the external shape of the voice input device 1002. The basic position of the housing 1040 may be set in advance. This limits the travel path of the input voice (user's voice). Openings 52 for receiving the input voice (user's voice) may be formed in the housing 1040.

In the voice input device 1002, the integrated circuit device 1001 is provided in the housing 1040. The integrated circuit device 1001 may be provided in the housing 1040 so that the first depression 1102 and the second depression 1104 communicate with the openings 1042. The integrated circuit device 1001 may be provided in the housing 1040 so that the first diaphragm 1012 and the second diaphragm 1022 are shifted along the travel path of the input voice. The diaphragm disposed on the upstream side of the travel path of the input voice may be the first diaphragm 1012, and the diaphragm disposed on the downstream side of the travel path of the input voice may be the second diaphragm 1022.

The function of the voice input device 1002 is described below with reference to FIG. 26. FIG. 26 is a block diagram illustrative of the function of the voice input device 1002.

The voice input device 1002 includes the first microphone 1010 and the second microphone 1020. The first microphone 1010 and the second microphone 1020 output the first voltage signal and the second voltage signal, respectively.

The voice input device 1002 includes the differential signal generation circuit 1030. The differential signal generation circuit 1030 receives the first voltage signal and the second voltage signal output from the first microphone 1010 and the second microphone 1020, and generates the differential signal that indicates the difference between the first voltage signal and the second voltage signal.

The first microphone 1010, the second microphone 1020, and the differential signal generation circuit 1030 are formed on a single semiconductor substrate 1100.

The voice input device 1002 may include a calculation section 1050. The calculation section 1050 performs various calculation processes based on the differential signal generated by the differential signal generation circuit 1030. The calculation section 1050 may analyze the differential signal. The calculation section 1050 may specify a person who has produced the input voice by analyzing the differential signal (voice authentication process). The calculation section 1050 may specify the content of the input voice by analyzing the differential signal (voice recognition process). The calculation section 1050 may create various commands based on the input voice. The calculation section 1050 may amplify the differential signal. The calculation section 1050 may control the operation of a communication section 1060 described later. The calculation section 1050 may implement the above-mentioned functions by signal processing using a CPU and a memory.

The voice input device 1002 may further include the communication section 1060. The communication section 1060 controls communication between the voice input device and another terminal (e.g., portable telephone terminal or host computer). The communication section 1060 may have a function of transmitting a signal (differential signal) to another terminal through a network. The communication section 1060 may have a function of receiving a signal from another terminal through a network. A host computer may analyze the differential signal acquired through the communication section 1060, and perform various information processes such as a voice recognition process, a voice authentication process, a command generation process, and a data storage process. Specifically, the voice input device may form an information processing system with another terminal. In other words, the voice input device may be considered to be an information input terminal that forms an information processing system. Note that the voice input device may not include the communication section 1060.

The calculation section 1050 and the communication section 1060 may be disposed in the housing 1040 as a packaged semiconductor device (integrated circuit device). Note that the invention is not limited thereto. For example, the calculation section 1050 may be disposed outside the housing 1040. When the calculation section 1050 is disposed outside the housing 1040, the calculation section 1050 may acquire the differential signal through the communication section 1060.

The voice input device 1002 may further include a display device (e.g., display panel) and a sound output device (e.g., speaker). The voice input device according to this embodiment may further include an operation key for inputting operation information.

The voice input device 1002 may have the above-described configuration. The voice input device 1002 utilizes the integrated circuit device 1001 as a microphone element (voice input element). Therefore, the voice input device 1002 can acquire a signal that represents an input voice and does not contain noise, and can implement highly accurate speech recognition, voice authentication, and command generation.

When applying the voice input device 1102 to a microphone system, a user's voice output from a speaker is also removed as noise. Therefore, a microphone system in which howling rarely occurs can be provided.

13. Modification

A modification of this embodiment is described below.

Figure 27:
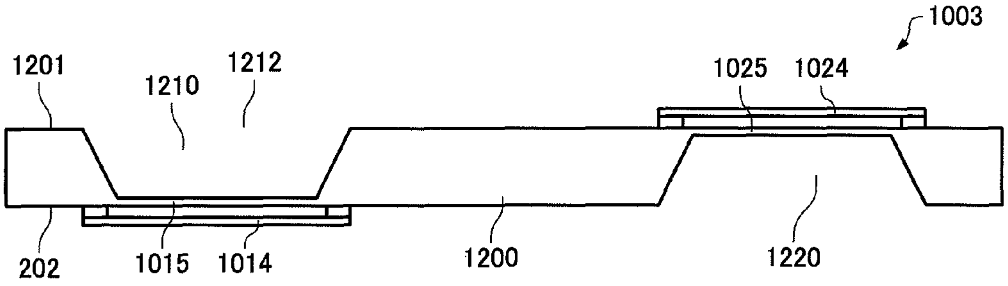
FIG. 27 is diagram illustrative of an integrated circuit device according to a modification of one embodiment of the invention.

FIG. 27 is a view illustrative of an integrated circuit device 1003.

As shown in FIG. 27, the integrated circuit device 1003 according to this modification includes a semiconductor substrate 1200. A first diaphragm 1012 and a second diaphragm 1022 are formed on the semiconductor substrate 1200. The first diaphragm 1015 forms the bottom of a first depression 1210 formed in a first side 1201 of the semiconductor substrate 1200. The second diaphragm 1025 forms the bottom of second depression 1220 formed in a second side 1202 (side opposite to the first side 1201) of the semiconductor substrate 1200. In the integrated circuit device 1003 (semiconductor substrate 1200), the first diaphragm 1015 and the second diaphragm 1025 are shifted along the normal direction (i.e., the direction of the thickness of the semiconductor substrate 1200). The first diaphragm 1015 and the second diaphragm 1025 may be disposed on the semiconductor substrate 1200 so that the distance between the first diaphragm 1015 and the second diaphragm 1025 along the normal direction is 5.2 mm or less. The first diaphragm 1015 and the second diaphragm 1025 may be disposed so that the center-to-center distance between the first diaphragm 1015 and the second diaphragm 1025 is 5.2 mm or less.

Figure 28:
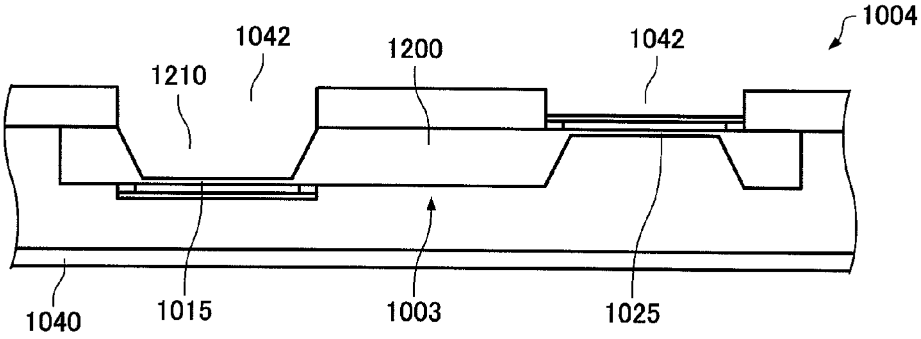
FIG. 28 is diagram illustrative of a voice input device having an integrated circuit device according to a modification of one embodiment of the invention.

FIG. 28 is a view illustrative of a voice input device 1004 including the integrated circuit device 1003. The integrated circuit device 1003 is provided in a housing 1040. As shown in FIG. 28, the integrated circuit device 1003 may be provided in the housing 1040 so that the first side 1201 faces the side of the housing 1040 in which openings 1042 are formed. The integrated circuit device 1003 may be provided in the housing 1040 so that the first depression 1210 communicates with the opening 1042 and the second diaphragm 1025 overlaps the opening 1042.

In this modification, the integrated circuit device 1003 may be disposed so that the center of an opening 1212 that communicates with the first depression 1210 is disposed at a position closer to the input voice source than the center of the second diaphragm 1025 (i.e., the bottom of the second depression 1220). The integrated circuit device 1003 may be disposed so that the input voice reaches the first diaphragm 1015 and the second diaphragm 1025 at the same time. For example, the integrated circuit device 1003 may be disposed so that the distance between the input voice source (model sound source) and the first diaphragm 1015 is equal to the distance between the model sound source and the second diaphragm 1025. The integrated circuit device 1003 may be disposed in a housing of which the basic position is set to satisfy the above-mentioned conditions.

The voice input device according to this modification can reduce the difference in incident time between the input voice (user's voice) incident on the first diaphragm 1015 and the input voice (user's voice) incident on the second diaphragm 1025. Therefore, the differential signal can be generated so that the differential signal does not contain the phase difference component of the input voice, whereby the amplitude component of the input voice can be accurately extracted.

Since sound waves are not diffused in the depression (first depression 1210), the amplitude of the sound waves is attenuated to only small extent. In this voice input device, the intensity (amplitude) of the input voice that causes the first diaphragm 1015 to vibrate is considered to be the same as the intensity of the input voice in the opening 1212. Therefore, even if the voice input device is configured so that the input voice reaches the first diaphragm 1015 and the second diaphragm 1025 at the same time, a difference in intensity occurs between the input voice that causes the first diaphragm 1015 to vibrate and the input voice that causes the second diaphragm 1025 to vibrate. Accordingly, the input voice can be extracted by acquiring the differential signal that indicates the difference between the first voltage signal and the second voltage signal.

In summary, the voice input device can acquire the amplitude component (differential signal) of the input voice so that noise based on the phase difference component of the input voice is excluded. This makes it possible to implement a highly accurate noise removal function.

Figure 29:
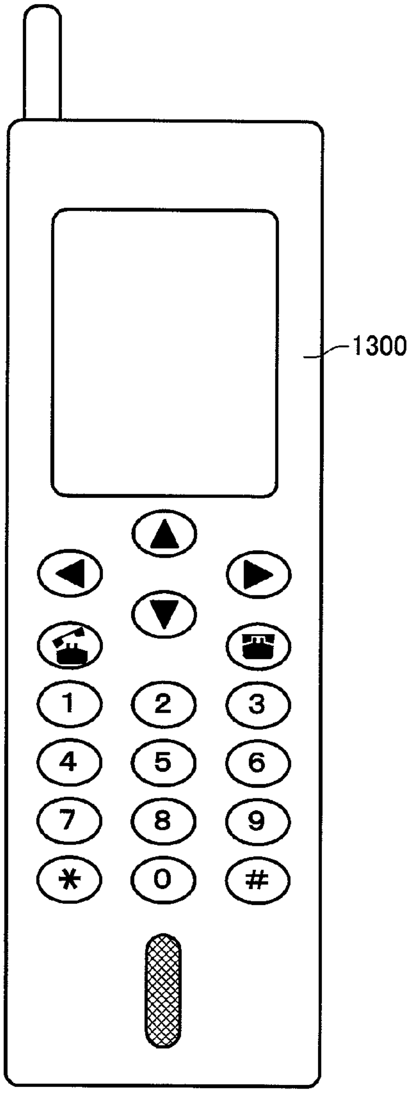
FIG. 29 is a diagram showing a portable telephone as an example of a voice input device having an integrated circuit device.
Figure 30:
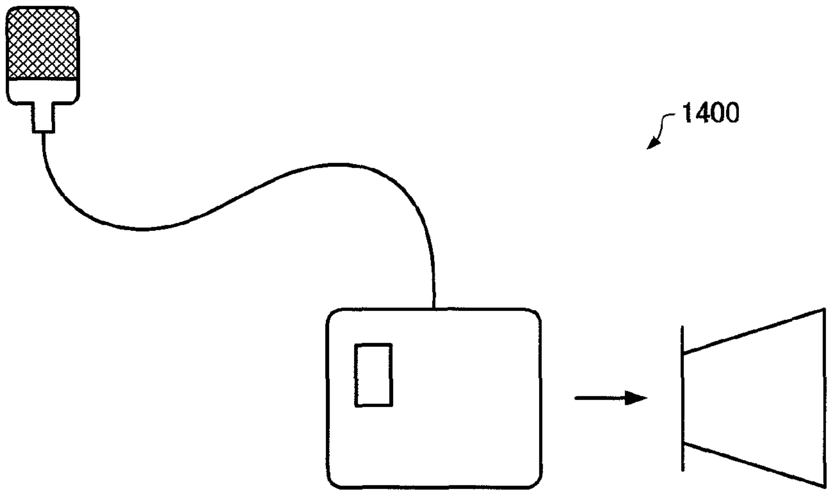
FIG. 30 is a diagram showing a microphone as an example of a voice input device having an integrated circuit device.
Figure 31:
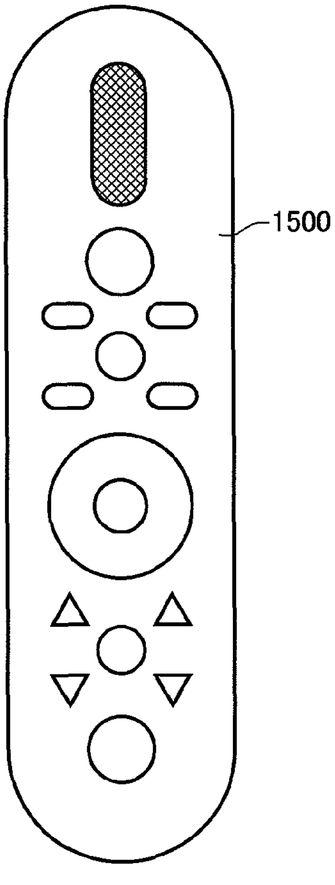
FIG. 31 is a diagram showing a remote controller as an example of a voice input device having an integrated circuit device.
Figure 32:
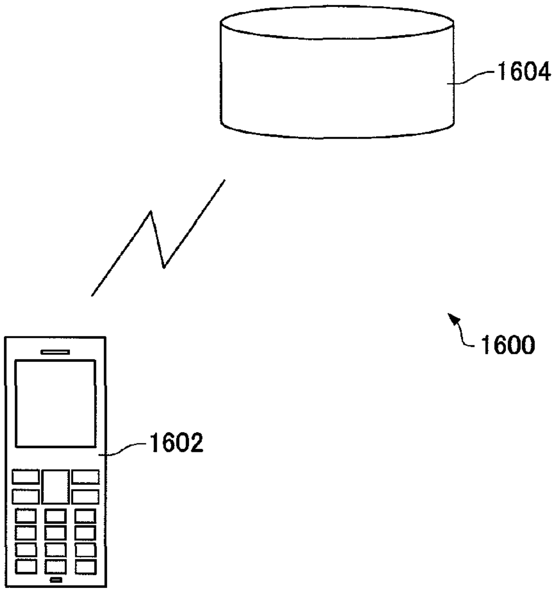
FIG. 32 is a schematic diagram showing an information processing system.

FIGS. 29 to 31 respectively show a portable telephone 1300, a microphone (microphone system) 1400, and a remote controller 1500 as examples of the voice input device according to one embodiment of the invention. FIG. 32 is a schematic view showing an information processing system 1600 including a voice input device 1602 (i.e., information input terminal) and a host computer 1604.

14. Configuration of Voice Input Device

Figure 33:
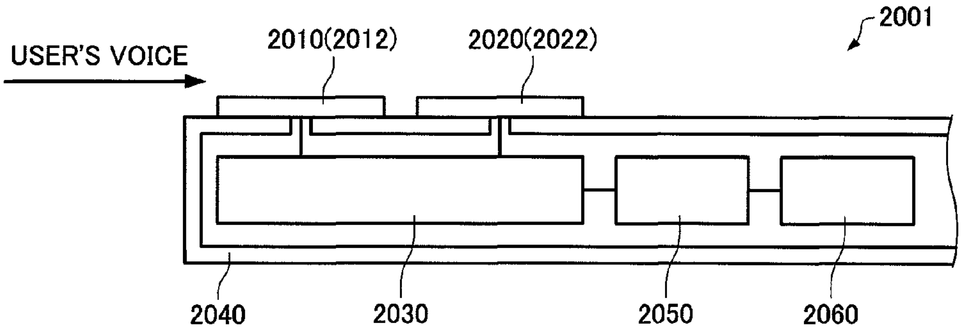
FIG. 33 is a diagram illustrative of a voice input device.
Figure 34:
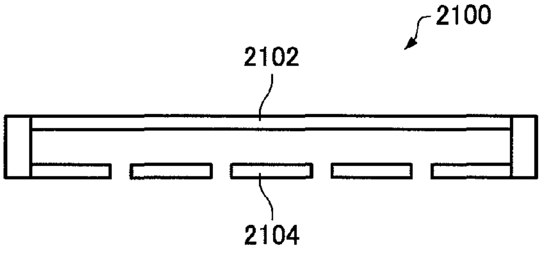
FIG. 34 is a diagram illustrative of a voice input device.

The configuration of a voice input device 2001 according to one embodiment of the invention is described below with reference to FIGS. 33 to 35. The voice input device 2001 is a close-talking voice input device, and may be applied to voice communication instruments such as a portable telephone and a transceiver, information processing systems utilizing input voice analysis technology (e.g., voice authentication system, speech recognition system, command generation system, electronic dictionary, translation device, and voice input remote controller), recording devices, amplifier systems (loudspeaker), microphone systems, and the like.

The voice input device 2001 according to this embodiment includes a first microphone 2010 including a first diaphragm 2012 and a second microphone 2020 including a second diaphragm 2022. The term "microphone" used herein refers to an electro-acoustic transducer that converts an acoustic signal into an electrical signal. The first second microphone 2010 and the second microphone 2020 may be converters that respectively output vibrations of the first diaphragm 2012 and the second diaphragm 2022 as voltage signals.

In the voice input device according to this embodiment, the first microphone 2010 generates a first voltage signal. The second microphone 2020 generates a second voltage signal. The voltage signals generated by the first microphone 2010 and the second microphone 2020 may be referred to as a first voltage signal and a second voltage signal, respectively.

The mechanisms of the first microphone 2010 and the second microphone 2020 are not particularly limited. FIG. 34 shows the structure of a capacitor-type microphone 2100 as an example of a microphone which may be applied to the first microphone 2010 and the second microphone 2020. The capacitor-type microphone 2100 includes a diaphragm 2102. The diaphragm 2102 is a film (thin film) that vibrates in response to sound waves. The diaphragm 2102 has conductivity and forms one electrode. The capacitor-type microphone 2100 includes an electrode 2104. The electrode 2104 is disposed opposite to the diaphragm 2102. The diaphragm 2102 and the electrode 2104 thus form a capacitor. When sound waves enter the capacitor-type microphone 2100, the diaphragm 2102 vibrates so that the distance between the diaphragm 2102 and the electrode 2104 changes, whereby the capacitance between the diaphragm 2102 and the electrode 2104 changes. The sound waves incident on the capacitor-type microphone 2100 can be converted into an electrical signal by outputting the change in capacitance as a change in voltage, for example. In the capacitor-type microphone 2100, the electrode 2104 may have a structure which is not affected by sound waves. For example, the electrode 2104 may have a mesh structure.

The microphone which may be applied to the invention is not limited to the capacitor-type microphone. A known microphone may be applied to the invention. For example, an electrokinetic (dynamic) microphone, an electromagnetic (magnetic) microphone, a piezoelectric (crystal) microphone, or the like may be applied as the first microphone 2010 and the second microphone 2020.

The first microphone 2010 and the second microphone 2020 may be silicon microphones (Si microphones) in which the first diaphragm 2012 and the second diaphragm 2022 are formed of silicon. A reduction in size and an increase in performance of the first microphone 2010 and the second microphone 2020 can be achieved by utilizing silicon microphones. In this case, the first microphone 2010 and the second microphone 2020 may be formed as one integrated circuit device. Specifically, the first microphone 2010 and the second microphone 2020 may be formed on a single semiconductor substrate. A differential signal generation section 2030 described later may also be formed on the same semiconductor substrate. Specifically, the first microphone 2010 and the second microphone 2020 may be formed as a micro-electro-mechanical system (MEMS). Note that the first microphone 2010 and second microphone 2020 may be formed as individual silicon microphones.

The voice input device according to this embodiment implements a function of removing a noise component utilizing a differential signal that indicates the difference between the first voltage signal and the second voltage signal, as described later. The first microphone and the second microphone (first diaphragm 2012 and second diaphragm 2022) are disposed to satisfy specific conditions in order to implement the above function. The details of the conditions to be satisfied by the first diaphragm 2012 and second diaphragm 2022 are described later. In this embodiment, the first diaphragm 2012 and the second diaphragm 2022 (first microphone 2010 and second microphone 2020) are disposed so that a noise intensity ratio is smaller than an input voice intensity ratio. Therefore, the differential signal can be considered to be a signal that indicates a voice component from which a noise component is removed. The first diaphragm 2012 and the second diaphragm 2022 may be disposed so that the center-to-center distance between the first diaphragm 2012 and the second diaphragm 2022 is 5.2 mm or less, for example.

In the voice input device according to this embodiment, the directions of the first diaphragm 2012 and the second diaphragm 2022 are not particularly limited. The first diaphragm 2012 and the second diaphragm 2022 may be disposed so that the normals to the first diaphragm 2012 and the second diaphragm 2022 extend in parallel. In this case, the first diaphragm 2012 and the second diaphragm 2022 may be disposed so that the first diaphragm 2012 and the second diaphragm 2022 are shifted in the direction perpendicular to the normal direction. For example, the first diaphragm 2012 and the second diaphragm 2022 may be disposed at an interval on the surface of a base (e.g., circuit board) (not shown). Alternatively, the first diaphragm 2012 and the second diaphragm 2022 may be disposed at an interval in the direction perpendicular to the normal direction. The first diaphragm 2012 and the second diaphragm 2022 may be disposed so that the normals to the first diaphragm 2012 and the second diaphragm 2022 do not extend in parallel. The first diaphragm 2012 and the second diaphragm 2022 may be disposed so that the normals to the first diaphragm 2012 and the second diaphragm 2022 intersect perpendicularly.

The voice input device according to this embodiment includes the differential signal generation section 2030. The differential signal generation circuit 2030 generates the differential signal that indicates the difference (voltage difference) between the first voltage signal obtained by the first microphone 2010 and the second voltage signal obtained by the second microphone 2020. The differential signal generation circuit 2030 generates the differential signal that indicates the difference between the first voltage signal and the second voltage signal without performing an analysis process (e.g., Fourier analysis) on the first voltage signal and the second voltage signal. The function of the differential signal generation section 2030 may be implemented by a dedicated hardware circuit (differential signal generation circuit), or may be implemented by signal processing using a CPU or the like.

The voice input device according to this embodiment may further include a signal amplification section that amplifies the differential signal. The differential signal generation section 2030 and the signal amplification section may be implemented by one control circuit. Note that the voice input device according to this embodiment may not include the signal amplification section.

Figure 35:
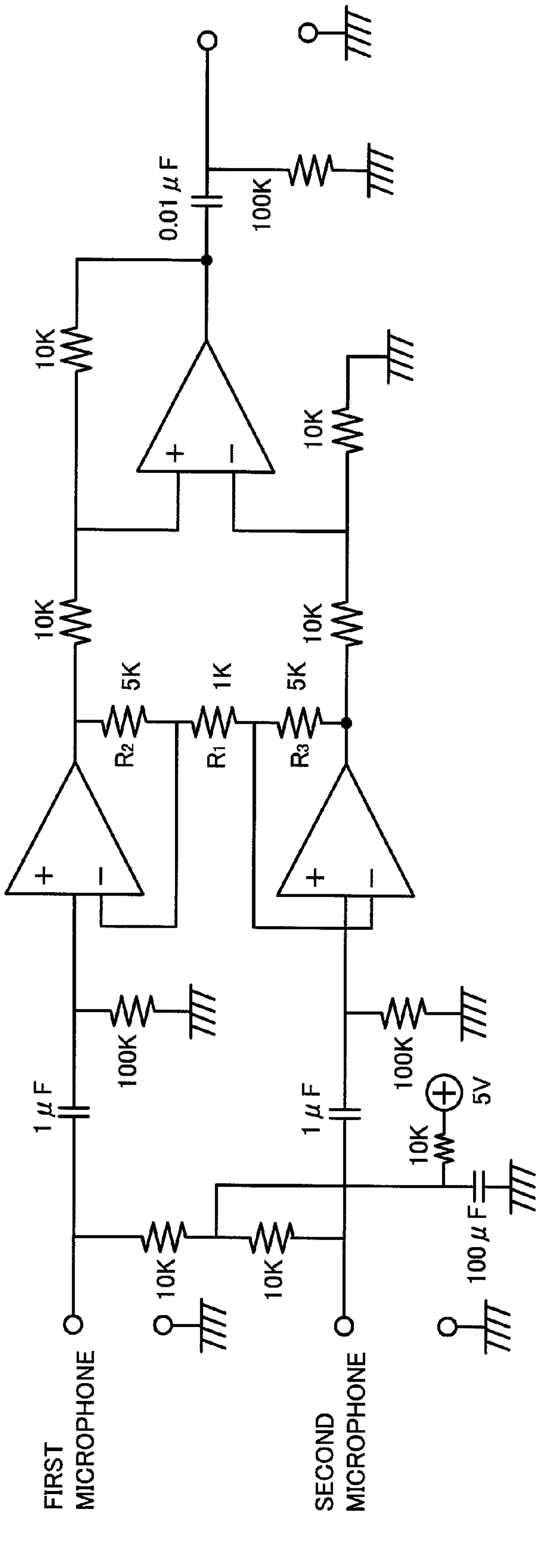
FIG. 35 is a diagram illustrative of a voice input device.

FIG. 35 shows an example of a circuit that can implement the differential signal generation section 2030 and the signal amplification section. The circuit shown in FIG. 35 receives the first voltage signal and the second voltage signal, and outputs a signal obtained by amplifying the differential signal that indicates the difference between the first voltage signal and the second voltage signal by a factor of 10. Note that the circuit configuration that implements the differential signal generation section 2030 and the signal amplification section is not limited thereto.

The voice input device according to this embodiment may include a housing 2040. In this case, the external shape of the voice input device may be defined by the housing 2040. The basic position of the housing 2040 may be set in advance. This limits the travel path of the input voice. The first diaphragm 2012 and the second diaphragm 2022 may be formed on the surface of the housing 2040. Alternatively, the first diaphragm 2012 and the second diaphragm 2022 may be disposed in the housing 2040 to face openings (voice incident openings) formed in the housing 2040. The first diaphragm 2012 and the second diaphragm 2022 may be disposed so that the first diaphragm 2012 and the second diaphragm 2022 differ in the distance from the sound source (incident voice model sound source). As shown in FIG. 33, the basic position of the housing 2040 may be set in advance so that the travel path of the input voice extends along the surface of the housing 2040, for example. The first diaphragm 2012 and the second diaphragm 2022 may be disposed along the travel path of the input voice. The diaphragm disposed on the upstream side of the travel path of the input voice may be the first diaphragm 2012, and the diaphragm disposed on the downstream side of the travel path of the input voice may be the second diaphragm 2022.

The voice input device according to this embodiment may further include a calculation section 2050. The calculation section 2050 performs various calculation processes based on the differential signal generated by the differential signal generation circuit 2030. The calculation section 2050 may analyze the differential signal. The calculation section 2050 may specify a person who has produced the input voice by analyzing the differential signal (voice authentication process). The calculation section 2050 may specify the content of the input voice by analyzing the differential signal (voice recognition process). The calculation section 2050 may create various commands based on the input voice. The calculation section 2050 may amplify the differential signal. The calculation section 2050 may control the operation of a communication section 2060 described later. The calculation section 2050 may implement the above-mentioned functions by signal processing using a CPU and a memory.

The calculation section 2050 may be disposed inside or outside the housing 2040. When the calculation section 2050 is disposed outside the housing 2040, the calculation section 2050 may acquire the differential signal through the communication section 2060.

The voice input device according to this embodiment may further include the communication section 2060. The communication section 2060 controls communication between the voice input device and another terminal (e.g., portable telephone terminal or host computer). The communication section 2060 may have a function of transmitting a signal (differential signal) to another terminal through a network. The communication section 2060 may have a function of receiving a signal from another terminal through a network. A host computer may analyze the differential signal acquired through the communication section 2060, and perform various information processes such as a voice recognition process, a voice authentication process, a command generation process, and a data storage process. Specifically, the voice input device may form an information processing system with another terminal. In other words, the voice input device may be considered to be an information input terminal that forms an information processing system. Note that the voice input device may not include the communication section 2060.

The voice input device according to this embodiment may further include a display device (e.g., display panel) and a sound output device (e.g., speaker). The voice input device according to this embodiment may further include an operation key for inputting operation information.

The voice input device according to this embodiment may have the above-described configuration. The voice input device generates a signal (voltage signal) that represents a voice component from which noise has been removed by a simple process that merely outputs the difference between the first voltage signal and the second voltage signal. According to this embodiment, a voice input device which can be reduced in size and has an excellent noise removal function can be provided. The principle, production method, and effects of the voice input device according to this embodiment are the same as those described in the sections 9 to 11.

15. Another Voice Input Device

Figure 36:
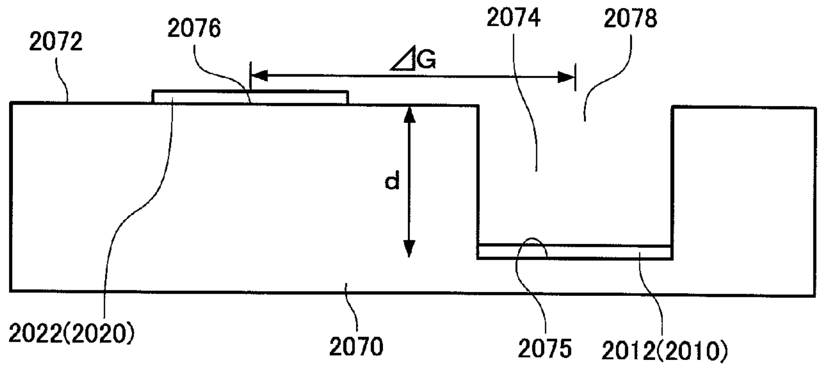
FIG. 36 is a diagram illustrative of a voice input device.

A voice input device according another embodiment of the invention is described below with reference to FIG. 36.

The voice input device according to this embodiment include a base 2070. A depression 2074 is formed in a main surface 2072 of the base 2070. In the voice input device according to this embodiment, the first diaphragm 2012 (first microphone 2010) is disposed on a bottom surface 2075 of the depression 2074, and the second diaphragm 2022 (second microphone 2020) is disposed on the main surface 2072 of the base 2070. The depression 2074 may extend perpendicularly to the main surface 2072. The bottom surface 2075 of the depression 2074 may be parallel to the main surface 2072. The bottom surface 2075 may perpendicularly intersect the depression 2074. The depression 2074 may have the same external shape as that of the first diaphragm 2012.

In this embodiment, the depression 2074 may have a depth smaller than the distance between an area 2076 and an opening 2078. Specifically, when the depth of the depression 2074 is referred to as d and the distance between the area 2076 and the opening 2078 is referred to as ΔG, $d \leqq \Delta G$ may be satisfied. The base 2070 may satisfy $2d = \Delta G$. The distance ΔG may be 5.2 mm or less. The base 2070 may be formed so that the center-to-center distance between the first diaphragm 2012 and the second diaphragm 2022 is 5.2 mm or less.

The base 2070 is provided so that an opening 2078 that communicates with the depression 2074 is disposed at a position closer to the input voice source than the area 2076 of the main surface 2072 in which the second diaphragm 2022 is disposed. The base 2070 is provided so that so that the input voice reaches the first diaphragm 2012 and the second diaphragm 2022 at the same time. For example, the base 2070 may be disposed so that the distance between the input voice sound source (model sound source) and the first diaphragm 2012 is equal to the distance between the model sound source and the second diaphragm 22. The base 2070 may be disposed in a housing of which the basic position is set to satisfy the above-mentioned conditions.

The voice input device according to this embodiment can reduce the difference in incident time between the input voice (user's voice) incident on the first diaphragm 2012 and the input voice (user's voice) incident on the second diaphragm 2022. Specifically, since the differential signal can be generated so that the differential signal does not contain the phase difference component of the input voice, the amplitude component of the input voice can be accurately extracted.

Since sound waves are not diffused in the depression 74, the amplitude of the sound waves is attenuated to only small extent. In this voice input device, the intensity (amplitude) of the input voice that causes the first diaphragm 2012 to vibrate is considered to be the same as the intensity of the input voice in the opening 2078. Therefore, even if the voice input device is configured so that the input voice reaches the first diaphragm 2012 and the second diaphragm 2022 at the same time, a difference in intensity occurs between the input voice that causes the first diaphragm 2012 to vibrate and the input voice that causes the second diaphragm 2022 to vibrate. Accordingly, the input voice can be extracted by acquiring the differential signal that indicates the difference between the first voltage signal and the second voltage signal.

In summary, the voice input device can acquire the amplitude component (differential signal) of the input voice so that noise based on the phase difference component of the input voice is excluded. This makes it possible to implement a highly accurate noise removal function.

Since the resonance frequency of the depression 2074 can be set at a high value by setting the depth of the depression 2074 to be equal to or less than ΔG (5.2 mm), a situation in which resonance noise is generated in the depression 2074 can be prevented.

Figure 37:
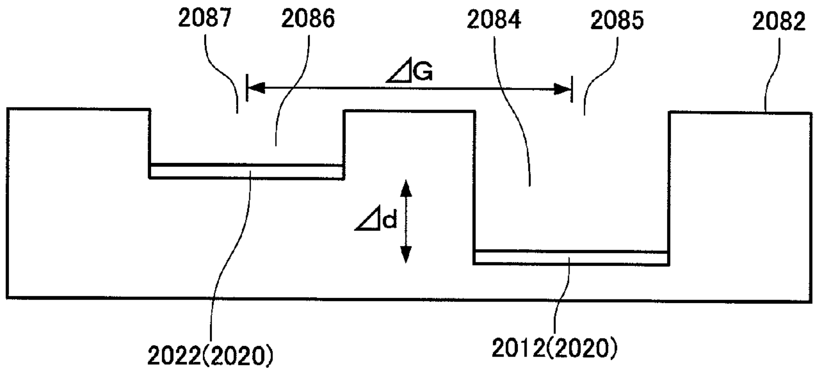
FIG. 37 is a diagram illustrative of a voice input device.

FIG. 37 shows a modification of the voice input device according to this embodiment.

The voice input device according to this embodiment include a base 2080. A first depression 2084 and a second depression 2086 shallower than the first depression 2084 are formed in a main surface 2082 of the base 2080. The difference Δd in depth between the first depression 2084 and the second depression 2086 may be the distance ΔG between a first opening 2085 that communicates with the first depression 2084 and a second opening 2087 that communicates with the second depression 2086. The first diaphragm 2012 is disposed on the bottom surface of the first depression 2084, and the second diaphragm 2022 is disposed on the bottom surface of the second depression 2086.

This voice input device also achieves the above-mentioned effects and can implement a highly accurate noise removal function.

16. Voice Input-Output Device and Communication Device

Figure 38:
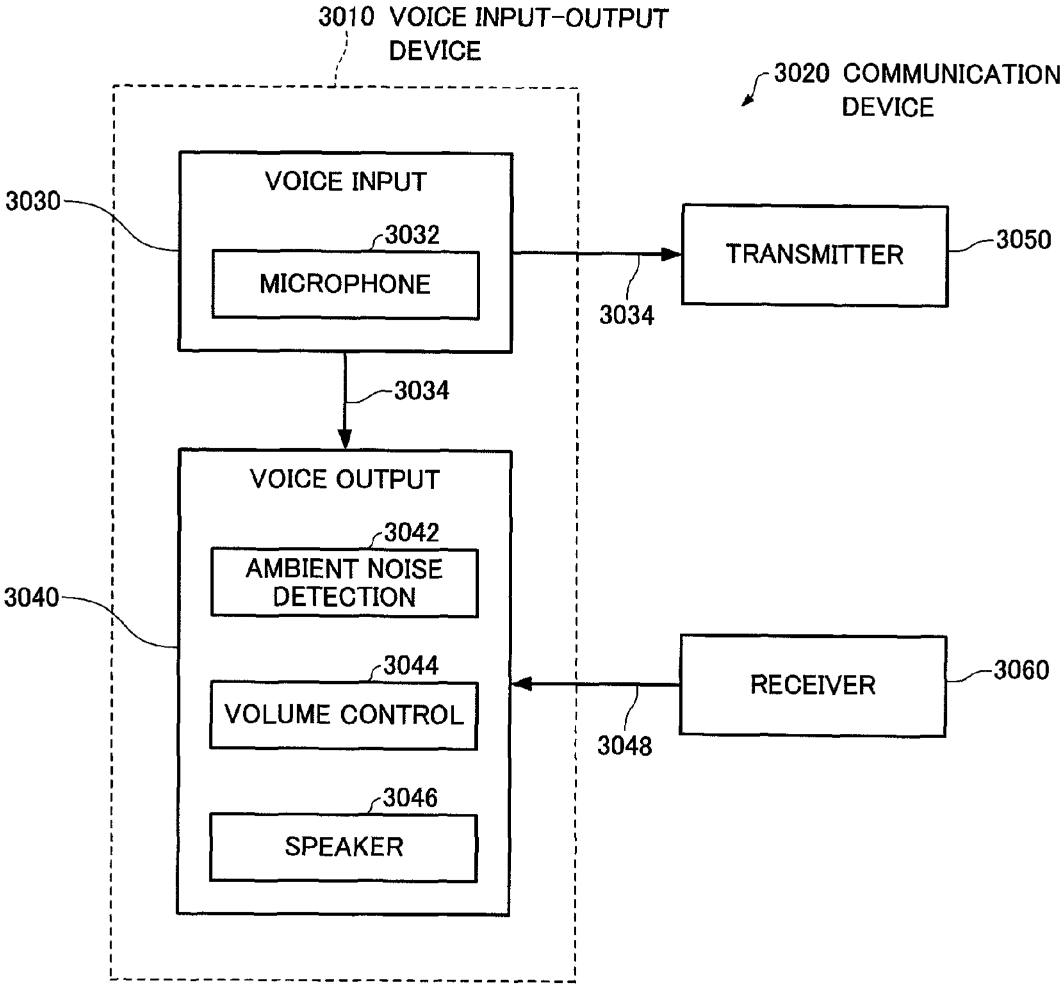
FIG. 38 is a functional diagram showing a voice input-output device and a communication device.

FIG. 38 is a functional block diagram showing a voice input-output device 3010 and a communication device 3020 according to one embodiment of the invention.

The voice input-output device 3010 according to this embodiment includes a voice input section 3030 that generates a first voice signal 3034 based on an input from a microphone 3032, and a voice output section 3040 that outputs a voice from a speaker 3046 based on a second voice signal 3048.

The voice input section 3030 may include a microphone unit that includes a housing that has an inner space, a partition member that is provided in the housing and divides the inner space into a first space and a second space, the partition member being at least partially formed of a diaphragm, and an electrical signal output circuit that outputs an electrical signal (i.e., first voice signal) based on vibrations of the diaphragm, a first through-hole through which the first space communicates with an outer space of the housing and a second through-hole through which the second space communicates with the outer space being formed in the housing. The microphone unit may be implemented by the configuration described with reference to FIGS. 1 to 21.

The voice input section 3030 may include an integrated circuit device that includes a semiconductor substrate provided with a first diaphragm that forms a first microphone, a second diaphragm that forms a second microphone, and a differential signal generation circuit that receives a first voltage signal acquired by the first microphone and a second voltage signal acquired by the second microphone and generates the first voice signal based on a differential signal that indicates the difference between the first voltage signal and the second voltage signal. The integrated circuit device may be implemented by the configuration described with reference to FIGS. 22 to 28.

The voice input section 3030 may include a first microphone including a first diaphragm, a second microphone including a second diaphragm, and a differential signal generation circuit that generates the first voice signal based on a differential signal that indicates the difference between a first voltage signal acquired by the first microphone and a second voltage signal acquired by the second microphone, wherein the first diaphragm and the second diaphragm may be disposed so that a noise intensity ratio that indicates the ratio of the intensity of a noise component contained in the differential signal to the intensity of a noise component contained in the first voltage signal or the second voltage signal is smaller than an input voice intensity ratio that indicates the ratio of the intensity of an input voice component contained in the differential signal to the intensity of an input voice component contained in the first voltage signal or the second voltage signal. The voice input section 3030 may be implemented by the configuration described with reference to FIGS. 33 to 37.

The voice input section 3030 may be a hands-free voice input section that generates the first voice signal based on an input from the microphone.

The voice output section 3040 may include an ambient noise detection section 3042 that detects ambient noise during a call based on the first voice signal 3034, and a volume control section 3044 that controls the volume of the speaker 3046 based on the degree of the detected ambient noise.

The voice output section 3040 and the voice input section 2030 may be separately provided.

According to this embodiment, a voice input-output device can be provided which controls the volume of the speaker successively or stepwise corresponding to the degree of ambient noise obtained from the voice input microphone even when used in a noise-containing environment so that a person who inputs a voice can easily listen to sound output from the speaker (e.g., a telephone call is facilitated).

The microphone easily and effectively reduces impact sound which directly and indirectly acts on the instrument. Specifically, sound which is propagated in a solid can be removed in addition to sound which is propagated in the air. Since the sound propagation velocity in a solid is much faster (about ten times) than the sound propagation velocity in the air, impact sound (noise) applied to a solid provided with the microphone reaches the diaphragm almost at the same time as noise which is propagated in the air. Therefore, the impact sound can be removed in the same manner as noise which is propagated in the air.

Accordingly, an unpleasant echo phenomenon in which sound produced from a speaker is propagated in a housing or a solid of a device to reach a microphone, and then returns to the intended party as a sound echo can be effectively prevented.

Moreover, since the microphone effectively reduces howling which occurs between the microphone and the speaker, a high-performance hands-free amplifier communication device can be provided by incorporating the microphone in a hands-free telephone provided on a desk, for example.

According to this embodiment, since impact noise or the like directly or indirectly applied to the microphone can be effectively reduced, an instrument which exhibits excellent performance even in the presence of unpleasant impact noise which is difficult to remove can be provided by incorporating the microphone in a hands-free voice input-output device.

The same effects as described above can also be achieved by incorporating the microphone in a keyboard of a personal computer, a robot, a digital recorder, a hearing aid, and the like.

Moreover, since the microphone effectively reduces howling which occurs between the microphone and the speaker, a novel voice input-output device which is affected by a noise-containing environment to only a small extent can be provided.

The communication device 3020 according to this embodiment includes the voice input-output device 3010, a transmitter section 3050 that transmits a first voice signal 3034 generated by the voice input section 3030 to a device of the intended party, and a receiver section 3060 that receives a second voice signal 3048 transmitted from the device of the intended party.

For example, the center-to-center distance between the first and second through-holes or the center-to-center distance between the first and second diaphragms may be set in such a range that a sound pressure when using the diaphragm as a differential microphone is equal to or less than a sound pressure when using the diaphragm as a single microphone with respect to sound in a frequency band equal to or less than 10 kHz.

The first and second through-holes or the first and second diaphragms may disposed along a travel direction of sound (e.g., voice) from a sound source, and the center-to-center distance between the first and second through-holes or the center-to-center distance between the first and second diaphragms may be set in such a range that a sound pressure when using the diaphragm as a differential microphone is equal to or less than a sound pressure when using the diaphragm as a single microphone with respect to sound from the travel direction.

A delay distortion removal effect of the voice input device 1 is described below.

As described above, the user's voice intensity ratio ρ(S) is given by the following expression (8).

$$\rho(S) = \frac{\frac{K}{R}\left|\sin\omega t - \frac{1}{1+\Delta r/R}\sin(\omega t-\alpha)\right|_{max}}{\frac{K}{R}|\sin\omega t|_{max}} = \frac{1}{1+\Delta r/R}|(1+\Delta r/R)\sin\omega t - \sin(\omega t-\alpha)|_{max} = \frac{1}{1+\Delta r/R}\left|\sin\omega t - \sin(\omega t-\alpha) + \frac{\Delta r}{R}\sin\omega t\right|_{max} \tag{8}$$

A phase component $\rho(S)_{phase}$ of the user's voice intensity ratio ρ(S) is a term of sin ωt−sin(ωt−α). When the following expressions are substituted in the expression (8), $$\sin\omega t - \sin(\omega t-\alpha) = 2\sin\frac{\alpha}{2}\cdot\cos\left(\omega t - \frac{\alpha}{2}\right) \tag{9}$$

$$\frac{1}{1+\Delta r/R} \doteqdot 1$$

the phase component $\rho(S)_{phase}$ of the user's voice intensity ratio ρ(S) is given by the following expression.

$$\rho(S)_{phase} = \left|\cos\left(\omega t - \frac{\alpha}{2}\right)\right|_{max}\cdot 2\sin\frac{\alpha}{2} = 2\sin\frac{\alpha}{2} \tag{21}$$

Therefore, the decibel value of the intensity ratio based on the phase component $\rho(S)_{phase}$ of the user's voice intensity ratio ρ(S) is given by the following expression.

$$20\log\rho(S)_{phase} = 20\log\left|2\sin\frac{\alpha}{2}\right| \tag{22}$$

The relationship between the phase difference α and the intensity ratio based on the phase component of the user's voice can be determined by substituting each value for α in the expression (22).

Figure 39:
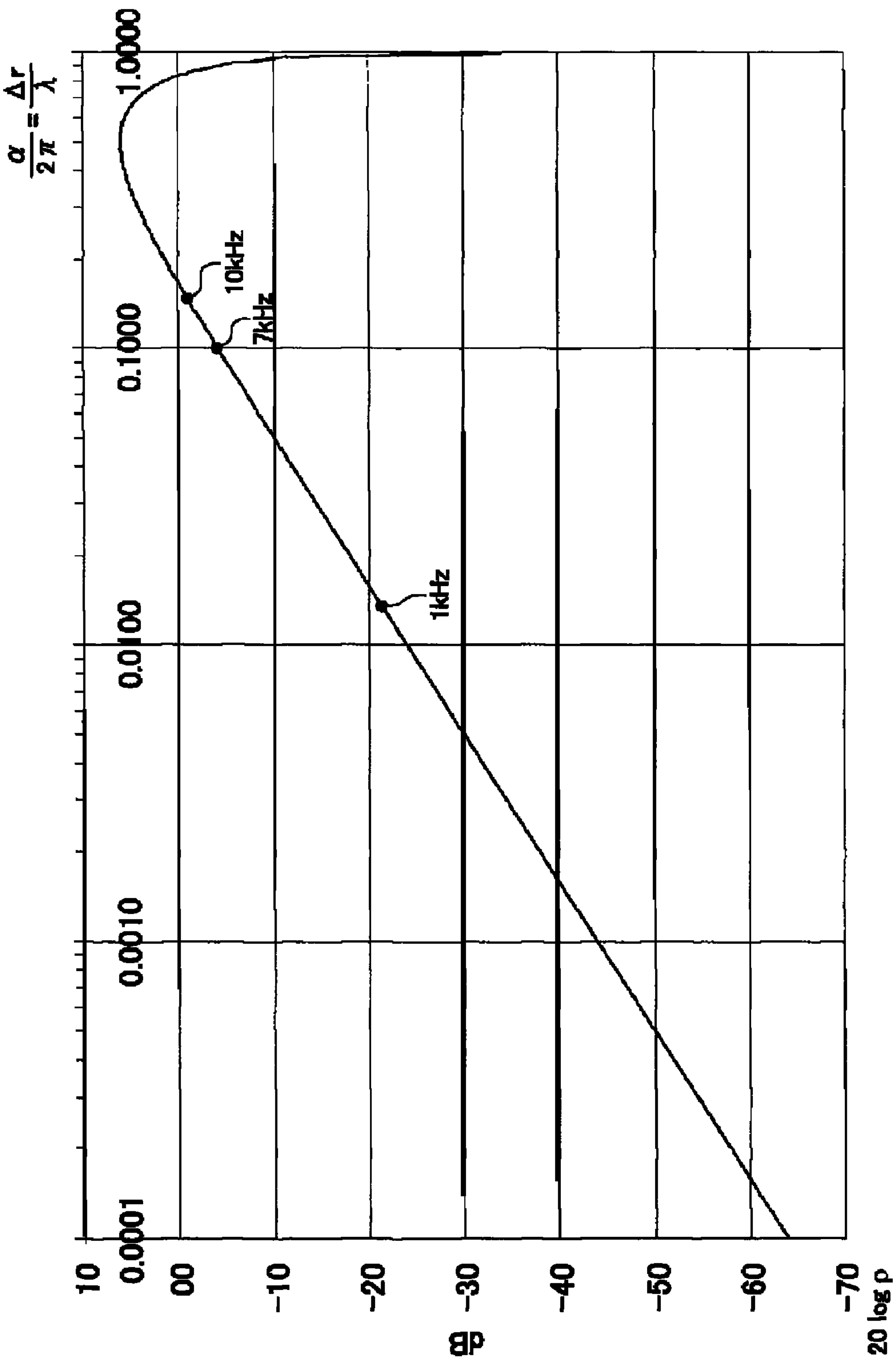
FIG. 39 is a graph for describing the distribution of a voice intensity ratio ρ when the microphone-microphone distance is 5 mm.
Figure 40:
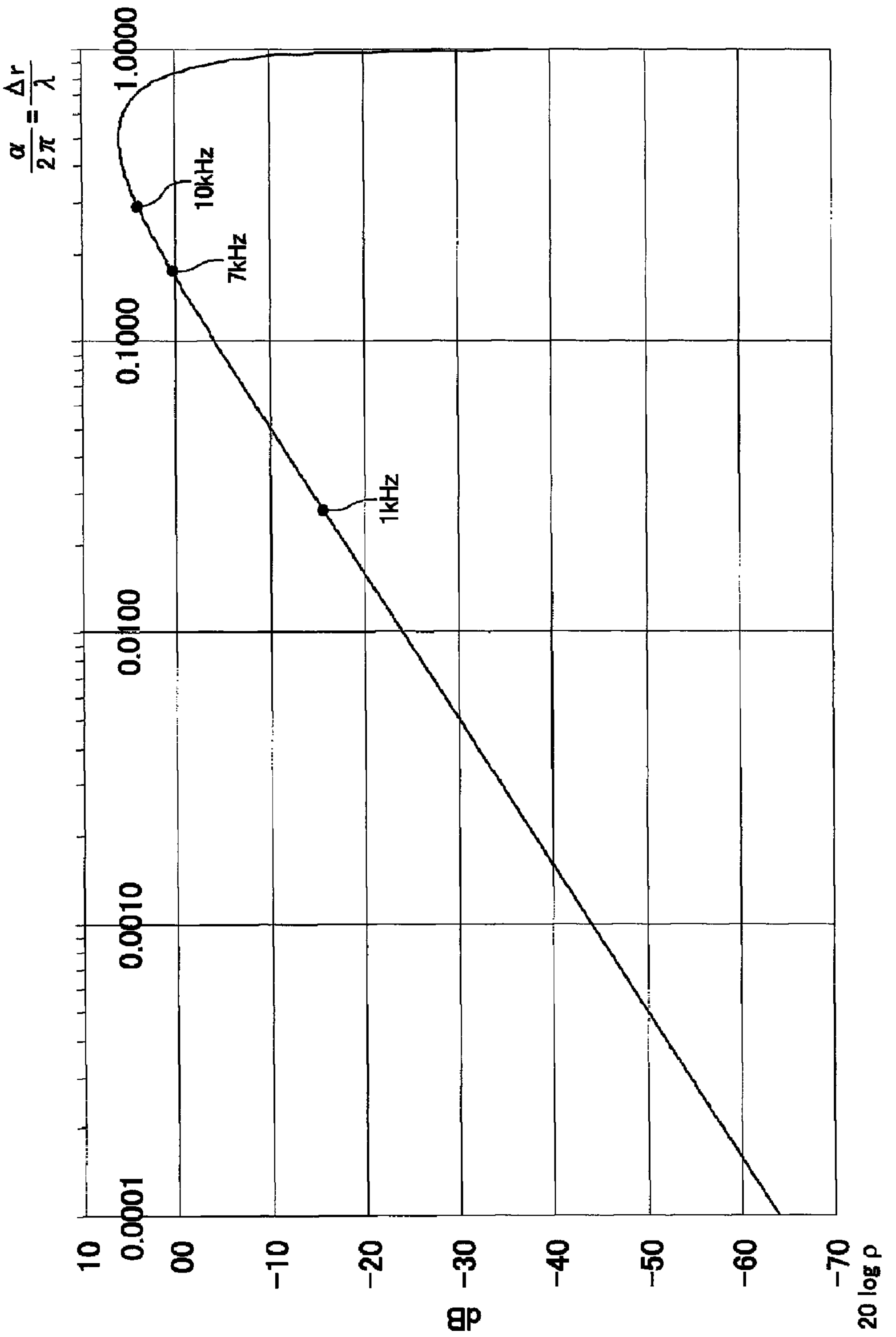
FIG. 40 is a graph for describing the distribution of a voice intensity ratio ρ when the microphone-microphone distance is 10 mm.
Figure 41:
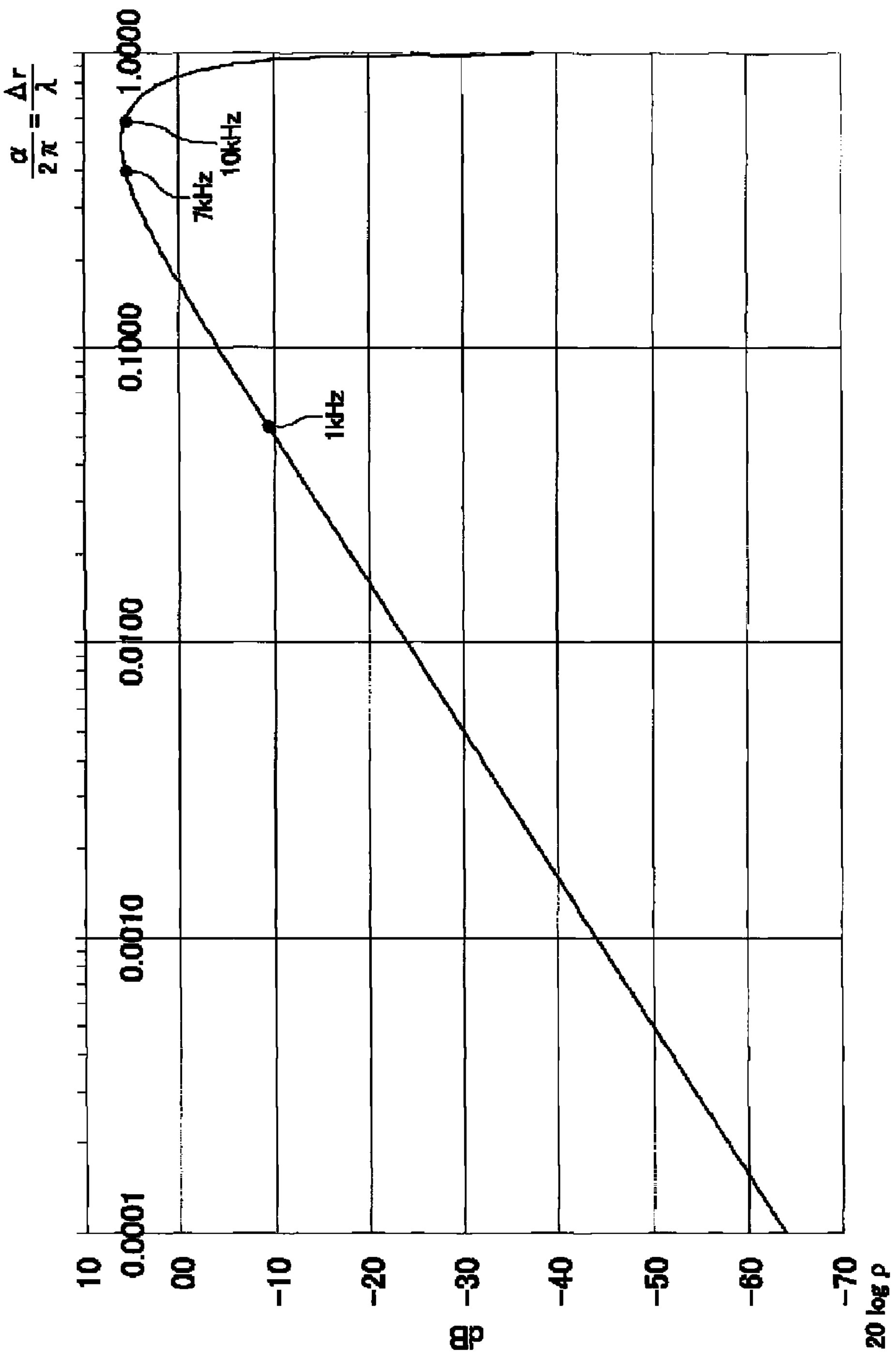
FIG. 41 is a graph for describing the distribution of a voice intensity ratio ρ when the microphone-microphone distance is 20 mm.

FIGS. 39 to 41 are graphs illustrative of the relationship between the microphone-microphone distance and a phase component $\rho(S)_{phase}$ of a user's voice intensity ratio ρ(S). In FIGS. 39 to 41, the horizontal axis indicates the ratio Δr/λ and the vertical axis indicates the phase component $\rho(S)_{phase}$ of the user's voice intensity ratio ρ(S). The term "the phase component $\rho(S)_{phase}$ of the user's voice intensity ratio ρ(S)" refers to a phase component of a sound pressure ratio of a differential microphone and a single microphone (an intensity ratio based on a phase component of a user's voice). A point at which the sound pressure when using the microphone forming the differential microphone as a single microphone is equal to the differential sound pressure is 0 dB.

Specifically, the graphs shown in FIGS. 39 to 41 indicate a change in differential sound pressure corresponding to the ratio Δr/λ. It is considered that a delay distortion (noise) occurs to a large extent in the area equal to or higher than 0 dB.

The current telephone line is designed for a voice frequency band of 3.4 kHz, but a voice frequency band of 7 kHz or more, or preferably of 10 kHz is required for a higher-quality voice communication. Influence of delay distortion for a voice frequency band of 10 kHz will be considered below.

FIG. 39 shows the distribution of the phase component $\rho(S)_{phase}$ of the user's voice intensity ratio ρ(S) when collecting sound at a frequency of 1 kHz, 7 kHz, or 10 kHz using the differential microphone when the microphone-microphone distance (Δr) is 5 mm.

As shown in FIG. 39, when the microphone-microphone distance is 5 mm, the phase component $\mu(S)_{phase}$ of the user's voice intensity ratio ρ(S) of sound at a frequency of 1 kHz, 7 kHz, or 10 kHz is equal to or less than 0 dB.

FIG. 40 shows the distribution of the phase component $\rho(S)_{phase}$ of the user's voice intensity ratio ρ(S) when collecting sound at a frequency of 1 kHz, 7 kHz, or 10 kHz using the differential microphone when the microphone-microphone distance (Δr) is 10 mm.

As shown in FIG. 40, when the microphone-microphone distance is 10 mm, the phase component $\rho(S)_{phase}$ of the user's voice intensity ratio ρ(S) of sound at a frequency of 1 kHz or 7 kHz is equal to or less than 0 dB. However, the phase component $\rho(S)_{phase}$ of the user's voice intensity ratio ρ(S) of sound at a frequency of 10 kHz is equal to or higher than 0 dB so that a delay distortion (noise) increases.

FIG. 41 shows the distribution of the phase component $\rho(S)_{phase}$ of the user's voice intensity ratio ρ(S) when collecting sound at a frequency of 1 kHz, 7 kHz, or 10 kHz using the differential microphone when the microphone-microphone distance (Δr) is 20 mm.

As shown in FIG. 41, when the microphone-microphone distance is 20 mm, the phase component $\rho(S)_{phase}$ of the user's voice intensity ratio ρ(S) of sound at a frequency of 1 kHz is equal to or less than 0 dB. However, the phase component $\rho(S)_{phase}$ of the user's voice intensity ratio ρ(S) of sound at a frequency of 7 kHz or 10 kHz is equal to or higher than 0 dB so that a delay distortion (noise) increases.

Therefore, a voice input device which can accurately extract speech sound up to a 10 kHz frequency band and can significantly reduce distant noise can be implemented by setting the microphone-microphone distance (a center-to-center distance between the first and second through-holes or a center-to-center distance between the first and second diaphragms) at about 5 mm to about 6 mm (5.2 mm or less in detail).

The phase distortion of the user's voice is reduced by reducing the microphone-microphone distance so that fidelity is improved. On the other hand, the SN ratio decreases due to a decrease in the output level of the differential microphone. Therefore, the microphone-microphone distance has an optimum range for practical applications.

In this embodiment, a voice input device which accurately extracts speech sound up to a 10 kHz frequency band, keeps the SN ratio of a practical level and significantly reduces distant noise can be implemented by setting the center-to-center distance between the first and second through-holes or the center-to-center distance between the first and second diaphragms at about 5 mm to about 6 mm (5.2 mm or less in detail).

FIGS. 42A and 42B to FIGS. 50A and 50B are diagrams illustrative of the directivity of the differential microphone with respect to a sound source frequency, the microphone-microphone distance, and the microphone-sound source distance.

Figure 42A:
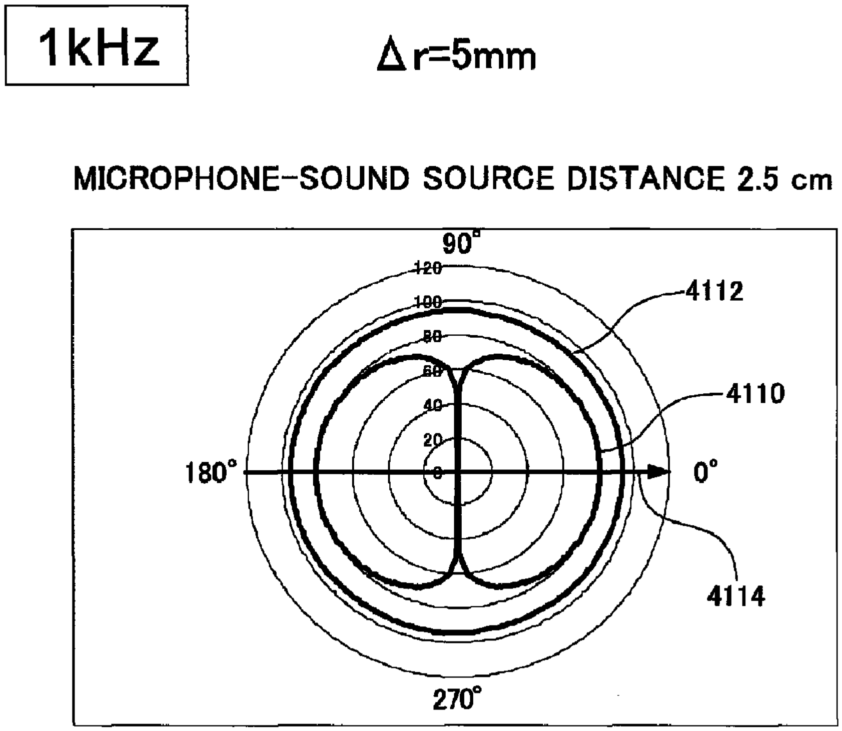
FIGS. 42A and 42B are diagrams illustrative of the directivity of a differential microphone when a microphone-microphone distance is 5 mm, a frequency band is 1 kHz, and a microphone-sound source distance is 2.5 cm or 1 m.
Figure 42B:
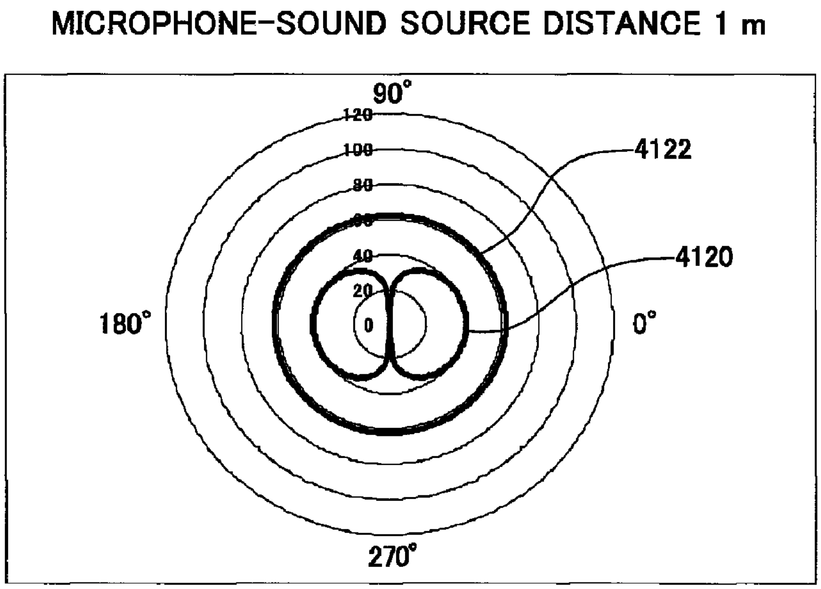

FIGS. 42A and 42B are diagrams showing the directivity of the differential microphone when the sound source frequency is 1 kHz, the microphone-microphone distance is 5 mm, the microphone-sound source distance is 2.5 cm (corresponding to the close-talking distance between the mouth of the speaker and the microphone) or 1 m (corresponding to distant noise).

A reference numeral 4110 indicates a graph showing the sensitivity (differential sound pressure) of the differential microphone in all directions (i.e., the directional pattern of the differential microphone). A reference numeral 4112 indicates a graph showing the sensitivity (differential sound pressure) in all directions when using the differential microphone as a single microphone (i.e., the directional pattern of the single microphone).

A reference numeral 4114 indicates the direction of a straight line that connects microphones when forming a differential microphone using two microphones or the direction of a straight line that connects the first and second through-holes or the first and second diaphragms for allowing sound waves to reach both faces of a microphone when implementing a differential microphone by using one microphone (0°-180°, two microphones M1 and M2 of the differential microphone or the first and second through-holes or the first and second diaphragms are positioned on the straight line). The direction of the straight line is a 0°-180° direction, and a direction perpendicular to the direction of the straight line is a 90°-270° direction.

As indicated by 4112 and 4122, the single microphone uniformly collects sound from all directions and does not have directivity. The sound pressure collected by the single microphone is attenuated as the distance from the sound source increases.

As indicated by 4110 and 4120, the differential microphone shows a decrease in sensitivity to some extent in the 90° direction and the 270° direction, but has almost uniform directivity in all directions. The sound pressure collected by the differential microphone is attenuated as the distance from the sound source increases to a larger extent as compared with the single microphone.

As shown in FIG. 42B, when the sound source frequency is 1 kHz and the microphone-microphone distance is 5 mm, the area indicated by the graph 4120 of the differential sound pressure which indicates the directivity of the differential microphone is included in the area of the graph 4122 which indicates the equability of the single microphone. This means that the differential microphone reduces distant noise better than the single microphone.

Figure 43A:
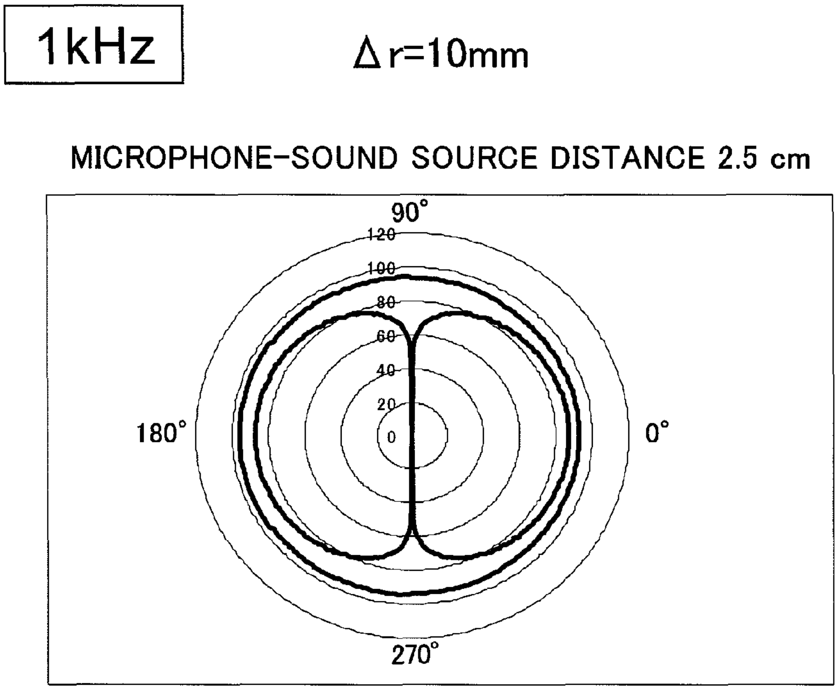
FIGS. 43A and 43B are diagrams illustrative of the directivity of a differential microphone when a microphone-microphone distance is 10 mm, a frequency band is 1 kHz, and a microphone-sound source distance is 2.5 cm or 1 m.
Figure 43B:
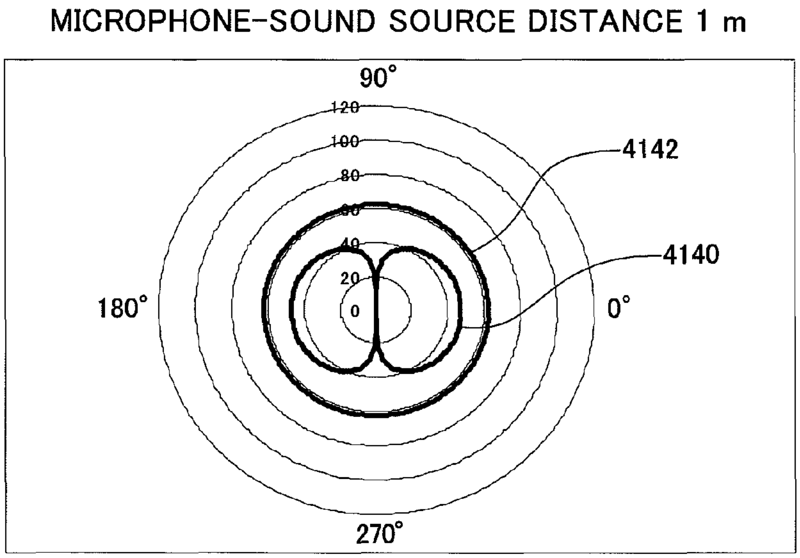

FIGS. 43A and 43B are diagrams showing the directivity of the differential microphone when the sound source frequency is 1 kHz, the microphone-microphone distance is 10 mm, the microphone-sound source distance is 2.5 cm or 1 m. In this case, also, as shown in FIG. 43B, the area indicated by the graph 4140 which indicates the directivity of the differential microphone is included in the area of the graph 4142 which indicates the equability of the single microphone. This means that the differential microphone reduces distant noise better than the single microphone.

Figure 44A:
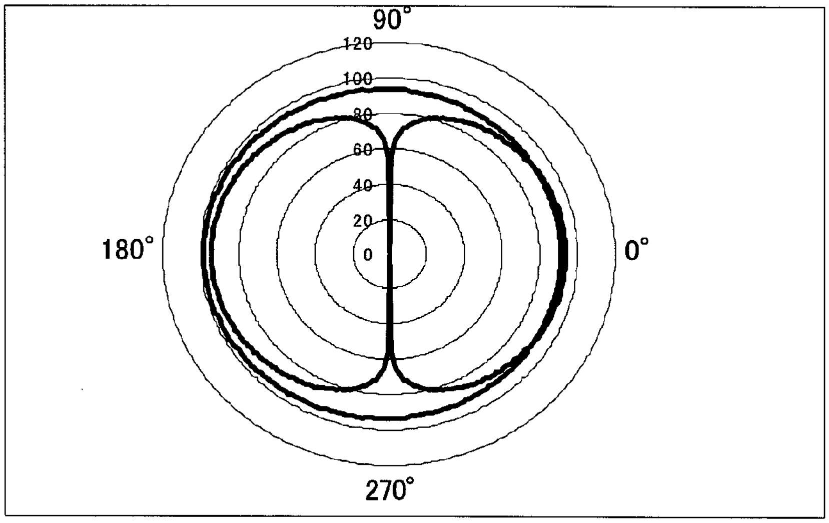
FIGS. 44A and 44B are diagrams illustrative of the directivity of a differential microphone when a microphone-microphone distance is 20 nm, a frequency band is 1 kHz, and a microphone-sound source distance is 2.5 cm or 1 m.
Figure 44B:
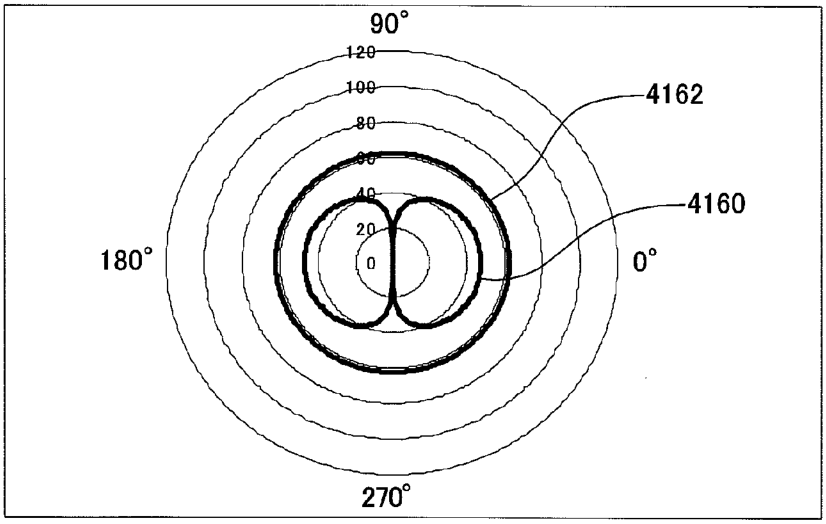

FIGS. 44A and 44B are diagrams showing the directivity of the differential microphone when the sound source frequency is 1 kHz, the microphone-microphone distance is 20 mm, the microphone-sound source distance is 2.5 cm or 1 m. In this case, also, as shown in FIG. 44B, the area indicated by the graph 4160 which indicates the directivity of the differential microphone is included in the area of the graph 4162 which indicates the equability of the single microphone. This means that the differential microphone reduces distant noise better than the single microphone.

Figure 45A:
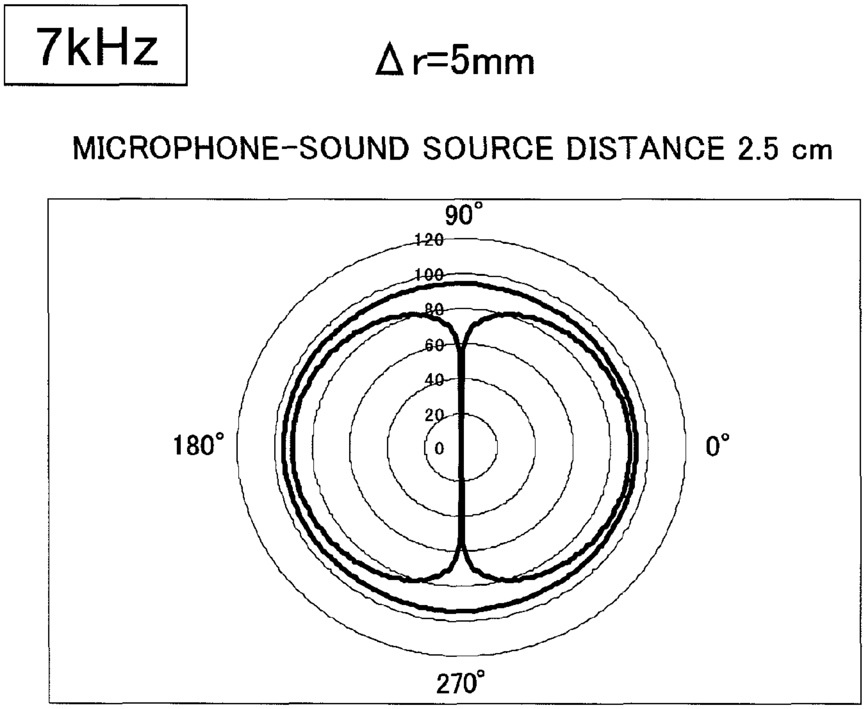
FIGS. 45A and 45B are diagrams illustrative of the directivity of a differential microphone when a microphone-microphone distance is 5 mm, a frequency band is 7 kHz, and a microphone-sound source distance is 2.5 cm or 1 m.
Figure 45B:
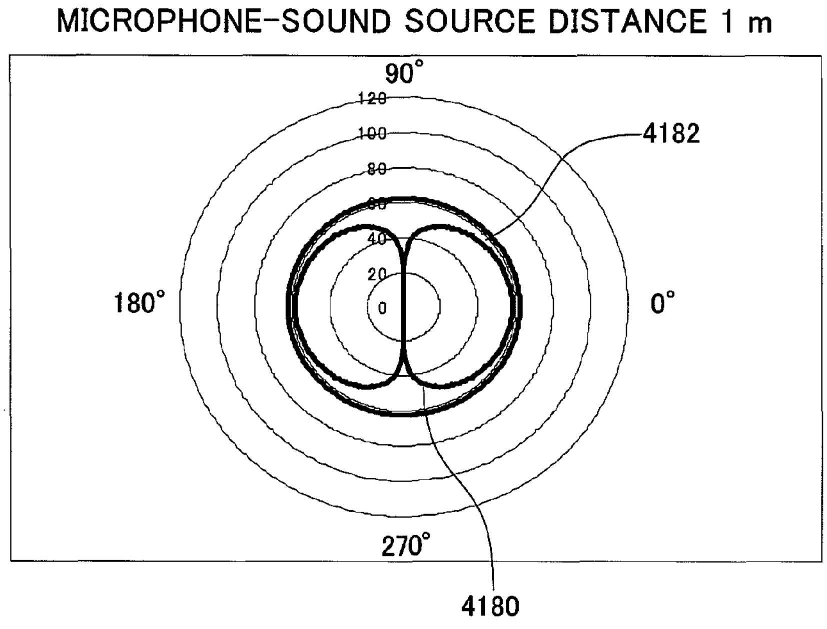

FIGS. 45A and 45B are diagrams showing the directivity of the differential microphone when the sound source frequency is 7 kHz, the microphone-microphone distance is 5 mm, the microphone-sound source distance is 2.5 cm or 1 m. In this case, also, as shown in FIG. 45B, the area indicated by the graph 4180 which indicates the directivity of the differential microphone is included in the area of the graph 4182 which indicates the equability of the single microphone. This means that the differential microphone reduces distant noise better than the single microphone.

Figure 46A:
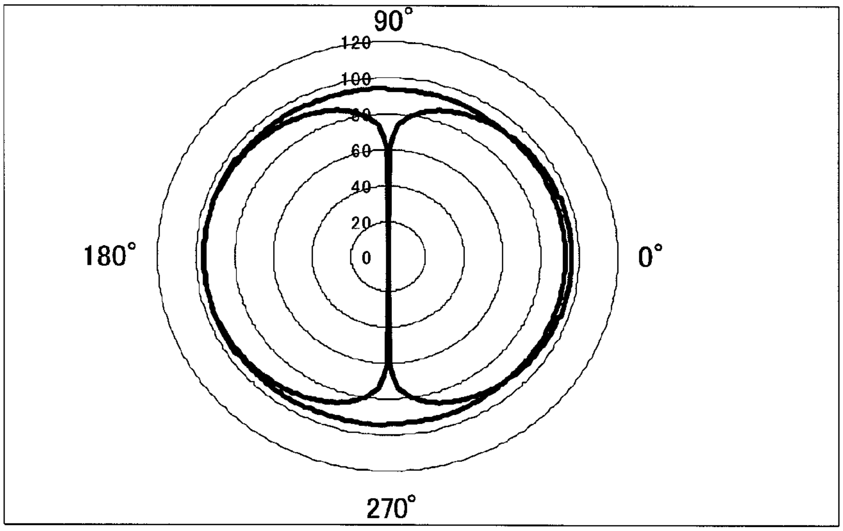
FIGS. 46A and 46B are diagrams illustrative of the directivity of a differential microphone when a microphone-microphone distance is 10 mm, a frequency band is 7 kHz, and a microphone-sound source distance is 2.5 cm or 1 m.
Figure 46B:
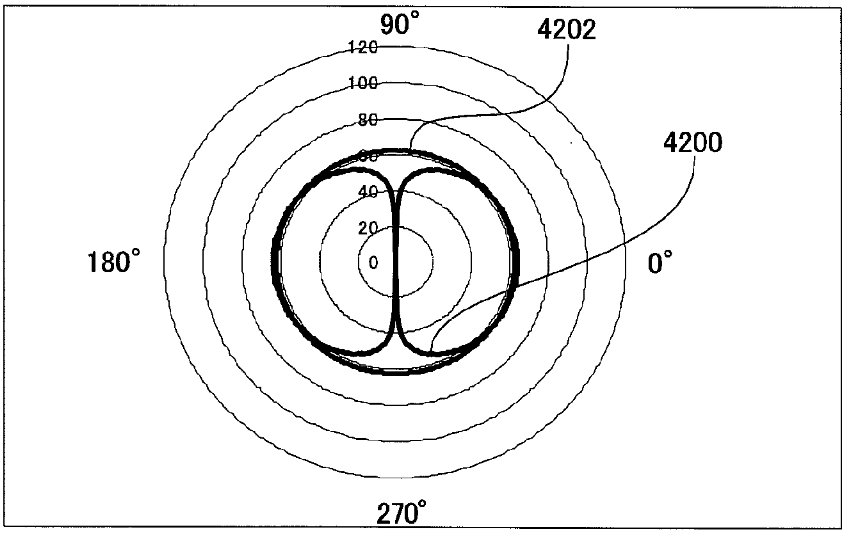

FIGS. 46A and 46B are diagrams showing the directivity of the differential microphone when the sound source frequency is 7 kHz, the microphone-microphone distance is 10 mm, the microphone-sound source distance is 2.5 cm or 1 m. In this case, also, as shown in FIG. 46B, the area indicated by the graph 4200 which indicates the directivity of the differential microphone is not included in the area of the graph 4202 which indicates the equability of the single microphone. This means that the differential microphone reduces distant noise less than the single microphone.

Figure 47A:
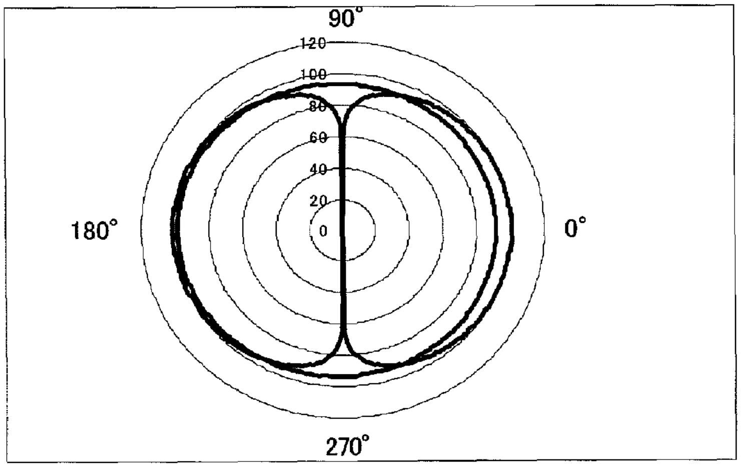
FIGS. 47A and 47B are diagrams illustrative of the directivity of a differential microphone when a microphone-microphone distance is 20 mm, a frequency band is 7 kHz, and a microphone-sound source distance is 2.5 cm or 1 m.
Figure 47B:
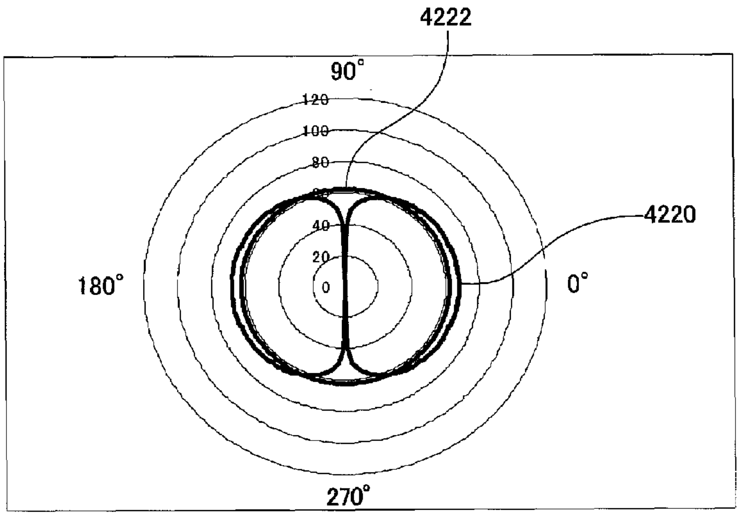

FIGS. 47A and 47B are diagrams showing the directivity of the differential microphone when the sound source frequency is 7 kHz, the microphone-microphone distance is 20 mm, the microphone-sound source distance is 2.5 cm or 1 m. In this case, also, as shown in FIG. 47B, the area indicated by the graph 4220 which indicates the directivity of the differential microphone is not included in the area of the graph 4222 which indicates the equability of the single microphone. This means that the differential microphone reduces distant noise less than the single microphone.

Figure 48A:
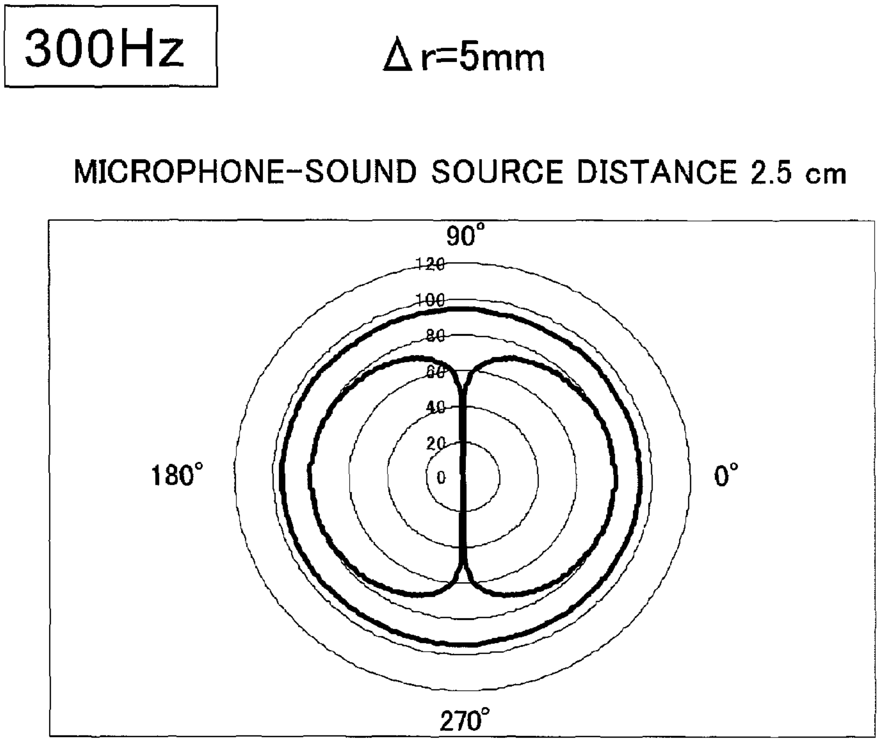
FIGS. 48A and 48B are diagrams illustrative of the directivity of a differential microphone when a microphone-microphone distance is 5 mm, a frequency band is 300 Hz, and a microphone-sound source distance is 2.5 cm or 1 m.
Figure 48B:
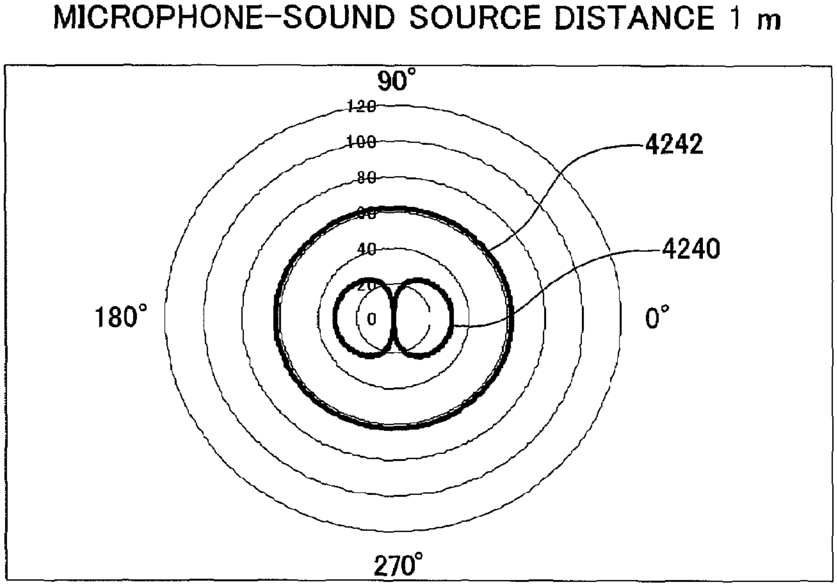

FIGS. 48A and 48B are diagrams showing the directivity of the differential microphone when the sound source frequency is 300 Hz, the microphone-microphone distance is 5 mm, the microphone-sound source distance is 2.5 cm or 1 m. In this case, also, as shown in FIG. 48B, the area indicated by the graph 4240 which indicates the directivity of the differential microphone is included in the area of the graph 4242 which indicates the equability of the single microphone. This means that the differential microphone reduces distant noise better than the single microphone.

Figure 49A:
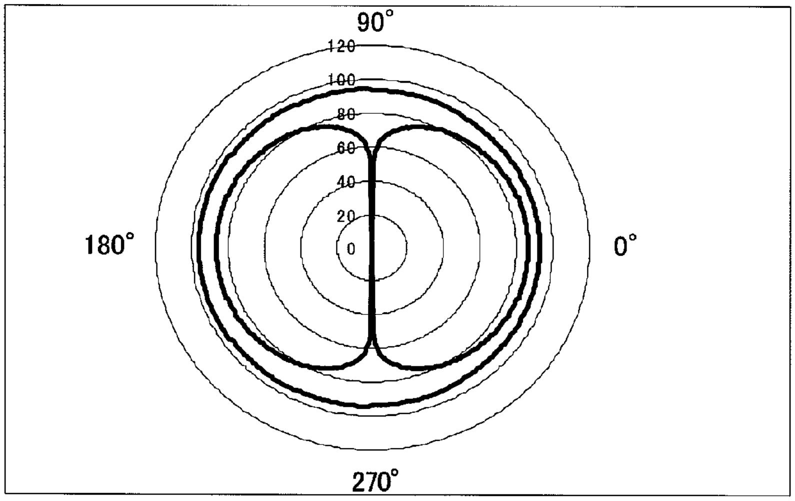
FIGS. 49A and 49B are diagrams illustrative of the directivity of a differential microphone when a microphone-microphone distance is 10 mm, a frequency band is 300 Hz, and a microphone-sound source distance is 2.5 cm or 1 m.
Figure 49B:
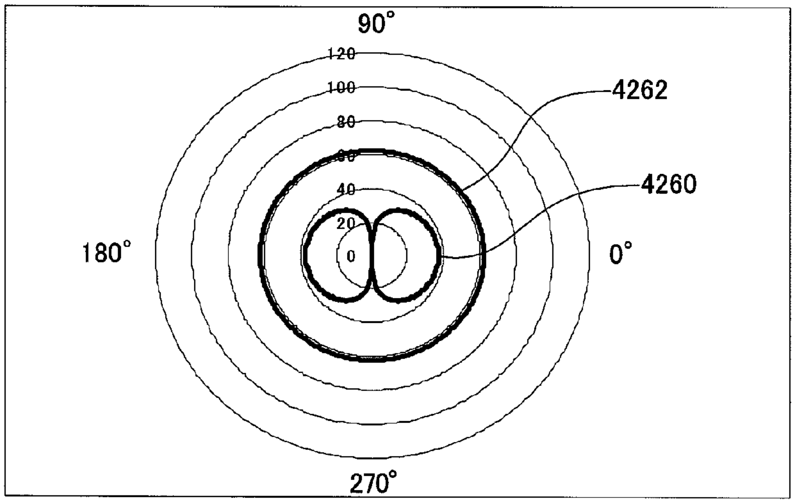

FIGS. 49A and 49B are diagrams showing the directivity of the differential microphone when the sound source frequency is 300 Hz, the microphone-microphone distance is 10 mm, the microphone-sound source distance is 2.5 cm or 1 m. In this case, also, as shown in FIG. 49B, the area indicated by the graph 4260 which indicates the directivity of the differential microphone is included in the area of the graph 4262 which indicates the equability of the single microphone. This means that the differential microphone reduces distant noise better than the single microphone.

Figure 50A:
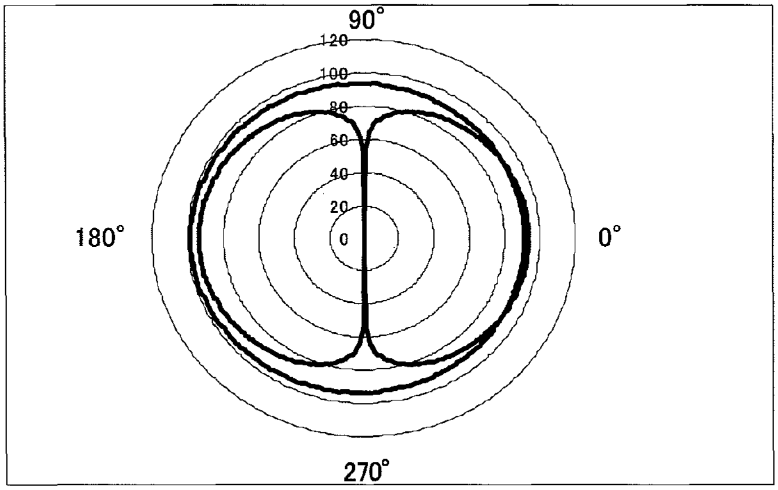
FIGS. 50A and 50B are diagrams illustrative of the directivity of a differential microphone when a microphone-microphone distance is 20 mm, a frequency band is 300 Hz, and a microphone-sound source distance is 2.5 cm or 1 m.
Figure 50B:
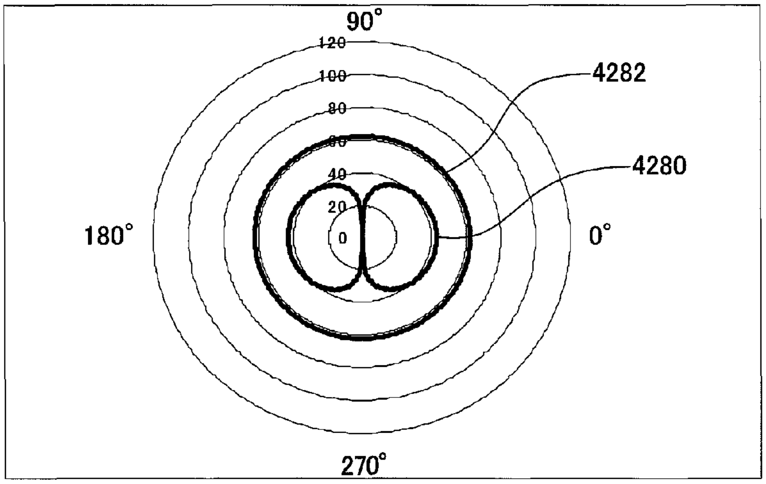

FIGS. 50A and 50B are diagrams showing the directivity of the differential microphone when the sound source frequency is 300 Hz, the microphone-microphone distance is 20 mm, the microphone-sound source distance is 2.5 cm or 1 m. In this case, also, as shown in FIG. 50B, the area indicated by the graph 4280 which indicates the directivity of the differential microphone is included in the area of the graph 4282 which indicates the equability of the single microphone. This means that the differential microphone reduces distant noise better than the single microphone.

As shown in FIGS. 42B, 45B, and 48B, when the microphone-microphone distance is 5 mm, the area indicated by the graph which indicates the directivity of the differential microphone is included in the area of the graph which indicates the equability of the single microphone when the sound frequency is 1 kHz, 7 kHz, or 300 Hz. Specifically, when the microphone-microphone distance is 5 mm, the differential microphone exhibits an excellent distant noise reduction effect as compared with the single microphone when the sound frequency is about 7 kHz.

As shown in FIGS. 43B, 46B, and 49B, when the microphone-microphone distance is 10 mm, the area indicated by the graph which indicates the directivity of the differential microphone is not included in the area of the graph which indicates the equability of the single microphone when the sound frequency is 7 kHz. Specifically, when the microphone-microphone distance is 10 mm, the differential microphone does not exhibit an excellent distant noise reduction effect as compared with the single microphone when the sound frequency is about 7 kHz.

As shown in FIGS. 44B, 47B, and 50B, when the microphone-microphone distance is 20 mm, the area indicated by the graph which indicates the directivity of the differential microphone is not included in the area of the graph which indicates the equability of the single microphone when the sound frequency is 7 kHz. Specifically, when the microphone-microphone distance is 20 mm, the differential microphone does not exhibit an excellent distant noise reduction effect as compared with the single microphone when the sound frequency is about 7 kHz.

Therefore, the differential microphone exhibits an excellent distant noise reduction effect as compared with the single microphone independent of directivity when the frequency band of sound is 7 kHz or less by setting the microphone-microphone distance at about 5 mm to about 6 mm (5.2 mm or less in detail).

When implementing a differential microphone using one microphone, the above description applies to the distance between the first through-hole and the second through-hole for allowing sound waves to reach both faces of the microphone. According to this embodiment, a microphone unit which can reduce distant noise from all directions independent of directivity when the frequency band of sound is 7 kHz or less can be implemented by setting the center-to-center distances between the first and second through-holes 12 and 14 at about 5 mm to about 6 mm (5.2 mm or less in detail).

The invention is not limited to the above-described embodiments, and various modifications can be made. For example, the invention includes various other configurations substantially the same as the configurations described in the embodiments (in function, method and result, or in objective and result, for example). The invention also includes a configuration in which an unsubstantial portion in the described embodiments is replaced. The invention also includes a configuration having the same effects as the configurations described in the embodiments, or a configuration able to achieve the same objective. Further, the invention includes a configuration in which a publicly known technique is added to the configurations in the embodiments.

Although only some embodiments of this invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. A hands-free voice input-output device comprising:

a hands-free voice input section that generates a first voice signal; and a voice output section that outputs a voice from a speaker based on a second voice signal, the hands-free voice input section including a microphone unit, the microphone unit including a housing that has an inner space, a partition member that is provided in the housing and divides the inner space into a first space and a second space, the partition member being at least partially formed of a diaphragm which has a first face and a second face, the first face faces the first space, and the second face faces the second space, and an electrical signal output circuit that outputs an electrical signal that is the first voice signal based on vibrations of the diaphragm, a first through-hole formed in the housing through which the first space communicates with a space outside of the housing and a second through-hole formed in the housing through which the second space communicates with the space outside the housing, wherein sound pressures applied to the first face and the second face correspond to sound pressures of sounds which have entered the first through-hole and the second through-hole respectively.

2. A communication device comprising:

the voice input-output device as defined in claim 1;

a transmitter section that transmits the first voice signal generated by the voice input section to a device of an intended party; and a receiver section that receives the second voice signal transmitted from the device of the intended party.

3. The voice input-output device as defined in claim 1, wherein the diaphragm vibrates due to differential sound pressure which is a difference between sound pressure respectively incident on the first face and the second face of the diaphragm; and the microphone unit is configured such that a noise intensity ratio indicating a ratio of sound pressure of a noise component incident on one of the first or second faces to an intensity of a noise component included in the differential sound pressure is less than a voice intensity ratio indicating a ratio of sound pressure of a voice component incident on the one of the first or second faces to an intensity of a voice component included in the differential sound pressure.

4. A voice input-output device comprising:

a voice input section that generates a first voice signal; and a voice output section that outputs a voice from a speaker based on a second voice signal, the voice input section including a microphone unit, the microphone unit including a housing that has an inner space, a partition member that is provided in the housing and divides the inner space into a first space and a second space, the partition member being at least partially formed of a diaphragm which has a first face and a second face, the first face faces the first space, and the second face faces the second space, and an electrical signal output circuit that outputs an electrical signal that is the first voice signal based on vibrations of the diaphragm, a first through-hole formed in the housing through which the first space communicates with a space outside of the housing and a second through-hole formed in the housing through which the second space communicates with the space outside the housing, and the voice output section and the voice input section being disposed separately separately, wherein sound pressures applied to the first face and the second face correspond to sound pressures of sounds which have entered the first through-hole and the second through-hole respectively.

5. A communication device comprising:

the voice input-output device as defined in claim 4;

a transmitter section that transmits the first voice signal generated by the voice input section to a device of an intended party; and a receiver section that receives the second voice signal transmitted from the device of the intended party.

6. The voice input-output device as defined in claim 4, wherein the diaphragm vibrates due to differential sound pressure which is a difference between sound pressure respectively incident on the first face and the second face of the diaphragm; and the microphone unit is configured such that a noise intensity ratio indicating a ratio of sound pressure of a noise component incident on one on the first or second faces to an intensity of a noise component included in the differential sound pressure is less than a voice intensity ratio indicating a ratio of sound pressure of a voice component incident on the one of the first or second faces to an intensity of a voice component included in the differential sound pressure.

7. A voice input-output device comprising:

a voice input section that generates a first voice signal; and a voice output section that outputs a voice from a speaker based on a second voice signal, the voice input section including a microphone unit, the microphone unit including a housing that has an inner space, a partition member that is provided in the housing and divides the inner space into a first space and a second space, the partition member being at least partially formed of a diaphragm which has a first face and a second face, the first face faces the first space, and the second face faces the second space, and an electrical signal output circuit that outputs an electrical signal that is the first voice signal based on vibrations of the diaphragm, a first through-hole formed in the housing through which the first space communicates with a space outside of the housing and a second through-hole formed in the housing through which the second space communicates with the space outside of the housing, wherein sound pressures applied to the first face and the second face correspond to sound pressures of sounds which have entered the first through-hole and the second through-hole respectively.

8. The voice input-output device as defined in claim 7, wherein the diaphragm vibrates due to the difference between the sound pressures of sound waves respectively incident on the first face and the second face.

9. The voice input-output device as defined in claim 7, the voice output section including:

- an ambient noise detection section that detects ambient noise during a call; and
- a volume control section that controls volume of the speaker based on a degree of the detected ambient noise.

10. The voice input-output device as defined in claim 7, wherein the diaphragm vibrates due to differential sound pressure which is a difference between sound pressure respectively incident on the first face and the second face of the diaphragm; and the microphone unit is configured such that a noise intensity ratio indicating a ratio of sound pressure of a noise component incident on one of the first or second faces to an intensity of a noise component included in the differential sound pressure is less than a voice intensity ratio indicating a ratio of sound pressure of a voice component incident on the one of the first or second faces to an intensity of a voice component included in the differential sound pressure.

* * * * *